(12) United States Patent
Spero

(10) Patent No.: US 10,894,503 B2
(45) Date of Patent: Jan. 19, 2021

(54) DETECTOR CONTROLLED HEADLIGHT SYSTEM

(71) Applicant: Yechezkal Evan Spero, Tifrach (IL)

(72) Inventor: Yechezkal Evan Spero, Tifrach (IL)

( * ) Notice: Subject to any disclaimer, the term of this patent is extended or adjusted under 35 U.S.C. 154(b) by 0 days.

(21) Appl. No.: 15/961,861

(22) Filed: Apr. 24, 2018

(65) Prior Publication Data

US 2018/0255622 A1 Sep. 6, 2018

Related U.S. Application Data

(63) Continuation of application No. 13/357,549, filed on Jan. 24, 2012, now Pat. No. 9,955,551, which is a
(Continued)

(51) Int. Cl.
*B60Q 1/14* (2006.01)
*B60Q 1/04* (2006.01)
(Continued)

(52) U.S. Cl.
CPC ............... *B60Q 1/04* (2013.01); *B60Q 1/085* (2013.01); *B60Q 1/1423* (2013.01); *F21K 9/23* (2016.08); *F21K 9/232* (2016.08); *F21S 4/28* (2016.01); *F21S 41/143* (2018.01); *F21S 41/147* (2018.01); *F21S 41/153* (2018.01); *F21S 41/65* (2018.01); *F21V 19/02* (2013.01); *F21V 23/0464* (2013.01); *F21V 23/0471* (2013.01); *F21V 23/0478* (2013.01); *H05B 3/008* (2013.01); *H05B 45/20* (2020.01); *H05B 45/395* (2020.01); *H05B 47/10* (2020.01); *H05B 47/105* (2020.01); *H05B 47/11* (2020.01); *B60Q 2300/054* (2013.01); *B60Q 2300/112* (2013.01); *B60Q 2300/116* (2013.01); *B60Q 2300/122* (2013.01); *B60Q 2300/134* (2013.01); *B60Q 2300/142* (2013.01); *B60Q 2300/21* (2013.01); *B60Q 2300/23* (2013.01);
(Continued)

(58) Field of Classification Search
CPC ............ H05B 33/0845; H05B 33/0854; H05B 37/0227; H05B 47/105; H05B 47/11; H05B 47/115; H05B 47/125; H05B 47/135; B60Q 1/085; B60Q 1/1423; B60Q 1/143
USPC ............................. 315/77, 82, 158, 307, 312
See application file for complete search history.

(56) References Cited

U.S. PATENT DOCUMENTS

| 4,597,033 A | 6/1986 | Meggs et al. |
| 5,018,290 A | 5/1991 | Kozek et al. |

(Continued)

*Primary Examiner* — Tung X Le
(74) *Attorney, Agent, or Firm* — Brooks Kushman P.C.

(57) ABSTRACT

An automated headlight system for vehicles replaces the high and low beam with a continuum of beam patterns, with further variable spatial distribution of intensities and color spectrum. The digital-headlight is comprised of a controller, sensors and multiple, individually-controllable light-sources modified by optical-control elements to form narrow-beams which are then combined to create the overall headlamp beam. Utilizing real-time sensor data regarding beings, objects and vehicles in the way-ahead, as well as optional information on the driver, vehicle and environment, the logical controller dynamically adapts the headlight system's illumination so as to provide vehicle operators with optimal visibility while preventing discomfort-glare from reaching the eyes oncoming traffic or pedestrians.

70 Claims, 24 Drawing Sheets

Related U.S. Application Data continuation-in-part of application No. 10/604,360, filed on Jul. 14, 2003, now Pat. No. 8,100,552.

(60) Provisional application No. 60/395,308, filed on Jul. 12, 2002, provisional application No. 61/535,981, filed on Sep. 17, 2011.

(51) Int. Cl.

| | | |
|---|---|---|
| F21K 9/23 | (2016.01) | |
| F21K 9/232 | (2016.01) | |
| B60Q 1/08 | (2006.01) | |
| F21V 19/02 | (2006.01) | |
| F21V 23/04 | (2006.01) | |
| F21S 4/28 | (2016.01) | |
| F21S 41/143 | (2018.01) | |
| F21S 41/147 | (2018.01) | |
| F21S 41/65 | (2018.01) | |
| H05B 47/105 | (2020.01) | |
| H05B 45/20 | (2020.01) | |
| H05B 45/395 | (2020.01) | |
| H05B 47/10 | (2020.01) | |
| H05B 47/11 | (2020.01) | |
| F21S 41/153 | (2018.01) | |
| H05B 3/00 | (2006.01) | |
| F21V 29/74 | (2015.01) | |
| F21Y 115/10 | (2016.01) | |
| F21V 21/02 | (2006.01) | |
| F21V 21/30 | (2006.01) | |
| F21W 111/023 | (2006.01) | |
| F21W 111/027 | (2006.01) | |
| F21W 111/08 | (2006.01) | |
| F21W 131/103 | (2006.01) | |
| F21W 131/40 | (2006.01) | |
| F21Y 113/00 | (2016.01) | |
| F21W 102/00 | (2018.01) | |

(52) U.S. Cl.
CPC .. *B60Q 2300/312* (2013.01); *B60Q 2300/314* (2013.01); *B60Q 2300/322* (2013.01); *B60Q 2300/41* (2013.01); *B60Q 2300/42* (2013.01); *F21V 21/02* (2013.01); *F21V 21/30* (2013.01); *F21V 29/74* (2015.01); *F21W 2102/00* (2018.01); *F21W 2111/023* (2013.01); *F21W 2111/027* (2013.01); *F21W 2111/08* (2013.01); *F21W 2131/103* (2013.01); *F21W 2131/40* (2013.01); *F21Y 2113/00* (2013.01); *F21Y 2115/10* (2016.08); *Y02B 20/30* (2013.01); *Y02B 20/40* (2013.01)

(56) References Cited

U.S. PATENT DOCUMENTS

| | | | |
|---|---|---|---|
| 5,033,099 A | 7/1991 | Yamada et al. | |
| 5,130,909 A | 7/1992 | Gross | |
| 5,546,475 A | 8/1996 | Bolle et al. | |
| 5,561,346 A | 10/1996 | Byrne | |
| 5,577,832 A | 11/1996 | Lodhie | |
| 5,749,646 A | 5/1998 | Brittell | |
| 5,785,243 A | 7/1998 | Cross | |
| 5,803,579 A | 9/1998 | Turnbull | |
| 5,921,660 A | 7/1999 | Yu | |
| 5,969,754 A | 10/1999 | Zeman | |
| 5,983,161 A | 11/1999 | Lemelson et al. | |
| 5,994,844 A | 11/1999 | Crawford et al. | |
| 6,046,549 A * | 4/2000 | James | G05F 1/12 315/276 |
| 6,149,283 A | 11/2000 | Conway et al. | |
| 6,166,496 A | 12/2000 | Lys et al. | |
| 6,281,632 B1 | 8/2001 | Stam et al. | |
| 6,340,868 B1 | 1/2002 | Lys et al. | |
| 6,346,777 B1 | 2/2002 | Kim | |
| 6,379,022 B1 | 4/2002 | Amerson et al. | |
| 6,385,352 B1 | 5/2002 | Roustaei | |
| 6,394,614 B1 | 5/2002 | Chang | |
| 6,406,172 B1 | 6/2002 | Begemann et al. | |
| 6,483,439 B1 | 11/2002 | Vukosic | |
| 6,498,440 B2 | 12/2002 | Stam et al. | |
| 6,499,860 B2 | 12/2002 | Begemann | |
| 6,528,954 B1 | 3/2003 | Lys et al. | |
| 6,601,982 B1 | 8/2003 | Begemann et al. | |
| 6,676,282 B2 | 1/2004 | Begemann et al. | |
| 6,820,998 B2 | 11/2004 | Chen | |
| 7,524,097 B2 * | 4/2009 | Turnbull | B60Q 1/2665 362/545 |
| 8,045,760 B2 * | 10/2011 | Stam | G06K 9/00805 382/104 |
| 8,115,394 B2 * | 2/2012 | Kobayashi | B60Q 1/085 315/158 |
| 8,665,079 B2 * | 3/2014 | Pawlicki | G06T 7/13 340/435 |
| 9,398,270 B2 * | 7/2016 | Liken | G06K 9/00791 |
| 2001/0014019 A1 | 8/2001 | Begemann | |
| 2002/0022774 A1 | 2/2002 | Kamieli | |
| 2002/0022927 A1 | 2/2002 | Lemelson et al. | |
| 2002/0039238 A1 | 4/2002 | Chang | |
| 2002/0046100 A1 | 4/2002 | Kinjo | |
| 2002/0047628 A1 | 4/2002 | Morgan et al. | |
| 2002/0047646 A1 | 4/2002 | Lys et al. | |
| 2002/0057340 A1 | 5/2002 | Fernandez et al. | |
| 2002/0130326 A1 | 9/2002 | Tamura et al. | |
| 2004/0052076 A1 | 3/2004 | Mueller | |
| 2004/0061605 A1 | 4/2004 | Howard | |
| 2004/0105264 A1 | 6/2004 | Spero | |
| 2004/0138726 A1 | 7/2004 | Savage et al. | |
| 2004/0230358 A1 * | 11/2004 | Stam | B60R 1/00 701/49 |
| 2006/0222213 A1 | 10/2006 | Kiyohara et al. | |
| 2008/0136356 A1 | 6/2008 | Zampini et al. | |
| 2009/0315485 A1 | 12/2009 | Verfueth et al. | |
| 2010/0052550 A1 * | 3/2010 | Kobayashi | B60Q 1/143 315/158 |
| 2010/0302779 A1 | 12/2010 | Chemel | |
| 2011/0211110 A1 | 9/2011 | Doublet | |
| 2012/0001566 A1 | 1/2012 | Josefowicz et al. | |
| 2012/0091897 A1 | 4/2012 | O et al. | |
| 2012/0262575 A1 | 10/2012 | Champagne et al. | |
| 2012/0283908 A1 * | 11/2012 | Schofield | G05D 1/0244 701/36 |
| 2013/0258688 A1 * | 10/2013 | Kalapodas | B60Q 1/085 362/465 |

\* cited by examiner

PRIOR ART
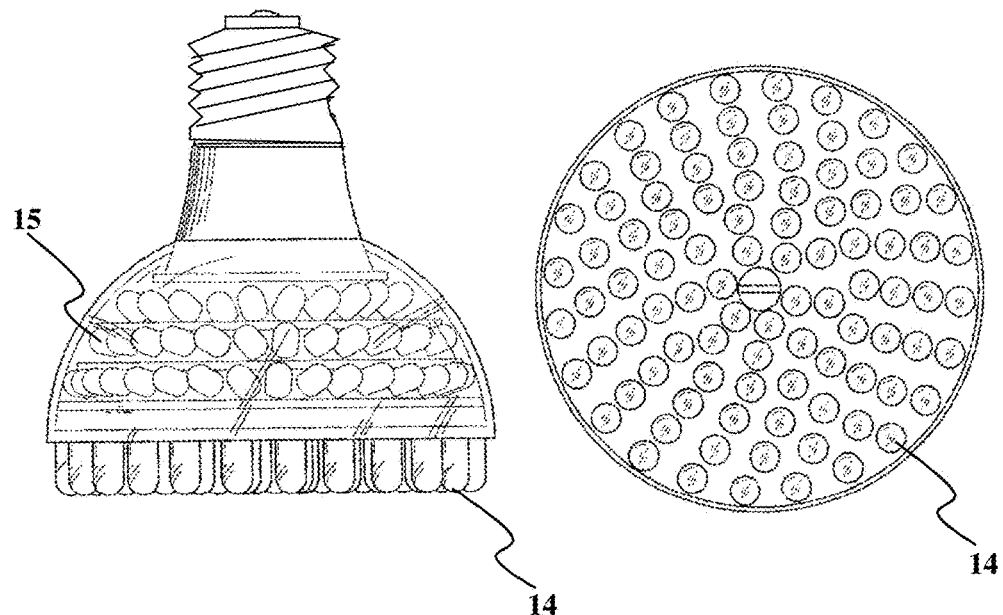
FIG. 2A
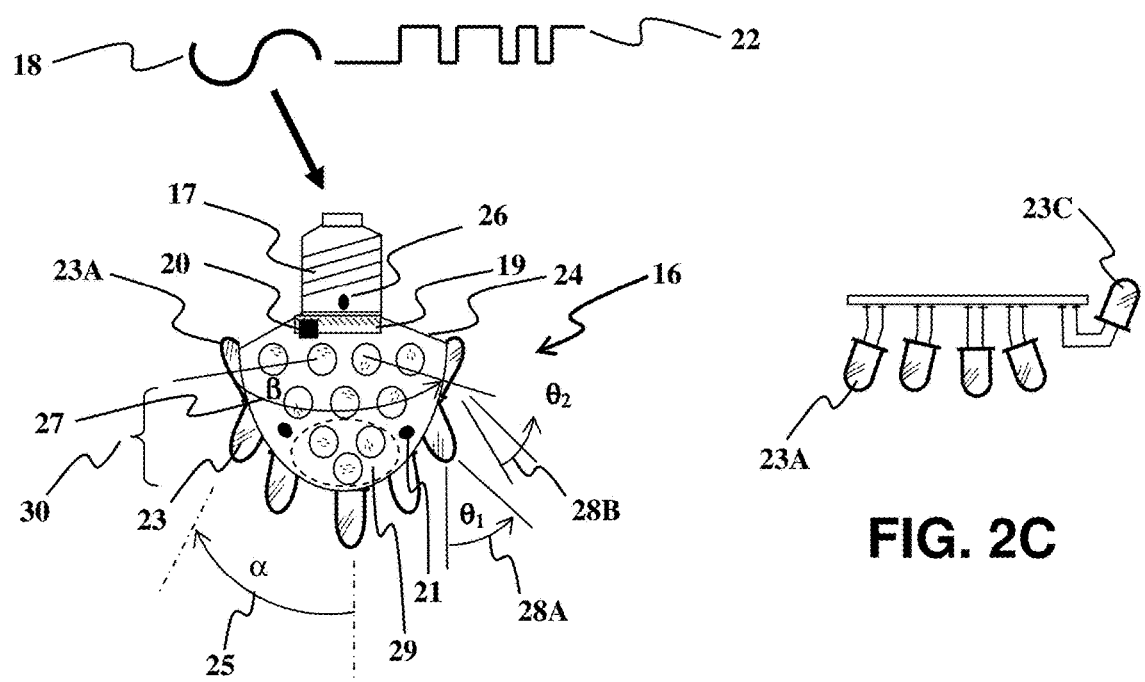
FIG. 2B
FIG. 2C

PRIOR ART

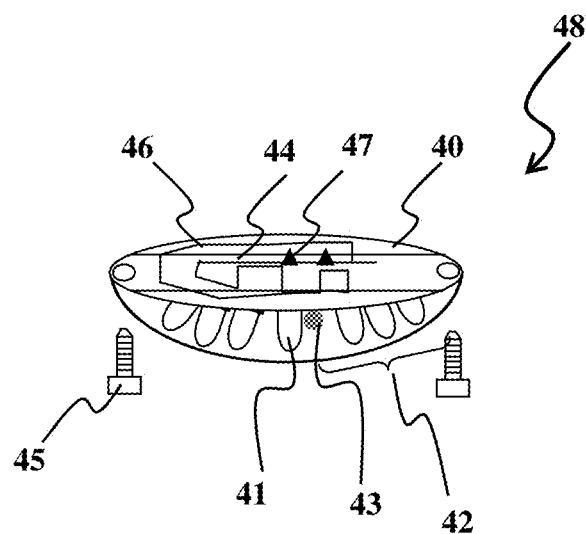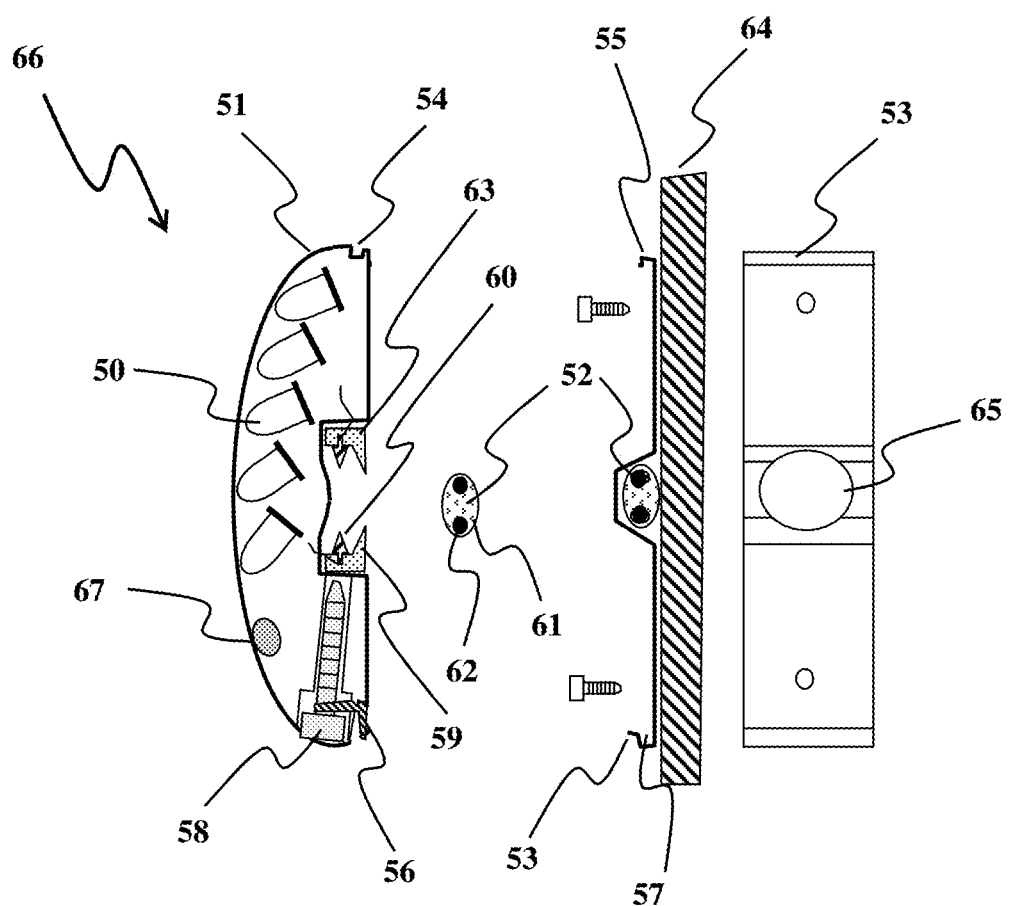
FIG. 4

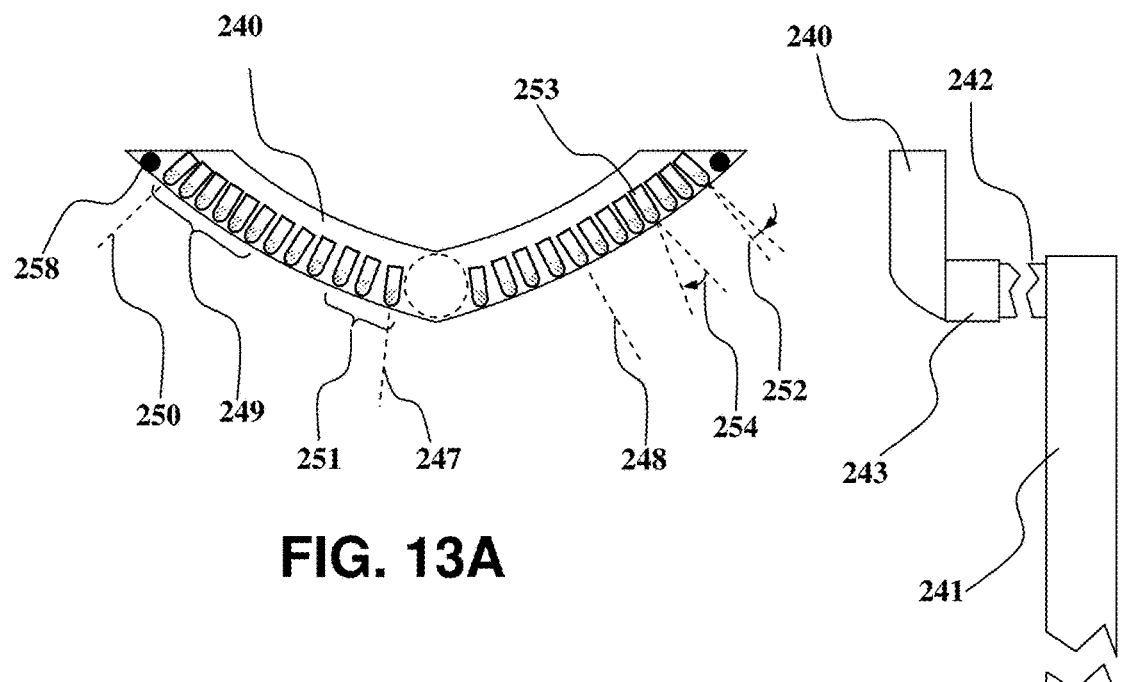
FIG. 13A
FIG. 13B
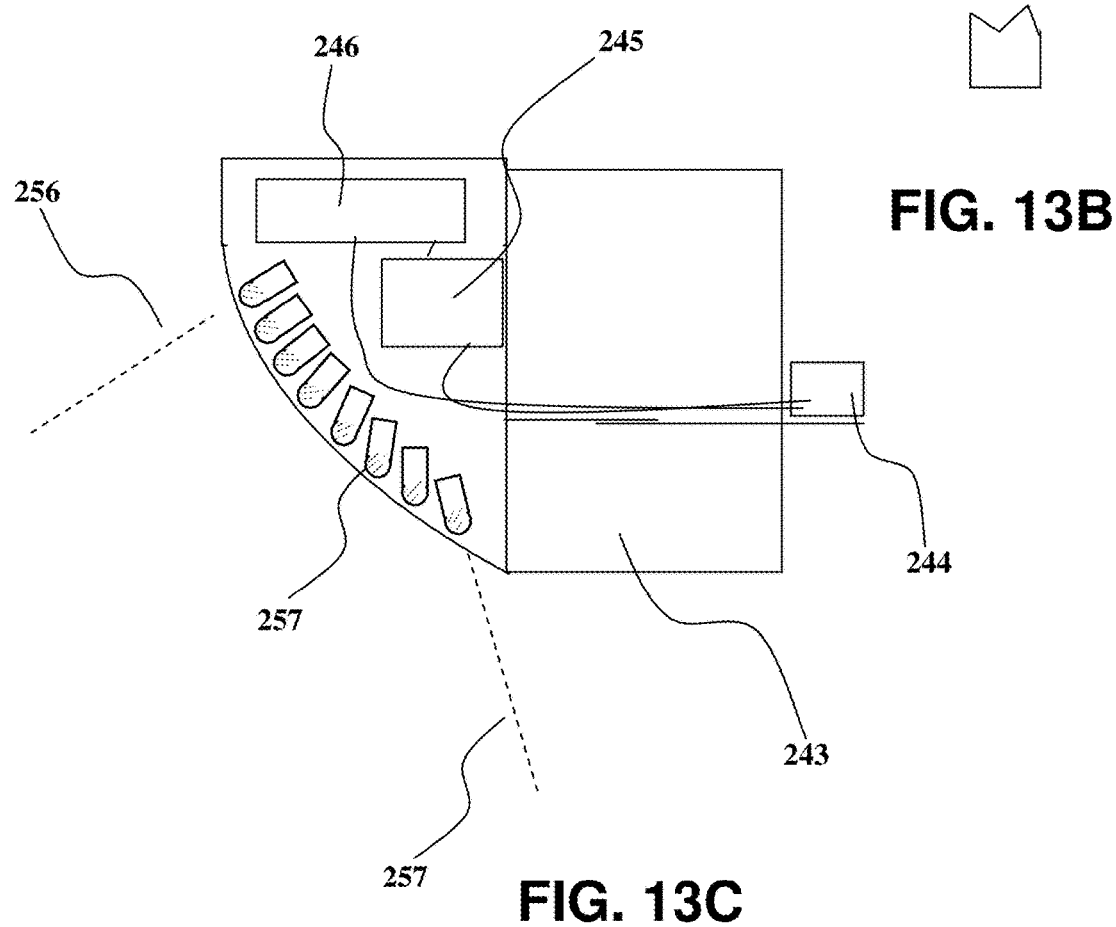
FIG. 13C

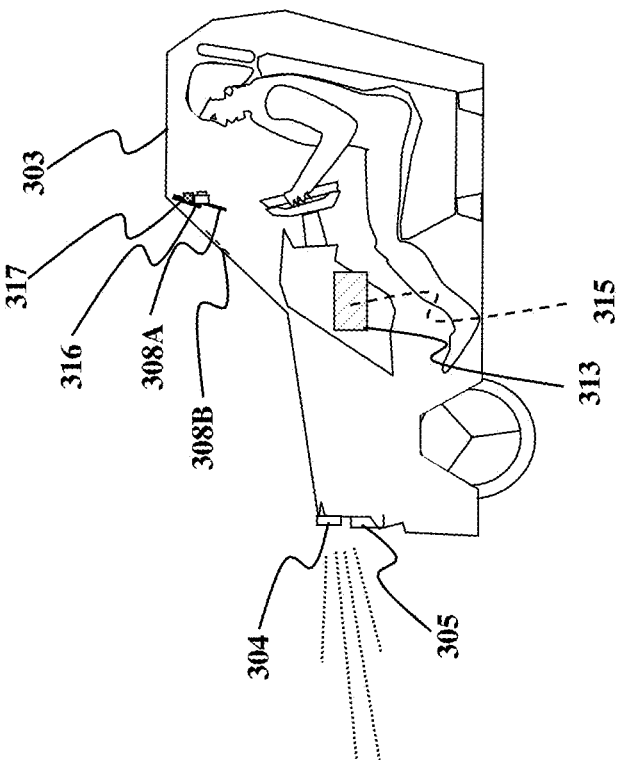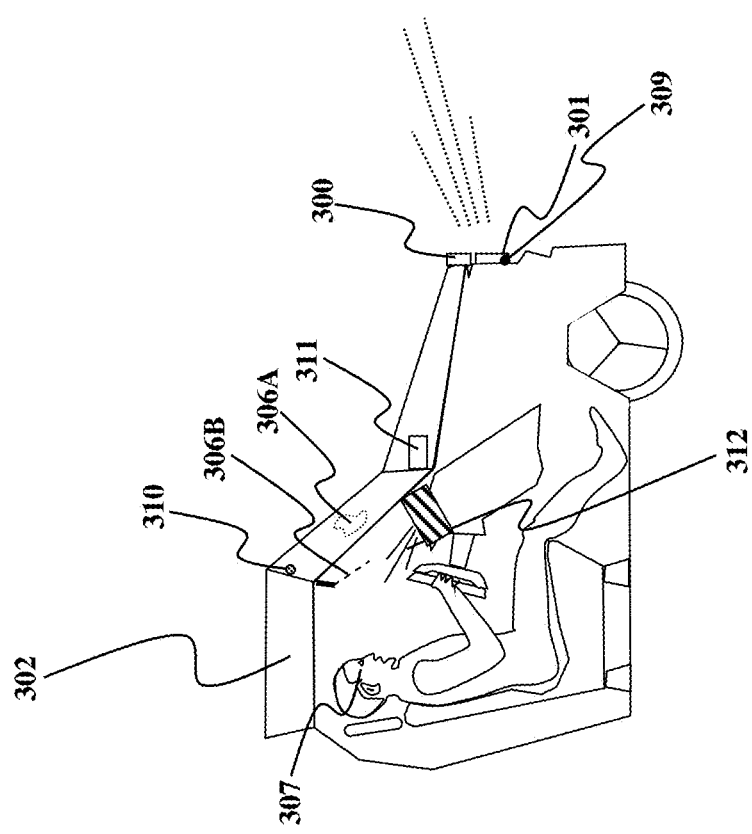
FIG. 16

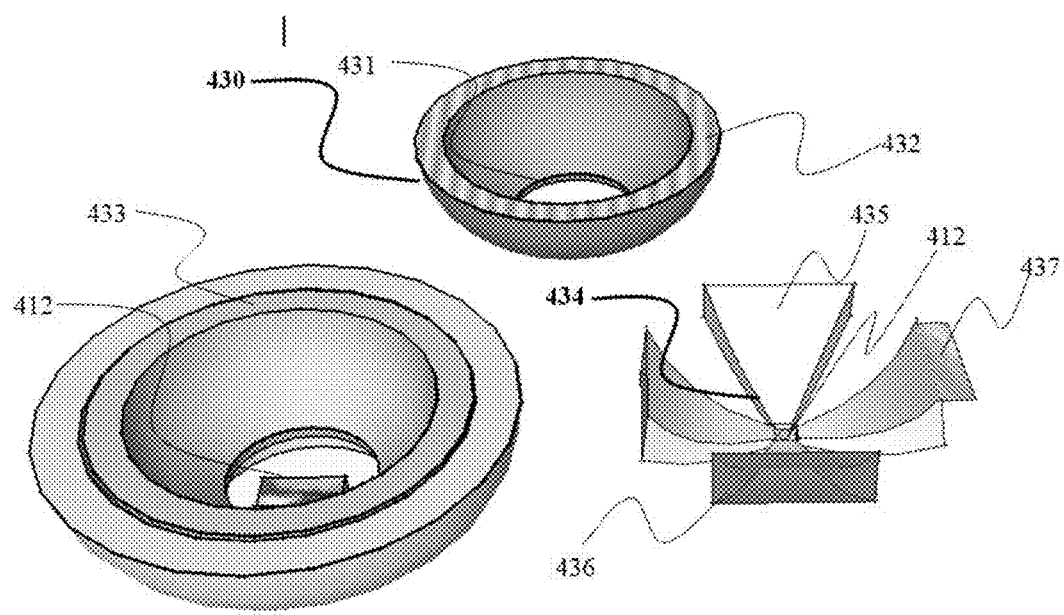
FIG. 19
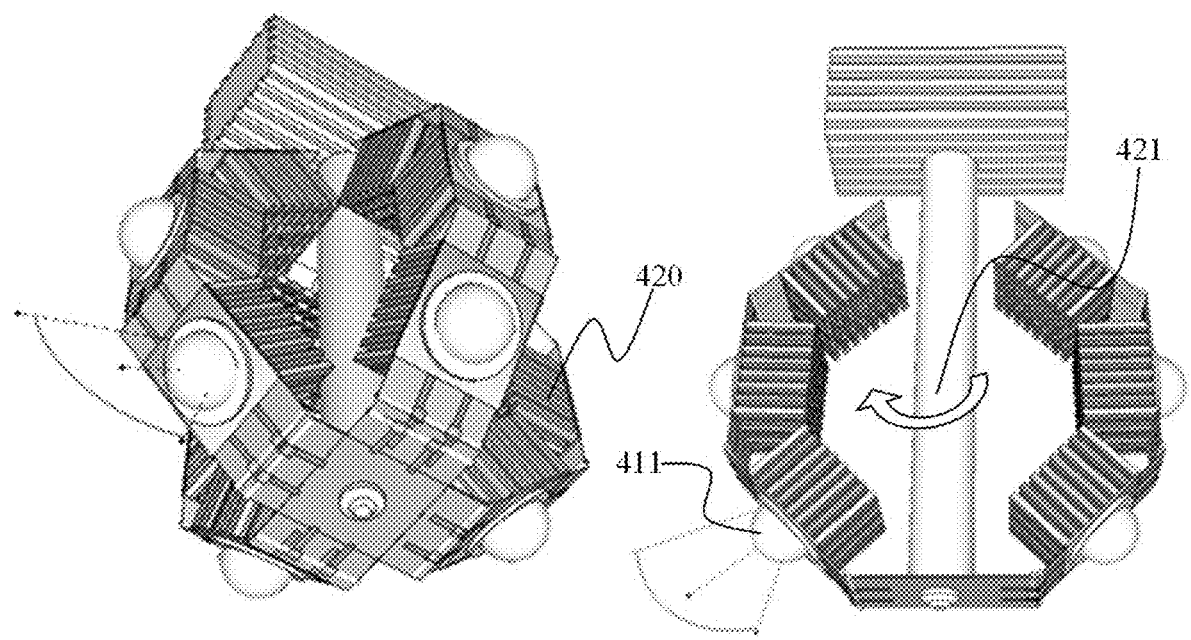
FIG. 20A  FIG. 20B

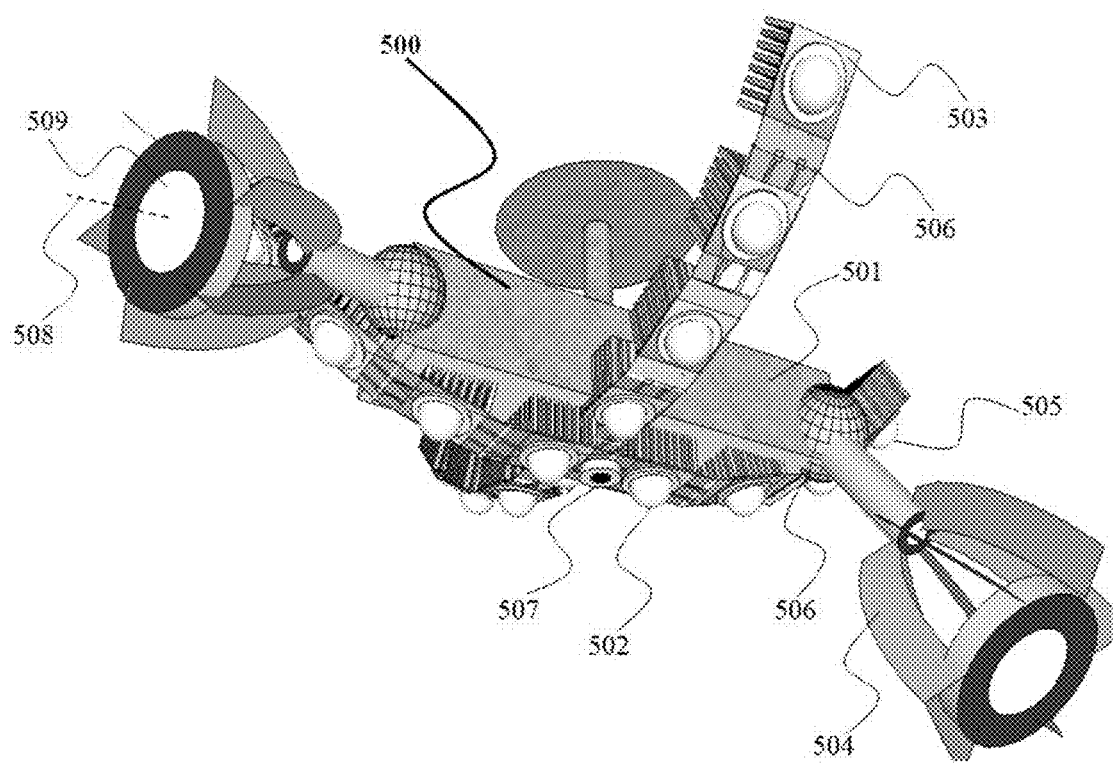
FIG. 27
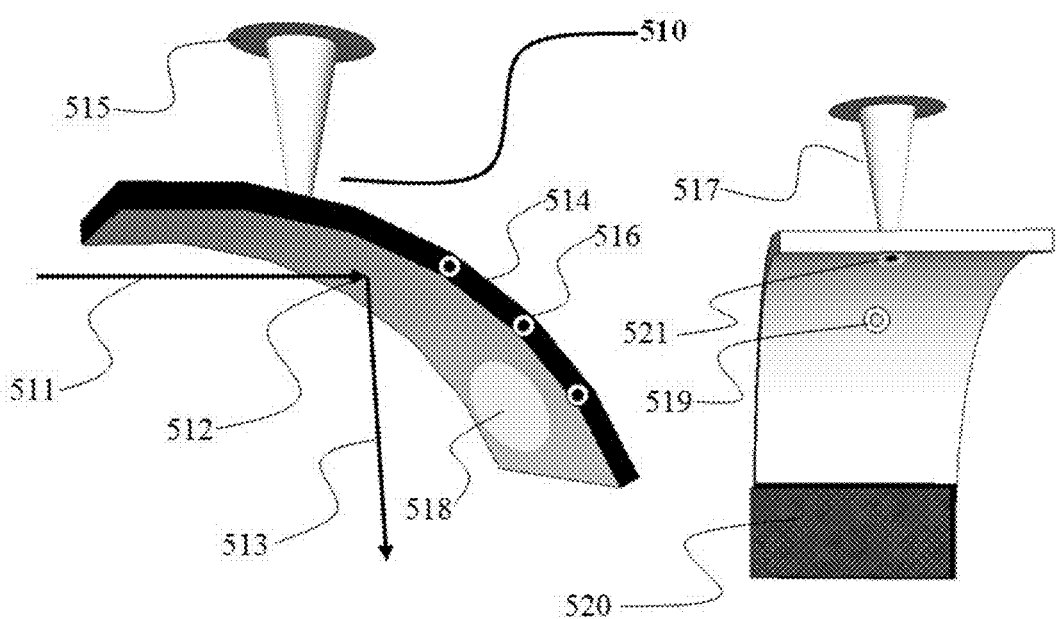
FIG. 28A    FIG. 28B

DETECTOR CONTROLLED HEADLIGHT SYSTEM

CROSS REFERENCE TO RELATED APPLICATIONS

The present application is a Continuation of pending U.S. patent application Ser. No. 13/357,549 filed Jan. 24, 2012, now U.S. Pat. No. 9,955,551 which issued Apr. 24, 2018, which is a Continuation-in-Part of U.S. patent application Ser. No. 10/604,360, entitled "Multiple Light-Source Illuminating System" filed on Jul. 14, 2003, now U.S. Pat. No. 8,100,552 which issued on Jan. 24, 2012, which claims benefit under 35 U.S.C. § 119(e) of U.S. Provisional Application No. 60/395,308 filed Jul. 12, 2002, entitled: Multiple light source illumination system where pending U.S. patent application Ser. No. 13/357,549 filed Jan. 24, 2012, also claims benefit of U.S. Provisional Application No. 61/535,981, filed Sep. 17, 2011 entitled Adjustable Lighting Fixture, where the entire content of the disclosures are all expressly incorporated herein by reference.

BACKGROUND OF THE INVENTION

Field of the Invention

The present invention is in the field of radiation producing devices. More particularly, the present invention is in the technical field of lighting fixtures. However, radiation used for headlamps, heating, night vision, UV or visible light curing, medical X-rays and other radiation uses are covered as well. General lighting fixtures otherwise known as luminaires will be used as the primary example while other irradiating devices such as infrared heaters are covered as well. The invention relates to multiple light source illuminating devices intended to replace incandescent, fluorescent and HID luminaries in general and specialty lighting applications.

Definitions, Terms, Elements

In order to clarify the intent of the present invention and its dissimilar aspects from prior art, a nomenclature system is established.

Used herein illumination refers to the deliberate application of light to achieve some practical or aesthetic effect. Correct illumination or recommend lighting practice refers to lighting industry standards and recommendations for the illumination of living, recreation, architectural and work areas as described in standards and handbooks published by industry professional organizations such as the Illuminating Engineering Society, the International Association of Lighting Designers, IALD or International Commission on Illumination CIE.

Lamp: A lamp, other than a reflector lamp, is generally a device that generates light radially from the source. Due to the physics involved in the light generation process, it is difficult at the source to gain control of the spatial light propagation. A reflector lamp will partially control the emitted light which hits the reflector but will not control the remaining light emanating from the filament or discharge tube. A lamp other than a solid-state lamp will generally produce light over a wide range of spectrum. The overall color is a function of the physics involved in the generation of the different photon energies. While some lamps spectra are closer to sunlight and have a good color rendering in relation thereto, other lamps such as low-pressure sodium are highly monochromatic with a yellow-orange appearance. A color temperature in degrees Kelvin based on the color of an incandescent filament is used to describe a lamp. An incandescent lamp color will be termed "warm" at 2000 Kelvin and a Metal Halide "cool" at 4000K. In general, there is no ability to affect the color over the intensity level even where dimming is afforded. A lamp is also intended to be a replaceable element. Lamps are constructed according to universal standards which allow for the substitution of lamps by other manufacturers. Prior-art lamps are thus provided with bulky bases which fit into bulky sockets and do not lend themselves to being permanently wired into printed circuit boards or bonded onto electronic chips.

Luminaire: A Lighting Fixture or luminaire (the terms are used interchangeably) is a device which is constructed around the lamp to provide lighting specific to the application including non-lighting considerations such as aesthetics, safety etc. Some LF designs are primarily based on aesthetics while others are based on tailoring the lumen output such that the lighting fixture output meets the visual task at hand. Between these two extremes there are many possible designs, with maintenance, fixture cost, hazardous and rough service location considerations also playing a role. This is essentially why the industry produces so many different types of luminaires. One type for high industrial building ceilings known as high-bay lighting, another for office lighting and a third for roadway lighting and a fourth for illuminating corridors. Each fixture has its photometric distribution characteristics, that is, how many candela at what angle are exiting from the luminaire. Other luminaire considerations include keeping the lighting from causing discomfort glare or from being a source of veiling reflections. The purely technical goal is to get the required amount of light at the work surfaces where visual tasks are carried out by man, animals, plants and machines. A LF has a longer life than the lamp, and the lamp is meant to be replaceable within the fixture. A luminaire is wired directly to the electrical mains while a lamp due to its need to be replaced has a base which fits into a socket by way of which the lamp receives its power. Prior art solid-state lamp assemblies are considered lamps, as they have no provision for being connected to the mains. A luminaire has apparatus whereby it is attached to the building structure while a lamp is mechanically affixed to the lamp holder or socket. Another aspect of distinction is, that in general, correct lighting practice principles are used to guide in the design of a LF while a lamp is "bare" and is expected to have reflectors, refractors, shades and louvers to prevent glare and redirect its rays to increase light utilization.

Digital: The term digital used herein in refers to the luminaire concept as espoused by teachings of this invention and is loosely defined in parallel to the fine control associated with digital equipment. The multiple light sources of specific characteristics provide quanta of power and spectrum which are smoothly added or detracted to generate a changed lighting effect. The digital aspect arises from the sufficient progression of values, varying by minute degrees to produce a continuum so as be non-discernable or irrelevant to the user. The added controllability is realized by breaking up the light-production, into discrete, specifically aimable, and dimmable elements which can be addressed by control electronics for the purpose of affecting the intensity, spectrum and spatial distribution of spectrum and of intensity of the illumination provided by the luminaire of the present invention.

The overall combination of control capability and discrete light sources yields a digital lighting fixture. The terminology "digital" as used herein also refers to the discrete nature of the multiple LED lamps provided in the luminaire, whereby, "digital" control results from the individual control of the discrete, i.e., "digital" lighting elements, the LEDs, in the luminaire.

Correct lighting practice: A bare incandescent lamp illuminating a room is arbitrarily termed poor lighting practice. The bare light bulb hooked up to the electric power via a light switch, causes glare, wastes light, delivering the light to useless areas, has no provision for dimming and is energy inefficient. The Illuminating Engineering Society of North America (IESNA) as well as other professional groups such as the International Association of Lighting Designers (IALD) have developed recommended lighting practices for specific applications in indoor and outdoor lighting. These recommendations and equations for implementing the recommendations can be found in the IESNA Lighting Handbook, 8th and/or 9th Editions (available from the Illuminating Engineering Society of North America 120 Wall St. Floor 17 New York, N.Y. 10005 included herein by reference. Factors in good lighting include lighting intensity levels which may be based on the age of the users of the light, the color rendering capacity of the light source, its color temperature, the non-production of glare, veiling reflections and energy efficiency amongst others. Recommendations for all aspects of lighting in terms of intensity, distribution, color temperature, color temperature as a function of light intensity and correct color rendering exist in the literature in terms of lighting applications that is the environment to be illuminated, in parameters such as lux for intensity, CRI for color rendering index and Visual Comfort Parameter (VCP) for glare. In recent years, the Unified Glare Rating (UGR) as recommended by the CIE has become widely accepted as a general formula for assessing glare. While the US may still use VCP ratings, all the lighting-practice engineering organizations worldwide have standards and recommended ratings for different activities. For example, lighting levels of 500 lux and a UGR of 19 is recommended in offices while industrial areas intended for coarse work a UGR of 28 can tolerated. In good lighting practice, attention is given by lighting designers to the correct amount of uplight, that is, light exiting from the luminaire towards the ceiling, which prevents a gloomy "dark cave" effect. Attention is also given to the cut-off angle of the luminaire, usually provided by shielding elements, such that high intensity rays are not emitted at an angle where they enter the occupant's eye during normal activity. A correctly designed luminaire for indoor lighting may provide 30% uplight and 70% downlight in the angles from the nadir 0 to 60 degrees and then again 135 to 170 degrees. A governing equation in lighting and used in "reverse luminaire design" of the present invention is the cosine law or Lambert's law, Equation 1:

$$E = \frac{I \cos \theta}{D^2}$$

Where: E=Illuminance in lux or footcandles, I=Luminous intensity in candles, D=Distance between the source and the point of calculation in meters or feet, θ=Angle of light incidence with illuminated surface Another useful equation used in fixture analysis to avoid glare producing designs yields the level of discomfort on the DeBoer scale. The DeBoer rating scale (1-9) describes the level of discomfort where: 1=Unbearable, 3=Disturbing, 5=Just acceptable, 7=Satisfactory, and 9=Just noticeable. The allowable level is dependent on the application. A surgeon performing an operation may be very sensitive to glare while a chlorophyll producing plant is not. The equation to determine the rating is Equation 2:

$$W = 5.0 - 2.0 \ \text{LOG} \ [E_i/(0.003)(1+\text{SQRT}(La/0.04))(\varphi_i)^{0.46}]$$

where: W=glare sensation on a scale of 1 to 9, La=adaptation luminance (cd/m 2), $E_i$=illumination directed at observer's eyes from the i-th source (lux), $\varphi_i$=glare angle of the i-th source (minutes of arc) from the observer's line of sight.

Using these equations and correct lighting practice covering preferred angles of lighting for visual tasks, it is possible to design from the specific application's illumination requirements the spatial light intensity distribution and yet avoid manufacturing a glare producing luminaire.

The present invention generally relates to an improved illuminator for use both in general and specialty lighting. The term general lighting includes use in living spaces such as lighting in industrial, commercial, residential and transportation vehicle applications. By specialty lighting we mean emergency lighting activated during power failures, fires or smoke accumulations in buildings, microscope, stage illuminators, billboard front-lighting, hazardous and difficult access location lighting, backlighting for signs, agricultural lighting etc.

Energy Efficiency and Costs. In an example to illustrate the advantages of an energy efficient lighting solution, the total cost of lighting a typical 300 foot by 300-foot retail facility at 1000 lux over a 10 year period using state of the art (2002) HID luminaires is assessed. Including equipment, installation and maintenance cost the total bill is over one million dollars. Approximately 80% of this is in energy costs. The commodity being purchased is lighting, the major lifecycle cost is electricity. To cut down on costs and also conserve energy it desirable to maximize the use of light generated. A Japanese survey of office luminaires (Japan Lighting Information Services-Seminar-Save Energy of Office Lighting-Loss of light in luminaire-.htm) shows LF efficiencies (light that exits the fixture vs. the light produced by the lamp) in an open office fluorescent luminaire without anti-glare louvers to be 84% while one equipped with louvers is only 52% efficient. The "utilization factor" (which equals the light flux which arrives at a work site (e.g. upper surface of a desk) divided by the sum of all light flux of the lamp) is 74% for an open fixture and only 50% for louvered version. This however, is still not what the customer is paying for. The customer is after the best lighting solution at minimal energy cost. Chances are, as experienced lighting designers know, that the light intensity, even in a good lighting design, is still not evenly distributed over the work surfaces. While care is taken in the lighting design computer runs not to fall below the minimum illumination intensity at any point in the room, there are non-trivial excesses at some points in the lighting layout design. This excess light, wasted energy as far as the customer is concerned, probably accounts for another 10% loss. While a fluorescent may appear to be a superior and very efficient light source at 80 lumen per watt vs. 30 lumen per watt for LEDs this is not actually the case, in actuality 60% of the fluorescent LF's light is wasted. Thus, in terms of energy use, a properly designed LED luminaire can be, with the proper luminaire design of the present invention, as effective lumen per lumen as any discharge light source in illuminating living areas.

Expressed in terms of the above background and nomenclature, it is the goal of this disclosure to teach how to construct a luminaire which will radiate photons where needed, exactly in the correct amounts to accomplish visual tasks and/or create an atmosphere. The controlled radiation of light into a living space with a specific spatial intensity distribution also having optimal spectral characteristics for the seeing tasks at hand is provided by the present invention. Each visual task application has its own correct lighting solution with optimal light intensities, light color emanating at angles which will not cause glare that interferes with vision or causes discomfort. Tasks in living spaces vary with time so it is another objective of the present invention is to provide the optimal lighting solution in "real time" (at that specific moment in time).

As a light source of ever increasing choice, LEDs have been packaged in numerous forms and used in lighting applications. Special control circuits have been developed to take advantage of the variability offered by the new light source and are today being offered as a solution to specific applications. In general, however the design process has not zeroed in on providing the correct lighting solution. A number of LED illumination devices create "white" light by combining two or more LEDs of various wavelengths. White LEDs are also made using phosphors. The goal has not been to vary this color spectrum in real time to coordinate with the usage of the living space. The term "white" light is loosely interpreted to cover a range of illuminating light having spectral light distributions acceptable to the user for that application. HPS's yellow light has even been called white by some and the term is exclusive only of almost monochromatic sources such as LEDs and LPS lamps. The terms light spectrum, spectra, spectrum, spectral and color are used to refer to the relative spectral power distribution of the light source.

DESCRIPTION OF THE PRIOR ART

In prior art illuminating devices, a universal light source such as an incandescent or fluorescent lamp emits light in many directions up to a 360 degree light distribution where in practice only a limited angular light distribution is needed in order for people to carry out visual tasks. So as to control the light distribution to certain angles, reflectors and refractors are used to redirect the light where it is needed. A great deal of light is wasted in the inherent inefficiencies in redirecting the light and shielding the glare causing light sources. In addition, the actual placement of the light rays where needed, but not beyond, is often inexact and wasteful.

In addition, it necessary to have a wide variety of lighting fixtures each with dedicated optics and even then, there is much wasted light or insufficient lighting in the area covered by the luminaire. In addition, the light intensity and color spectrum of the luminaire is fixed while the visual tasks going on in the space are changing all the time. Usually, there is no provision for either detecting the changes going on in the living space nor is the lighting fixture equipped with apparatus to effect the necessary changes in the lighting. In addition, individuals often have their personal lighting preferences as to the color and intensity of the lighting. Prior art lighting fixtures have no provision for the localized provision of preferred lighting to individuals.

A prior art LED light strip consists of circuitry including a plurality of LEDs mounted on a substrate and connected to electrical conductors. The circuitry is sometimes encased within a tube like, partially transparent protective sheathing and connected to a power source for selective LED illumination. Two examples of LED strip types are described in U.S. Pat. No. 5,130,909 to Gross, entitled Emergency Lighting Strip and U.S. Pat. No. 4,597,033 to Meggs et al., entitled Flexible Elongated Lighting System. Such strips are utilized in a variety of indoor and outdoor configurations such as emergency pathway markers, exit door indicators and ornamental lighting arrangements. The LEDs are being used as outline markers where the lighting strips are the object to be seen. It is not the purpose of the lighting strips to project light on other objects to make them visible. In other applications, where lighting distributed evenly along an area is required, these strips are placed at an edge. No attempt is made at obtaining an even illumination outward from the edge to the area perpendicular to the long dimension.

LED lamps and ballast systems can reduce maintenance costs due to an average rated life of 100,000 hours. This is five to eight times the typical service life of conventional fluorescent and metal halide lamps. The present system is especially well suited for applications where relamping is difficult or expensive.

U.S. Pat. No. 6,346,777 issued Feb. 12, 2002 to Kim teaches an illuminating lamp assembly. An LED lamp apparatus comprises a plurality of LED lamps including at least one LED chip mounted on a Printed Circuit Board (PCB), on which a driver circuit and/or a control circuit are provided in a printed circuit pattern to drive and/or control the LED chip. The device is independent of the lighting application and is simply a lamp not a lamp and fixture combination.

U.S. Pat. No. 5,018,290 issued May 28, 1991 to Kozek et al. Teaches an exit sign with a plurality of low voltage incandescent lamps mounted on a PCB to provide illumination from within a housing. There is no combination of different light source characteristics to build a new combined light source characteristic and this is a lamp replacement not a LF fit for general illumination.

U.S. Pat. No. 5,577,832 to Lodhie one of the originators of the use of LEDs for illumination, describes a multilayer LED assembly which is used as a replacement light for equipment used in manufacturing environments. On each layer of the multi-layer assembly, there are multiple LEDs which are mounted perpendicular to a base. The base is used to provide electrical and mechanical connection to a socket. The LED assembly may utilize multiple layers of LEDs, with each layer itself having multiple LEDs. The LEDs in each layer are mounted in a direction perpendicular to the base which results in light emanating in a direction perpendicular to the base. The LED assembly is used as a replacement lamp for equipment used in manufacturing environments. There is no attempt to match the light distribution to the task at hand.

U.S. Pat. No. 6,379,022 issued Apr. 30, 2002 to Amerson, et al. titled Auxiliary illuminating device having adjustable color temperature, describes an auxiliary illuminating device that has a least two preset ratios of light adjustable color temperature. The color temperature is adjusted by varying the light output at least two independently adjustable light sources. The light source is an array of at least 2 colors. The light source typically uses at least one set of LED's. The application specifically relates to use in producing correct lighting for photography but does not relate to general illumination so that its control equipment does not correlate the overall illuminance level to the color temperature over the range of illumination nor does its control equipment integrate the aiming function for correct light distribution. Essentially the auxiliary illuminating device is a lamp replacement for a photographic flash lamp.

U.S. Pat. No. 6,340,868, Illumination components, discloses a current control for an LED lighting assembly, where each current-controlled unit is uniquely addressable and capable of receiving illumination color information on a computer lighting network. The teachings of the above patent are incorporated herein by reference. Although this patent discloses how to construct controllable illumination light systems this patent does not relate to the concept of control within the parameters of accurate light distribution and correct lighting practice.

In U.S. Pat. No. 6,498,440 Stam, et al. incorporated herein by reference, describes a lamp assembly incorporating optical feedback to produce an illuminator assembly that is capable of utilizing a plurality of light sources to produce a desired resultant hue. The assembly includes a processor, a memory, a plurality of light sources and a detector. The memory is coupled to the processor and stores data and information. Each of the plurality of light sources are coupled to the processor and produce a different color. The processor is capable of independently controlling the intensity of each light source so as to produce a desired resultant hue. The detector is also coupled to the processor. The detector provides the processor with information which the processor utilizes in determining how to adjust the intensity of each of the light sources to provide the desired resultant hue.

In an earlier patent U.S. Pat. No. 5,803,579 titled: Illuminator assembly incorporating LEDs, by Turnbull, incorporated herein by reference, the different color LEDs light output is coincident in such a manner that this overlapped and mixed illumination forms a metameric white color and has sufficient intensity and color rendering qualities to be an effective illuminator. Electronic circuits for control of the independent light sources consist of microprocessor controlled adjustable current sources.

United States Patent Application 20020130326 issued to Tamura et al., incorporated herein by reference, describes a lighting device that includes a plurality of LEDs arranged in an at least two-dimensionally dispersed manner; a transparent resin layer that covers the plurality of LEDs in an integrated form; a photo-detecting unit that detects an intensity of light emitted from the plurality of LEDs using a photodetector and a power supply circuit unit that controls driving of the plurality of LEDs based on a detection output from the photo-detecting unit. The purpose is to have a predetermined balance of light intensities of the colors according to an output detected as to each color by the photo-detecting unit. This device does not integrally cover the light distribution function within and does not correlate the lighting spectrum with the light intensity. It also does not provide a method to handle color shift over the lifetime of the illuminating device.

In U.S. Pat. No. 6,528,954 a light bulb is provided which may include a housing, an illumination source, disposed in the housing, and a processor, disposed in the housing, for controlling the illumination source. The housing may be configured to fit a conventional light fixture. The processor may control the intensity or the color of the illumination source. The housing may also house a transmitter and/or receiver. Although this device includes the desirable communications control aspect, this device does not relate to a multi-light source capability which allows for the smooth variation lighting and its even distribution.

In the prior-art approach, the LED manufacture and the power supply manufacture are separate units. Typically, one power supply is good for a certain number of LEDs. This is similar to the historical lamp and ballast segregation that came about probably because one manufacturer was working with glass and the other with copper. Electronic light sources are semiconductor components as are the power supply components. A unique opportunity for integration exists in solid-state luminaire design which has not being taken advantage of.

In many energy conserving multi resident stairwell lighting systems the lights are typically activated by pressing a button in the hallway or in each apartment. This requires special wiring between the switches and the central controller. In many other stairwells and hallways, the lighting is always left on wasting energy. With long life LED lamps, a low energy distributed lighting solution could always be on for orientation purposes and would only turn on to full output when activity levels require the lights turning on, using integral optoelectronic motion detectors.

A home lighting fixture is often left on at full power when really only lighting for orientation purposes is required. A light switch on the wall is provided and sometimes this has a dimmer option. An electronic power supply with programmable electronic controller with communication over a dedicated data line or alternately over the power line or alternately wireless is also possible in present art such as with the DALI (Digital Addressable Lighting Interface) protocol. With digital signals, power supplies become individually addressable compared to analog systems where only circuits are addressable. Additionally, DALI allows for bi-directional communication between the power supply and control. DALI also brings the capability of broadcast messaging to ballasts. With DALI or any other protocol much more than dimming can be effected. Control of spectrum, occupancy sensor controls and specific spatial intensity distributions can be modified. However, the present-day lamp or fixture is not designed to fully and efficiently take advantage of these new control capabilities.

In United States Patent Application 20100302779 by Chemel titled Fixture with Replaceable Light Bars he describes an intelligent LED-based lighting system. The LED based lighting systems may include fixtures with one or more of rotatable LED light bars, integrated sensors, onboard intelligence to receive signals from the LED light bars and control the LED light bars. In this system while an adjustable system of moving bars is illustrated so that the LED luminaire can retrofit a variety of older discharge lamp-based luminaires, advantage has not been taken of the multiplicity of light sources to obtain a superior light distribution lighting solution that is now obtainable with multiple sources.

Spero in United States Patent Application 20040105264 describes the design of a multiple light source system using unique placements of the LEDs on the structure of a lighting fixture to generate an application specific light distribution pattern capable of providing recommended illuminance levels. The lighting fixture has means for being affixed within a living space to be illuminated in a unique orientation in relation to the surfaces therein. Subsequently, the lighting fixture is designed by positioning LED light sources thereon that emanate light in direction and intensity as required by the lighting application. The geometric layout is determined by using knowledge of the distances and angles from the light sources to the living-space surfaces as dictated by the inverse square law and Lambert's Cosine Law of Incidence. The combination of the unique placement of the LEDs on the lighting fixture and the unique orientation of the fixture in the living space results in the predetermined illuminance being obtained on the room surfaces. A problem with this technique can arise in non-standard illumination instances which may be the majority of lighting applications. For example, in industrial plant lighting, such as in open chemical processing facilities or where there are desks, shelves, machinery or other elements requiring an unpredictable light distribution. Much energy is wasted in these facilities with the wasted light often contributing to light pollution.

In another embodiment Spero describes a solution to this problem where an overabundance of LEDs are deployed on the fixture structure giving it the ability to illuminate in all directions at required intensities. The controller of the LEDs is coupled to a camera which analyzes surfaces and usage within the living space and adjusts the lighting accordingly. While the design is highly flexible it requires an over capacity of LEDs and the cost of driver and light sources would be high.

People need light for the performance of visual tasks, its aesthetic value or security. Light generated but not used by people is wasted energy, money and causes air and light pollution. Standard lighting fixtures, even those that are somewhat area based, such as a low bay or bedroom luminaire, because of the different object and usages within the area, either provide too much light and are wasteful or provide insufficient lighting inhibiting visual performance. Therefore, it would be beneficial to have a lighting fixture that is further configurable to meet the demands of the actual lighting application where it has been installed. In addition, it would be beneficial if the lighting fixture was responsive in real time to the lighting needs at that moment. It is no longer necessary to have fixtures providing illumination where there is nothing to be seen.

Thus, there is a need for a lighting fixture having provision for the differentiation over space and time of the light's intensity and color that could be set-up in the field and/or adjusted in real-time to the changing lighting requirements. Such an exigency-based fixture would provide correct illuminance in terms of chromaticity, homogeneous or aesthetic lighting generally and task lighting locally for the visual tasks at hand.

Prior art lighting practice utilizes an apparatus termed a luminaire or Lighting Fixture to provide illumination to indoor and outdoor living spaces, vehicles machinery etc. for the performance of various visual tasks. A luminaire provides features other than just light which may include light distribution, shielding, man-machine-interfaces such as on/off switches, connection to power mains, apparatus for affixation to construction elements and aesthetics. A typical prior art luminaire is comprised of: a replaceable lamp, a lamp holder, wiring, optical control elements such as a reflectors and refractors, fasteners and brackets. In addition, if the lamp has a negative resistance characteristic, then the luminaire includes power control elements such as a ballast. If a light control system is employed also included are elements including relays, logic controllers and communication devices which may be part of an electronic ballast design. All of these elements packaged together constitute a luminaire. In typical present-day luminaire (lighting fixture) practice, a lamp with a mostly radially uniform spatial light distribution is placed within an optical assembly consisting of a reflector and or refractor for the purpose of having the light exit the luminaire in the desired direction and preferred distribution pattern. This is a process that involves cost and inefficiencies in redirecting the light.

Recently solid-state light sources have evolved from indicator lamps into illumination sources. The present art approach is to package these new lamp types into luminaires of the old lamp type with some minor adjustments. This was the case when fluorescents replaced incandescents and when HID replaced fluorescents. The question arises, is this really the best solution as far as functionality and construction are concerned. The question is especially cogent when the fact that solid state light sources are electronic devices with high reliability, long lifetimes and are capable of rapid change over a very wide operating range.

Examples of the inflexible prior-art approach based on today's designs include: lighting is often provided in rooms where daylight contributes significantly to the overall lighting level or in areas near the window but the lighting system is not flexible enough spatially to take advantage of the daylight contribution and reduce power; or the lighting is always on at maximum power irrespective of whether or not there is activity in the room to justify the lighting level.

Even when external dimming controls are provided to the lighting fixture, the color quality of the lighting is deleteriously affected. At a lower lighting level, a warmer color temperature is generally required, and the luminaire lamp color is not adjustable.

Lighting systems are generally based around a lamp source and lighting application. When a new lamp source arrives generally they are placed into present-day lighting luminaire designs which are not optimal for the new light source. LEDs are a light source which have a number of advantages due to relatively long-life expectancy. In the future it is also expected that LEDs will have conversion efficiencies equivalent to those of discharge lamps. Presently however, the high cost of lumen per watt appears to make LEDs uneconomical for most lighting applications. A few applications of which step, stairwell, pathway and emergency lighting are examples require low lighting levels to begin with and thus present at this time a feasible application. An LED light source is well adapted to a number of additional applications. Very often in these additional applications the areas over which the lighting is to be provided are large and bringing electric power to the luminaire is a significant safety and cost consideration. An inherently low voltage light source such as an LED is suitable for use with safe 12 or 24 volt of a distributed power system with low current demands. The control of the light distribution, especially the beam cut-off necessary at low light levels to prevent discomfort, is well suited to the high directionality of the small LED light source. Maintenance of prior-art luminaires in outdoor applications and the requirement for watertight resealing increases fixture cost and complexity. Robustness of luminaires is another requirement as they located on ground level endangered by passersby contact or vandalism.

In prior art lighting fixture construction, the lamp, reflector, socket and ballast are separate units. Foremost, the lamp must be replaceable and thus access provided, because the lamp lifetime is less than other components in the fixture. The reflector is large, to envelope the light source and provide ray control, and is manufactured of special, highly reflective, material. The power-conditioning device such as a core and coil ballast or more recently electronic power transistor components differs again from the glass lamp, reflector and fixture material. The dissimilarity of the manufacturing technologies, operating lifetimes and materials results in a multi-component fixture assembly held together by fasteners which don't lend themselves to mass production and the luminaires are not factory sealed for life.

Objectives of the Invention

The present invention provides a unique approach to solid-state illuminating devices that is a departure from conventional prior art LED lighting practice. Prior-Art LED lighting technology manufacturers have been taking LED junctions and packaging them in ever more-powerful configurations to carry out the function of lamps. These LED lamps are teamed with reflectors and/or refractors similar to the techniques practiced with standard lamps or put on strips which is just another way of distributing the light over the area to be illuminated. This invention comprises a different approach which is to provide the end user with the most correct lighting solution not a new technology lamp to replace the old one. The present invention comprises a novel multi-light source approach to the design and construction of solid-state lighting fixtures (vs. solid-state lamps), which is termed a "Digital Lighting Fixture", due to the control of individual lighting element "digits" to provide the "correct" lighting solution for the situation at hand.

The invention embraces LED-illuminating devices covering a wide scope of applications including a room light and step light design as well as the general method for designing solid state luminaires from ground up from indoor to outdoor use in residences, factories, stores stadiums and streets. The general concept allows anyone to build a lighting fixture from the ground up, tailor made to the final application rather than building a fixture around a common lamp. This is because it difficult to control the high temperature processes of incandescent and discharge lamps. In addition, it takes a tremendous amount of investment in tooling to manufacture an incandescent, fluorescent or HID lamp. Electronic components on the other hand are made of large quantities of discrete components which are masked or robotically placed on to substrates. These smaller building blocks can then be easily configured per specific applications.

This disclosure also teaches that when it comes to solid-state lighting big is not necessarily better. The approach of LED manufacturers trying to get into the lighting business by attempting to replicate the effect of present day lamps has been to make large, high current capacity, high lumen output electroluminescent junctions having marginally acceptable lighting characteristics. Lumileds Luxeon® DS25 Emitter running at 350 mA is an example of such an approach. In a few years manufacturers have raised currents from 50 mA to above 500 mA, at the time of this writing. These advances are certainly favorable at reducing costs and making LEDs a practical light source but attempting to get 1000 lumen (equivalent to a 60 W incandescent lamp) is not necessarily the best path to take, especially if it comes at the price of light conversion or distribution efficiency. In contrast to a prior art, single large, lamp replacement like light source, the present invention provides multiple, small sized sources of differing characteristics such that the effect of the whole is greater than the sum of the individual parts. The determining size factor then becomes when is there a sufficient progression of values varying by minute degrees or continuum so as be non-discernable or irrelevant to the user. That is, LEDs are generally of a single wavelength (color, frequency), have small optics close in to the individual light sources since they operate coolly, and have stable conversion efficiency over a wide range of currents and light output. The added controllability offered by breaking the total light output up into discrete ("digital") specifically aimable and dimmable elements which can be addressed by control electronics to effect intensity, spectrum and spatial distribution of intensity and spectrum, yields a lighting fixture (vs. lamp) of unparalleled performance. Unique to this patent is the approach. It is the approach of a lighting manufacturer who provides lighting solutions versus that of a lamp manufacturer who produces a generic lamp.

The advance over prior art is a solid-state light source with increased: 1. Efficiency—more effective lumen per watt electricity. 2. Durability—physical strength, life expectancy, lumen maintenance and spectral stability. 3. Lighting quality—as related to visual comfort and "atmosphere". 4. Functionality—ability to control the light placement, intensity and color temperature and do so as needed. 5. Energy savings 6. Lower overall lifecycle cost Integrating the light source with power conditioning electronics, control circuitry and sensors gives additional cost benefits and functionality including: 1. Mass production capability 2. Sealed-for-life fixture 3. Exact optical performance less spill light 4. Compact design 5. Feedback control and recalibrated color consistency over the device lifetime 6. Real-time lighting needs adaptability.

Therefore, it would be advantageous to have a luminaire that require no maintenance, has smoothly controllable light output in terms of intensity, spectra, spatial distribution, is robust, mass-producible as a single unit, factory sealed against the elements, is self-calibrating over its lifetime, is adaptable to changing requirements, works on high or low voltage, has an affixation apparatus and is aesthetic.

Further Objectives of the Invention

The objectives of the present invention are (among others) to overcome the deficiencies in the prior art and effect the following: Light is generated only when, where and in the proper amount and color that can best be used by people or is their personal preference. This will save wasted energy, money and air and light pollution while increasing visual performance and comfort. An exigency-based lighting fixture is presented that provides correct illuminance in terms of chromaticity, homogeneous or aesthetic lighting generally and task lighting locally for the visual tasks at hand while preserving high visual comfort.

A number of unique illuminating device embodiments are achievable using the basic elements presented above. A few examples presented in the disclosure include: (1) an industrial lighting fixture for use in chemical and process plants where lighting that normally spills out of the existing structure as wasted light, is not produced to begin with; (2) a bedroom luminaire where normal activity and night-light lighting levels are provided as well as the ability to provide individualized lighting to each person; (3) Living room lighting with provision of modes for typical uses such as television viewing, reading with the provision of radiant spot heating based on the users unique location and usage at that instant in time; (4) A therapeutic luminaire designed to use illumination and irradiation on persons to alter biological disorders or schedule sleep or awakening; (5) a luminaire for emergency and security forces having a non-readiness situation intensity and chromacity and second high-readiness situation setting of a unique intensity and/or chromacity, where the unique chromacity does not damage the biological visual purple pigment of the retina that is responsible for enabling night vision. It thus eliminates the time these security forces would need to adjust from normal lighting to low-light night vision conditions; (6) a restaurant luminaire which illuminates foods and/or people in their best light while providing for the correct level and chromacity of ambient lighting for generating the optimal dining atmosphere; (7) A general luminaire which the end user configures themselves in situ to best suit their desired lighting preferences. The field adjusted luminaire comes with the lighting elements and their power supplies but the user re-arranges in particular directions and sets their light output levels and/or chromacity to obtain the preferred output; (8) A do it yourself modular lighting fixture which is a structure capable of receiving light sources over its surface where the user chooses the light source with its chromacity and intensity level. The user builds up the light distribution pattern on their own and connects the sources to the integral modular power supply; (9) A single light engine device for a room or outdoor location with concentrated light output capable of being beamed distances to reflectors or refractors which redirect the light to be more optimally used in a localized area.

The overall objective of these exemplary embodiments is the disclosure of an exigency-based lighting fixture that provides correct or user preferred illuminance in terms of chromaticity, homogeneity, aesthetic considerations over a general area and/or task lighting provided in a small area for the visual tasks at hand. Providing illumination only where, how and when it is needed to efficiently carry out visual tasks minimizes wasted light thus minimizing energy use for lighting. To achieve this efficiency goal there is a need for a lighting fixture having provision for 1) the differentiation over space and time of its light intensity and color 2) that can be set-up in the field and/or 3) adjusted in real-time to changing lighting requirements.

While these objectives should not be understood to limit the teachings of the present invention, in general these objectives are achieved in part or in whole by the disclosed invention that is presented in the following sections. One skilled in the art will no doubt be able to select aspects of the present invention as disclosed to affect any combination of the objectives described above.

SUMMARY OF THE INVENTION

A lighting device incorporates one or more discrete light sources and their ancillary optical and electrical control equipment in an integrated illuminating element. The overall lighting effect is the result of the combination of these multiple sources, detector and control components operating together. Preferably, the power conditioning circuitry, light sources, logic control circuitry, sensors and optical elements are packaged together in one integral device. The system contrives a lighting device which replaces the present day multi-component lighting fixtures or luminaires including: the lamp; optical light control element/s such as reflector, refractor and shade; power conditioning devices such as a ballast; control equipment such as switch, dimmer, and timer. Detectors, emitters and sensors for light intensity, spectrum, temperature etc. such as photodiodes, photocells thermocouples etc. are provided. These provide data input to the controller, allow feedback and enable recalibration. An additional apparatus that conducts electric power along length, as electrical wiring, may be added to the system to provide further unitization. The integral lighting element is packaged in the shape of a globe, hemisphere, disc or strip and is designed to quick connect to the electric power carrying conductors. Provision is made for mechanical affixation to a structural surface. In the present concept over the life time of the fixture there is no lamp replacement only fixture replacement. It's assumed that after 100,000 hours it is time to change the fixture.

The method of creating a luminaire adapted to the usage and surroundings in which the luminaire will be integrated is disclosed. The process includes determining: the correct lighting practice for the application; the surroundings; the selection and placement of light sources and their integration with the mechanical support and; electronic control elements to realize the objective.

The present invention also relates to lighting fixtures comprised of many directional light sources that are mounted with different aimings so as to correctly illuminate an area. The LED light sources are moveable so that they can be adjusted to best illuminate the area where the luminaire has actually been installed. In addition, they may be controllable by a microprocessor as to the light intensity and color so as to best assist people to see what they are doing at that moment, be it reading a book, watching TV or assembling an automobile. The lighting fixture is equipped with a "smart" camera (similar to a cell phone's processor controlled digital camera) which inputs data on the lighting, occupants and current conditions within the room. The result of this added sophistication is that electricity is spent on generating only useful light. The energy savings greatly reduces electricity costs and environmental impact.

The present invention more specifically relates to lighting fixtures whose spatial light distribution and/or spectral power distribution is capable of being adapted, either manually or automatically, to provide the illumination needed in that specific surrounding and at that specific time. The Field Adjustable Multiple-Light-Source Luminaire, FAML, is thus a universal product that can be tailored onsite so as to provide design illuminance and color spectrum to the relevant surfaces in the specific lighting installation. Thus, a preferred embodiment of the invention is a lighting fixture comprised of many light sources which can be separately aimed and powered so as to illuminate areas or objects in a room or outdoors in a most correct, efficient and comfortable manner.

To affect this directional lighting versatility, in a preferred embodiment the luminaire is comprised of many directional light sources that can be re-positioned so as to illuminate in different directions. The light sources at a particular aiming may all be one color, say white or may be of different colors which when combined together yield a different colored light beam. Altering the radiated power of one color light source versus the other allows for the creation of light in a myriad of colors. The luminaire has some light sources at the same aiming and others at different aimings and may come in a standard configuration for the general type of lighting application from the factory. Upon installation, if the factory preset lighting distribution does not fit the actual surroundings, the installer will customize the configuration by adjusting the light source aimings and light intensity output such that the correct amount of light is supplied to where it is needed while not at all or minimally illuminating areas where it is not needed. The installer will also make provision for the existence of other lighting fixture in the same or adjacent areas. When light is provided at higher angles and glare would result from the LED light source being visible, the light is not wasted by covering it with a shade or passing the light through a diffuser thereby losing the directionality and light flux due to absorption. Instead taking advantage of the small étendue of the light source, an optical spreader is used to increase the area from where the light is exiting thus lowering the luminous exitance while maintaining directionality.

To effect the provision of lighting that is in concert with the actual illumination needs at a given time, in an embodiment of the FAML, a camera serves as a sensor capable of detecting light, color and contents of the living space. The fixture is equipped with a logical controller. Using computer vision technology to recognize people, objects and surroundings the lighting fixture can provide the lighting requirements needed in the room at that moment in time. The computer vision system has been taught to recognize different visual tasks such as an individual operating a machine, reading a book or watching TV. The logical controller has instruction sets as to what color lighting at what intensity is preferable for that specific visual task. Thus if no one is in the room the lighting is off or a dimmed, aesthetic lighting is provided for the good feeling of those looking in. When people enter the room, immediately general room lighting is turned on and following that, specific task lighting is provided and adjusted to the right level and color based on where they are in the room and what they are doing.

An automatic embodiment of the FAML would include motion control elements for the light sources. Coupled with the camera and logical controller, the light distribution is altered automatically as required by changes in the physical surroundings, people or environment. In a similar fashion to how a preprogrammed moving head stage light follows the performer about the stage the FAML logical controller will automatically locate the person in the room and provide locally the lighting needed for the performance of visual tasks. To save energy, the rest of the room will then be illuminated at a lower, yet comfortable lighting level.

BRIEF DESCRIPTION OF THE DRAWINGS

FIG. 2A is prior-art design and FIG. 2B an illustration of a preferred embodiment of this invention of a retrofit LED lamp illuminator while FIG. 2C is a side view of an embodiment of this invention using a PCB provided with standard 5 mm hole-through LEDs.

FIG. 4 is an illustration of a Surface or Railing Mounted Digital Lighting Fixture.

FIGS. 13A through 13C depict a streetlight fixture designed according to the teachings of this invention.

FIG. 16 is an illustration of an anti-glare system using the multiple light source headlamp.

FIG. 19 is a perspective view of a light guide;

FIG. 20A and FIG. 20B are perspective view of basic embodiments of the present invention;

FIG. 27 is a perspective view of a field adjustable multiple light source lighting fixture;

FIG. 28A and FIG. 28B is a perspective view of satellite light source from the side and from the front respectively;

DETAILED DESCRIPTION

Figure 1:
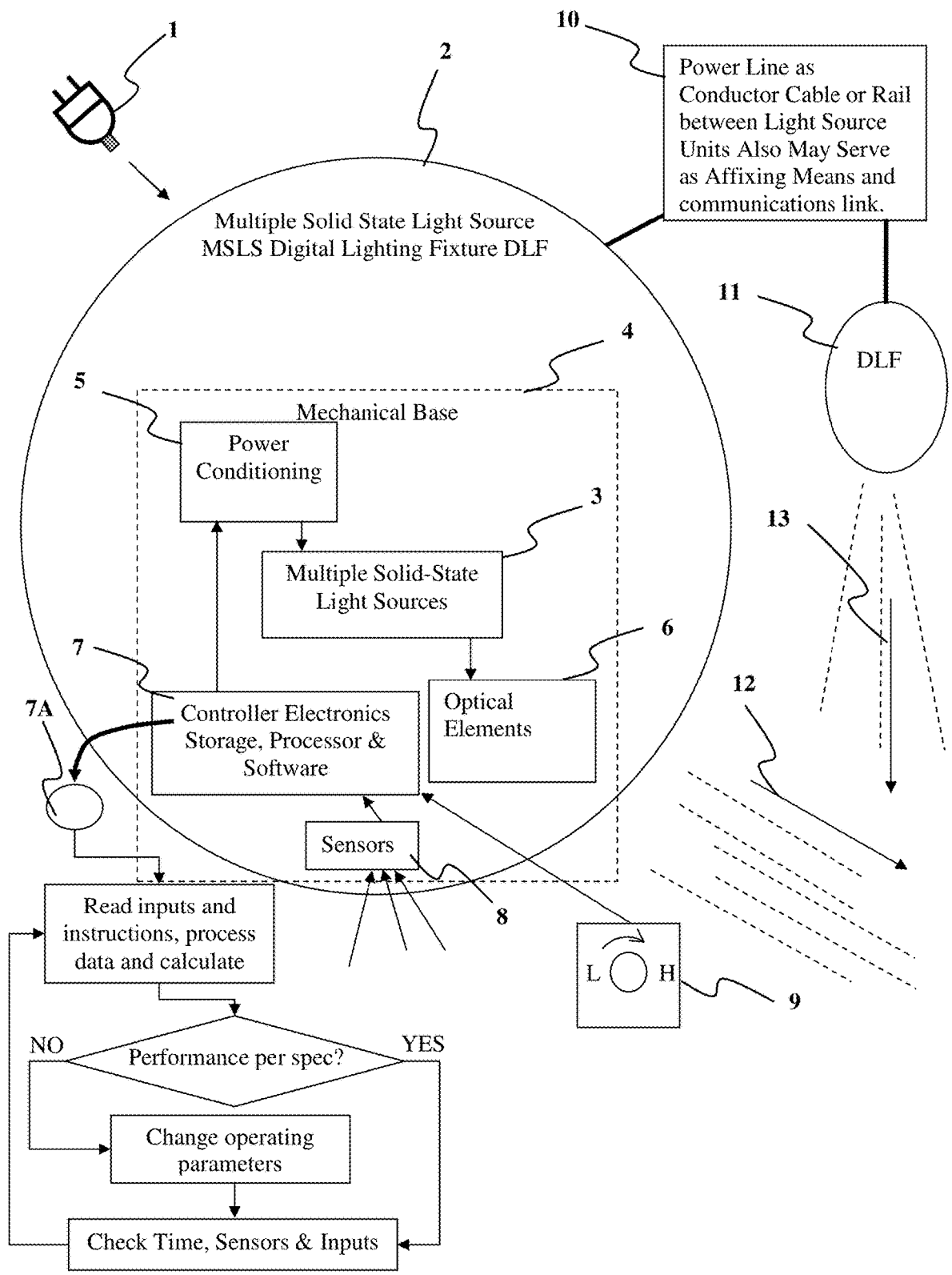
FIG. 1 represents a block diagram of the elements making up a Digital Lighting Fixture system.

The system is built around a "digital" light source. That is, the emanating lighting effect is the sum of the characteristics of a multiplicity of discretely controllable "digit" sources. The difference between the individual "digit" light sources and their summation manifests itself in the resultant light characteristic, be in its intensity, spatial intensity distribution, spectral energy content and spectral intensity distribution. All of these characteristics are also variable with time. A light source for this purpose may be electroluminescent such as a Light Emitting Diode (LED) junction, Organic Light Emitting Diode (OLED) or carbon-related field emission devices such as a nanotube-phosphor-combination, HID, fluorescent or even an incandescent source. While a one-source lamp will not have the flexibility to effect the most correct illumination characteristics, such as maintaining correct intensity and color temperature for the lighting task at hand over changing environmental conditions, two or more differentiated sources will have an increased operating range. This flexibility is useful as for example in a multi-source luminaire with spatially differentiated dimming capability used in an office lighting application. In a normal day's operation, such as in a windowed room between peak daylight and nighttime hours, the intensity and color temperature of the light varies greatly over different portions of the room. The smooth variation possible with many light sources ("digits") vs. one light source offers superior flexibility in providing the actual lighting needs. Therefore, the illuminating device may be described as a "digital" light source or as a Multiple Solid-state Light Source (MSLS), comprising many "digits", SLSs, and essentially replaces the lamp of present-day luminaires.

As used herein, the term "light source", LED or "solid state light source" means any system that is capable of receiving an electrical signal and producing light in response to the signal. Thus, the term "light source" should be understood to include light emitting diodes of all types, light emitting polymers, semiconductor dies that produce or emanate light in response to current, organic LEDs, electroluminescent strips, and other such systems. Incandescent and discharge light sources are also included, and multiples of incandescent and discharge light sources also provide a digital luminaire. In an embodiment, a "light source" may refer to a single light emitting diode package including multiple semiconductor LED dies that are individually controlled.

The term "illuminate" should be understood to refer to the production of a wavelength of radiation by an illumination source. The term "color" should be understood to refer to any wavelength of radiation within a spectrum; that is, a "color," as used herein, should be understood to encompass wavelengths not only of the visible spectrum, but also wavelengths in the infrared and ultraviolet areas of the spectrum, and in other areas of the electromagnetic spectrum.

In designing a multi-light source luminaire, the minimum design criterion for intensity and spectrum differs for each application and is related to the end user who is the ultimate measuring instrument and economic consideration of the light provider. The regularity of the changes in effects is derived from the user's perception. It is generally accepted that the eye cannot discern changes in beam intensity that are smaller than a factor of two to ten and color temperature differences of 200 to 300K. Illumination intensity changes are discernable as a logarithmic function and depend on background illumination levels. For example, illuminating practice allows for hallway lighting to be 20% of room lighting due to rapid eye adaptation. However, the eye is very perceptive of intensity changes when comparing images such as in comparison of gray scales and thus lighting for an art lay-up room must be very even.

A further improvement is where the lamp and lighting fixture function are carried out in one device. In a typical present-day lighting fixture, a lamp with a symmetrical distribution in placed in a reflector to redirect the light, a requirement involving added cost of the reflector and performance inefficiencies. While PAR and other integral reflector lamps exist, they again have a symmetrical distribution in one of the axes and are large due to the high temperature of operation and requirement to distance reflective surfaces due to heat and large light source dimension consideration. Since the solid state or LED lamp is made of cool operating components which have a mechanical base (versus a 1000K gas discharge which is free floating) the LED allows for an integral small sized optical element near the power source. Where the terms optics or optical are mentioned herein, they refer to redirecting light rays through any of the known phenomenon including: reflection, refraction and diffraction. Typically, an LED will come packaged in an optical assembly consisting of a reflector and lens with 8° to 50° spreads being typical. A Surface Mount Device—SMD LED with no optics will still be limited to 180° due to its construction.

A power-conditioning device such as a ballast is required to operate efficient fluorescent and HID light sources but is separate there from in function and physical construction. In the MSLS the power source is electronic as is the control equipment and thus the electric power conditioning circuitry can be integrated with the light source circuitry and packaged as one on a PC board or integrated circuit manufactured in the same way of the same materials. Chip on board and chip on chip technologies are used as a packaging configuration for LED chips as well as power and logic control transistors and other components. Power transistors come packaged in plastic and so do LED junctions only that the LED package is light transmitting and can be formed into a lens. Transistors, molded in a transparent package together with LEDs, may be shielded from undesirably receiving illumination causing base photocurrent, by providing opaque "junction coat" over the transistor die, as is well known in the semiconductor industry. The packaging also lends itself to the same manufacturing methodology such as soldering elements onto a PC board. Both hole through and SMT configurations are presently available for most of the components. This combined unit of compatible, mass producible, apparatus, including the solid-state lamps, their optical assembly, electronic ballast gear and structural fixture equipment, provides a unique Digital Lighting Fixture (DLF) device.

In a preferred embodiment the DLF is provided with an onboard controller. The controller may be a computer board, embedded device, a Digital Signal Processor, etc. In general, the term "logical controller, controller or computer" can be broadly defined to encompass any device having control circuitry or a processor which executes instructions from a memory medium.

A further improvement is the reduction of all electronic and optical components to the chip level. That is, light-emitting junctions may be placed with power electronics in an integrated circuit. For example, combination GaAs LED-JFET technology may be used, the JFETs (junction FETs, acting as control devices for the LEDs. The carrier is made of materials and shaped to carry out optical and or heat transfer functions. Multiple light emitting junctions of similar or differing characteristics, a function of doping and diffusion, are placed with the control circuitry on chips. The VLSI techniques used in digital camera photodiode arrays containing millions of pixels is used to create arrays of light emitting diodes. Actually, reversing the current flow on some photodiodes will cause them to emit light. This is how OLEDs were discovered. OLEDs began in the lab as photovoltaic cells until by error they were driven in reverse. Alternately other die bonding techniques are used to create chip on chip assemblies as is known in the art. Sets of chips with similar or differing characteristics may be geometrically arranged to provide a specific light distribution and color mixing. The total envelope is then a combined lamp, power supply and lighting fixture "luminaire", and is positioned within the room to be illuminated at the design height and position to give a consistent and sufficient lighting to the area under its control. Cooling is effected using natural convection or for air currents from a cooling fan or fluidic cooling using natural or forced circulation.

On the chip and die level further magnitudes of manufacturing and packaging efficiency are realized. The integration can avail itself of other more compact packaging technologies such as chip on board and chip on chip. Assemblies with conductive and non-conductive diebonding using epoxies and eutectic solders used for a variety of semiconductor die types including ASIC's, MEM's, LED's and Sensor's. These may be used on a variety of substrate materials including FR4, Alumina, Metalized Ceramic, Carbon Fiber and Chip on Flex as single die or multiple die arrays for Chip scale packaging/CSP's. Conductors are attached to the dies via Aluminum and Gold wirebonding using both wedge bonding and ball bonding. The manufacture of Multi-chip modules/MCM or Chip scale packages/CSP are also possible and can be ceramic, laminate or PCB based. These assemblies can be single or multiple die assemblies with external components making it possible to manufacture all light, sensor, power and control components as a superior integrated device.

The present invention provides an illuminating device which serves as a replacement for the lamp, socket, reflector, electric power control gear, dimmer and mechanical structure of a present-day lighting fixture or luminaire. A semiconductor junction packaged integrally with light controlling components provides a Solid-State Light Source SLS and many together form an MSLS, which when combined with power conditioning, and optionally logic control, communications and affixing elements, provides a DLF. The basis of the invention is the use of a multitude of discrete light emitting sources ("digits") to generate light. The light control elements can be applied on a per junction basis or on a "white" color generating set grouping such as RGB or on a larger set which may be convenient for manufacturing or other color rendering considerations. The requirement for controllability is however, that the SLS output is definitive in relation to spectrum and spatial distribution.

The discrete light emitting elements by operating and not operating, at full power or at a fraction of, either partially or in unison, generate light with optimal intensity, spectral distribution, and spatial distribution of intensity and spectral distribution for the viewing task at hand. This is accomplished without recourse to separate (exterior to the DLF) reflectors to redirect the light, filters to alter color, shades to control glare or dimmers to control intensity. An example of light source used in a DLF would be an electroluminescent semi-conducting material an example of which is a LED. Such a source is characterized relative to a standard incandescent lamp by its small dimensions, low voltage, low current, monochromatic spectrum, high resistance to physical shock, high directionality of the light output, and at the present, relatively high cost. In addition, the intensity of the light output over a defined range is a function of the current and within limits may be varied by orders of magnitude without deleteriously affecting the efficiency or lifetime of the LED.

Although the light production of a typical 5 mm, 50 mA maximum rated, LED of between 1 to 2 lumen is much too low to be of any practical use for illumination, the combined output of a few to hundreds to thousands of LED's is quite significant. Higher current LEDs are now being introduced which operate at 350 mA and provide 20 to 30 lumen. This however, is still is highly impractical for use in lighting a room when compared to a 100 watt incandescent lamp of 1700 lumen. Based on progress to date it is expected that LEDs will reach comparative lumen per Watt efficiencies of 60 to 120 l/W as found in gaseous discharge lamps. This invention relates to technologies which are feasible at the present state of the art 1/W as well as those which will become feasible in the future.

A "light bulb" of the present invention is comprised of a multitude of LED's where each LED or group of LEDs may be of the same or different wavelength, (color—where said wavelength may be mono or multi-chromatic), light output, spatial distribution and operating frequency (as when an alternating signal is used or it is multiplexed). The light from an LED or group of LEDs of red color operating with an LED of blue and green color impinging on an object would appear to the viewer as "white light". By varying the number and/or light power output of a specific color LED or group of LEDs relative to the others, a different intensity and color temperature of light with a "warm" or "cool" appearance may be effected. "White" LEDs can also be used in the invention alone or with other monochromatic LEDs. A white LED comprises an emitter in the blue spectrum covered with a phosphor which fluoresces in yellow such that the combined output appears white. White LEDs come in various angular light distribution patterns and color temperature variations. White LEDs can also be combined to vary intensity and spectrum. In the preferred embodiments, "white" LEDs are not used, as the use of phosphor adds unnecessary conversion inefficiencies and output degradation with time. The ability to correct for color shift over the DLF lifetime with white LEDs is limited. However, the present invention includes the use of white or other multi-spectrum light sources.

Presently the efficiency of many types of LED's (the chemical make-up of the junction differs between colors) is high relative to incandescent but low relative to discharge lamps. However, the theoretical efficiency is quite high, and the inefficiencies have to do with getting the light out between the junction and heat dissipation considerations. Expressed in lumens per watt LED's may produce up to 30 lumen/W versus 100 l/W for a discharge lamp and 18 l/W for an incandescent lamp. In the preferred embodiment, a highly efficient constant current power source is used to drive the LED's where the electronic circuit is a series connection of the discrete LED light sources. The open failure of an LED or series of LEDs which would interrupt the circuit is circumvented by the use of Zener diodes, placed such that the functionality of the lamp would not be seriously affected. The constant current power source has the advantage that different LEDs, of different forward voltage drops, from different manufacturing runs or chemical composition, may be operated together. Alternately, power circuits available in the literature for driving the LEDs are used as published in technical notes by manufactures such as Agilent®.

The life expectancy of an LED can be expected to be as high as 240,000 hours between failure. Due to light degradation over time average lifetime is normally rated at 100,000 hours. At best an incandescent's rated life may be 2,000 hours and that of a fluorescent, 20,000 hours. However, the LED operated in a circuit would have only the reliability of the circuit and MTBF divided by the number of series connected LED'S. A printed circuit board with the LED's alternately connected to separate circuits with redundant access to the power sources and with the use of Zener diodes every so many LED's to circumvent any failed sections could operate directly off of the 120/240V line. Any voltage AC or DC from 4V up to 480V is practical. The LED's of the hole —thru or SMT type would be soldered in place or the LED's connected leg to leg without using a PC board.

The LED's are mounted flat in rectangular patterns or in concentric circles or on or within holes situated on geometrically curved surfaces such as on a sphere or hemisphere of round, parabolic or elliptical shape according to the desired candle power distribution pattern. The LEDs can be mounted perpendicularly to the geometric fixture surfaces or at any other angle. When mounted perpendicularly the surface, geometry is dictated by the light distribution pattern and the LED photometrics. This is the generally assumed design case in this disclosure. However, any geometry is possible with the non-perpendicular mounting of the light sources. A flexible PC board is manufactured in the flat and then "origami" style cutouts are made allowing the PCB to be bent and shaped into the preferred form. LEDs are insertable into holes made in plastic or metal forms to secure the LEDs in the correct location at the correct aiming.

For fluorescent lamp retrofit applications, the MSLS "luminaire" would be linear with LED's mounted all around the circumference or predominantly downwards for whichever lighting effect is desired. While a fluorescent's light distribution is usually not controlled in the longitudinal direction (the reflector can't get around the long dimension of the lamp) the LED version would be spatially directed so as to give uniform light. In comparison to a fluorescent lamp, where the light is produced equally in all directions irrespective of the final distribution pattern required in the room, the DLF has the advantage of producing light directed only where it's needed. The number of SLS aimed in a specific direction at the time of manufacture is such that the proportion and angle of the light going to the ceiling and floor are calculated to produce the desired result. Louvers and reflectors are unnecessary to prevent glare or redirect the light. Up to 40% to 60% of the light produced in a fluorescent fixture goes to waste due to these considerations.

In other embodiments of a linear fluorescent replacement SLS lamp "luminaire", the position regarding the nadir (floor) of the rows of SLS are adjustable. One or more SLS strips are free to move in an arc about a long axis such that they are aimed for uplight or down light. Apparatus is provided to fix the re-positioned SLS in place. Markers along the arc can delineate the angle. Thus, the installer can adjust the amount of up-light, down-light and floor coverage in the field, (markings on the fixture would indicate standard settings) just as an adjustable reflector changes luminaire light distribution. Here again, the difference is that there are no reflector-induced inefficiencies because of operation away from the ideal design point.

A pear-shaped globe "luminaire" studded with LED's projecting light outward from the surface would give both down-light and up-light with more projection surface towards the down-light side in a typical 1 to 3 recommended ratio. Most buildings, rooms or areas to be illuminated are of a rectangular shape. The LED's on the DLF are concentrated at the 90-degree intervals. This yields a more square lighting pattern to ensure equivalent lighting in all areas of the room including the corners. This is in contrast to the chronic lack of even coverage obtained from the circular light pattern of present day light bulbs or most luminaires. At best these prior-art lamps give a circular light distribution which requires overlapping to ensure complete coverage of the area with the overlap lighting levels in wasteful excess of the requirements. A position oriented MSLS lamp has a greater concentration of LED's aimed at 90° intervals so that more light energy is directed into the far-off corners of a room to give an even illumination throughout the rectangular or square shaped area. A DLF is made with square, rectangular and even rounded light distribution if the application requires.

Typically, an incandescent or HID lamp is used in conjunction with a reflector to redirect the light to obtain a desired light pattern where more of the light is directed where it is most useful. A luminaire for area lighting will have a "bat wing" candlepower light distribution pattern, which yields equal horizontal illumination on a surface as it compensates for the "inverse square law" (a function of the cosine of the angle and the distance squared from the source). Generally, such an optical assembly has efficiency less than 80% due to losses on the reflector's surfaces. The MSLS needs no reflector to redistribute the light since each discrete SLS "digit" is aimed such that the candle power intensity varies with angle as is needed to give the optimum illumination on the room work surfaces for a given mounting height. The MSLS lamp distribution is pre-designed according to typical house or office settings. Thus, there is no need for a reflector to redirect the light and its consequent inefficiencies in order to obtain a "bat wing" distribution. The present approach by LED manufacturers is to provide single high output LEDs with optics yielding a "batwing" distribution. These batwings are usually less than optimal and are circular. The "digital" approach of this invention would yield a finer control and thus a more accurate batwing, generating a more even distribution in a rectangular/square vs. circular pattern.

In a DLF it is possible to combine a task light having a very narrow "spot" beam at the correct aiming with a general area lighting "flood" beam into one fixture. The digital lighting fixture is positioned according to recommended lighting practice near a workstation and correctly oriented such that the DLF gives a wide (though still controlled, so as not to cause glare on a computer display) general illumination distribution as well as a narrow distribution aimed at the desktop for high intensity task lighting. In a preferred embodiment a positionable task lighting spotlight located on a section of the DLF can be aimed manually or by servomotor to project onto the work area.

In another example of prior art practice, a table lamp for reading is provided with a shade. The shade is there to partially redirect the light onto the book and also prevent direct, glaring, rays from the lamp used for general lighting from reaching the reader's eyes. According to the present invention, instead of having a glaring lamp producing light which is then made non-glaring by a shade at a loss in excess of 50% the LF is built such the amounts of light directed downward at useful angles and the amount of light directed upward are in the correct ratio. The surface area, from which discomfort-glare causing rays exit, is designed such that the luminous exitance is within recommended UGR levels for home use. The fixture has no need for a shade to protect from glare; the glare was never produced at those angles to begin with due to proper geometric design. To get the desired luminous exitance expressed in terms of lumen per sq. meter or luminance in terms of candela per sq. meter, the light exiting the source of specific intensity at angles which normally reach the room occupant's eyes, is spread over an area such that the exiting light is non-glaring. These lighting design parameters serve as the product specification and are incorporated into the initial design. There is no need to add on components to achieve correct lighting.

In MSLS technology an antique style table lamp uses a MSLS "bulb" specifically designed for the application, there is no need for an additional shade other than for aesthetics. The shade is a decorative element which diffuses a small amount of light for the rustic effect. The small amount of light which would be directed between 70° to 150° (the glare zone) would cause as little discomfort glare as that which is obtained from a shaded incandescent lamp but without the waste. This is done by sizing the area and intensity of the light source responsible for providing light at those angles such that the luminous exitance from the surface is within acceptable non-glaring luminance values. If desired, uplight to the ceiling above the glare zone is provided with light sources projecting between 150° to 180°. To maintain the aesthetics that people are used to or for the good feeling, a shade may be placed over the "digital" table lamp. A few LEDs can be dedicated for the purpose of illuminating the shade, either by projecting thru the shade and diffusing the light or projecting the LEDs into the shade as in a light guide. Colored LEDs could make the shade look yellow, pink or blue as preferred and programmed by the user.

The dimming capability of the MSLS is quite dramatic. A typical LED of today such as an Agilent® HLMP25-ED-xxxx will produce light at a tenth of a milli-Ampere and may be operated up to 50 mA. At 0.1 mA it may produce 5 milli-lumen while at 50 mA over 1000 ml. This is a hundredfold range. Another radiation output control technique is to provide pulsed power in place of constant current. LEDS are operated on DC as well as pulse power and current as well as timing in terms of duty cycle, pulse width and other signal modulations are useable by the controller to effect intensity changes.

Correct lighting doesn't only include an even light distribution and a lack of glare but a list of other factors including intensity, warmth and color rendering. Experiments have shown (IES Lighting Handbook 8th edition p. 99) a graph of preferred color temperature of light sources at various illumination levels. The graph specifies a warmer color temperature say 2,500 Kelvin for lighting levels in the 100-lux range and a cooler temperature say 3,500 for 1,000 lux. However, a typical dimming system used in a fluorescent luminaire will lower the lighting level but will not change the color temperature. A DLF of the present invention will change the balance of the different spectrum light sources in order to achieve the correct color temperature for the new lighting level. As far as dimming goes, it possible to get an instantaneous "instant on" from the SLS light source. Thus, with a built in or exterior motion detector, the DLF can be operated at emergency lighting levels, sufficient for orientation, and then immediately power up to full level when someone enters the room. Whereas a fluorescent dimmed to 50% power will give a negative return of only 10% light an LED will generally give a linear if not positive decrease in power with light reduction. Auto-dimming circuits taking sunlight into account have been touted as an energy saving technique.

In another embodiment, the electronic luminaire has a light level detector and automatically adjusts the output to the required level. If the lighting level on only one side of the room is enhanced by the sunlight, directional luminance meters, external or integral to the DLF, detect the imbalance and the controller dims only those SLS oriented to illuminate in the sunlight illuminated direction. This detailed spatial distribution intensity control is not possible with other lamp types.

The MSLS lifetime is long such that there is essentially no need for "lamp" replacement over the life of the DLF luminaire. However, power supply circuit and light source characteristics may vary over time and correct lamp color will deviate from the standard. A feedback control loop using sensors would recalibrate color based on daylight readings over the twenty-year lifetime of the fixture. Thus, a photodiode with an RGB filter is calibrated under natural light conditions. Alternately, discrete wavelength or alternately stable "white", or color, LEDs which are used only for calibration or only operated in a regime where their color is known not to shift are used as the recalibration color standard. This basis serves the dimming system in its color temperature control over its lifetime. The controller is programmed over the lifetime to seek possible recalibration opportunities. These may include using daylight or other artificial light sources available when the LSLS is not producing light. The systems can determine the accuracy of this source partially by comparing it to its previous factory or onsite calibration. Time of day analysis and initial small deviations would allow the system to evaluate whether the source was a reliable standard to use over its lifetime to correct for component color shift.

To ensure higher reliability the MSLS in the preferred embodiment will make use of large-scale integrated circuit technology where the LED junctions, Zeners and other elements are interconnected on, a chip. The chips then mounted into plane surfaces which are flat, rounded or X-hedrons.

The MSLS lifetime is long such that there is essentially no need for "lamp" replacement over the life of the DLF. This requires that the designs of the other electronic components are similarly reliable. The fixture mechanical design is again a significant departure from prior art. The fixture is sealed for life. There are no openings, gaskets, and sockets and there is no need for a mechanism to open the luminaire. All the components can be encapsulated for life to prevent water and dust ingress and thus provide a reliable, maintenance free, weatherproof and hazardous location ready lighting fixture.

The small dimensions of the light sources makes them ideal for use in conjunction with fiber optic light transmission systems. One of the primary requirements of such systems is the ability to collect the generated light into the narrow fibers. The excellent controllability of the light beam and the small source size allows for the generation of high-power narrow non-dispersing beams as would be used in flashlight, searchlight and beacons.

Multiplexing of the lamps is possible for power and lighting effect considerations. Slower duty cycles will reduce energy consumption, increase lifetime and would be used in a number of applications. Aircraft warning beacons which flash is an application, as the on-off cycling of an LED is not harmful to lamp life as it is to an incandescent lamp. Disco lighting-effect lamps are another flashing application. Dimming as well as illumination color can be carried out with both the duty cycle and current being altered.

In summary, as opposed to LED industry trends of going with a single large source, the present invention provides multiple smaller sized sources of differing characteristics such that their combined effect is greater than that which could have been offered by sum of the individual parts operating separately. The added controllability offered by breaking the total light output up into discrete specifically aimable and dimmable elements, "digits", which can be addressed by control electronics to effect intensity, spectrum and distribution, yields a lighting fixture (vs. lamp) of unparalleled performance.

In order to better understand the embodiments and methods of this invention reference is now made to the following figures.

FIG. 1 is a block diagram of the elements which in combination provide a digital lighting fixture (DLF). The DLF serves as a complete luminaire solution including: power conditioning circuitry, control electronics, sensors, mechanical fixture and light source. The DLF replaces the lighting fixture, ballast, socket, lamp, dimmers, reflector, gaskets and fasteners with a sealed for life electronic assembly. An electric power source 1, supplies power at line Voltage 110 to 480V or at low Voltage 12-24 Volt to the DLF 2. The DLF includes more than one light source 3, which is preferably an electroluminescent solid-state light source but may be any other light source, such as incandescent, high intensity discharge, fluorescent, etc. such that the individual characteristics of each lamp's light are combined in operation to achieve a sum of the characteristics presenting a benefit not achievable from a single source alone. The light sources are affixed or contained within a mechanical device 4, which may serve as containment to all of the components and facilitates affixation to building surfaces. The electric power is received in the correct waveform, voltage and current from the power source 1, or is conditioned within the DLF 2, by power conditioning elements and circuitry 5. The direction of light exiting from the DLF as a whole or from each SLS individually is controllable by optical elements 6, such as reflective surfaces and or refractors, and may be electronically variable optical elements.

The separate light sources may be of the same color and intensity characteristic or may have different color and intensity characteristics. Thus, for a 3-stage light bulb equivalent, each of three sources can have the same lumen rating or two sources are used where one is twice the output of the other. In a finely variable, digital embodiment the effect of continuous dimming effect is achieved when the differences in the lighting level is imperceptible to the people in the room. Typically, a 5% change will not be perceived. Thus, with twenty equivalent intensity LEDs as a base (one additional would add less than 5%), additional quanta could be smoothly added, or on the other hand, to in reality perform perceptible dimming (which is the objective) a greater than 5% change should be effected. The same is true for the final spectral color of the light emanating from the DLF to illuminate objects. The eye adds the radiation reaching the eye and cannot perceive the separate components, contrary to the ear's recognition of sounds where each frequency is individually resolved. Therefore, quanta of specific spectral color energy may be added to the mix without perception. For example, changes up to 200 degrees Kelvin in HID lamps are not perceived. Thus, to effect a noticeable color change, a quanta of spectral color power would need to be added or detracted from the sum.

In a preferred embodiment the DLF contains logic control electronics unit 7. Logic control electronics unit, 7, receives input and/or feedback from motion, intensity and/or spectral sensors 8, or from manual control button 9 and increases or decreases or turns on or shuts off the power to one or more of the SLS to effect the desired change. That is, the control logic unit 7 has stored parameters for intensity and spectral distribution and operates the MSLS lamp within the predefined range. The control unit may include a DSP or computer with storage media, computer algorithms, signal input and output electronics, analog to digital converters, and communications elements to carry out intensity, distribution, dimming and color balance control. Computer algorithms and instruction sets 7A are induced by the logical controller to manipulate data, calculate results generate output signals and maintain the operating parameters within the specifications. Measured parameters are checked against the stored parameters and the control circuitry adjusts the power to SLS.

Sensors 8 include any of the following: light, temperature and motion detection devices. Two types of optical detection sensors may be used: A photo detector with specific spectral sensitivity to detect a specific color. For example, a standard red, blue and green set which would then indicate how "white" the light is. Alternately, a wide spectrum photo detector that irrespective of color measures the intensity of each excited die as it is test fired, based on the eye visual sensitivity curve. The optical sensor may be lensed and capable of forming an image, that is a camera and the detector may be a detector array of photodiode pixels. The detector array may be a CMOS or CCD VSLI array and may be monochromatic or color as in a monochromatic or digital camera. Such arrays are readily available in mega-pixel resolution.

With changes in ambient lighting the light sensors detecting conditions at a specific location receive input. The detector instantaneously reads the ambient during a momentary shut off the artificial light source. The momentary shutoff is of short duration, e.g., less than one millisecond duration, at rates undetectable to the users as the eye does not discern flicker rates above ¹⁄₁₀₀th of a second. The controller then readjusts the driving circuitry to the correct power level. The sampling of multiple sensors around the DLF can be simultaneous using buffers in the controller to facilitate analysis by methods known in the art. Alternately, the light sources and coordinated detectors at specific locations are turned off, sampled, turned on again and sampled, to verify that the illumination is within recommended specifications. Interaction between DLFs, located in close proximity to each other, is avoided, by the use of the short-duration momentary shutoff controller readjusting time interval. The probability of simultaneous controller readjustment of two adjacent DLFs is very small. Further, the timer which controls the time between the controller readjusting time intervals, is preferably analog, such that there is very low probability of two DLFs having the same time between controller readjusting intervals.

In a system with feedback, changes in the light source output reflected back to the lamp such as color shift and diminishing flux over time can be compensated for. A typical fluorescent or HID source will experience serious color shift over its 10,000 to 20,000 hour lifetime. It would be a significant advantage to have a 100,000 hour life lamp with color accuracy over the complete lifetime of the lamp.

In a preferred embodiment a re-calibration system will operate as follows. The DLF is provided with a reflective rod or strip the surface of which has a wide spectrum, non-angle of incidence dependency and stable reflection characteristics over time. The reflective rod or strip is positionable so that the rod or strip can reflect light back to the outward facing photodetector based on the DLF body. In another embodiment the DLF is provided with a calibration wand on which inward facing photodetectors are placed. The calibration wand is capable being positioned such that the detectors can detect SLS performance. Both the reflective rod/strip and calibration wand can be narrow such that they can be permanently deployed about the DLF and not block light. In another embodiment the rod, strip or wand is stored and is only deployed when calibration is required. When called upon, the rod, strip or wand is rotated around the DLF to read SLS intensities. Alternately, the DLF body rotates and the rod, strip or wand remains fixed. The DLF is originally calibrated in the factory using external detectors. The spectral output of each SLS is calibrated with the power supply controller over the range of power outputs and the characteristics are stored in a memory device for recall during operation. The calibration wand or reflective rod or strip is then used by the DLF in an internal calibration where the DLF detector's readings at the initial SLS power settings are recorded. These readings become the standard for future calibrations, where the controller will affect the power to individual junctions such that proper intensity and color is produced.

The DLF has a clock unit and/or a communication unit capable of receiving signals from the US government operated "atomic clock" which is located in Colorado. The DLF automatically searches for the signal or once a day it automatically recalibrates its time. On a periodic basis after degradation is assumed to be significant, the controller 7 invokes the calibration routine.

In another preferred embodiment the DLF surroundings are used for calibration in place of the calibration strip. A short time following installation, (after the furniture and decor has settled down), an onsite calibration is scheduled and run at the first opportunity. The purpose of this on-site calibration is to have the controller check the spectral characteristics of the illuminated area. A specific die on an SLS is fired on a timed basis and the controller reads the photo detector value. The new site-specific reading is then taken and compared to the original calibration and stored. The site-specific reading will serve as the base for the next calibration, as it is assumed to render the surroundings correctly based on still calibrated light sources. The next calibration may be scheduled for night and holidays to ensure a date when dark conditions prevail. If darkness cannot be ensured, the incremental shift in intensity above the ambient can be measured. Photo diode detectors of known field of view are placed on the DLF such that SLS output is detected. In lights-out conditions of darkness, the controller takes a base reading sample of a detector. The base reading allows the subtraction of "noise" from further readings. During the calibration the base reading may be repeated to ensure accuracy. Periodically, possibly every half a year, more or less depending on manufacturer data of how much the LEDs drift from their initial performance, a calibration routine is run. If a change in decor has been made, then the drastic change will signal the logic controller to ignore the latest reading and use the present "white" setting to recalibrate the new decor. Although photodetectors are stable devices, over a 30 year DLF lifetime it may be necessary to calibrate the photodetectors as well. Absolute intensity readings can only be recalibrated against a laboratory standard. However, daylight may be used to recalibrate color sensitive photodetectors over the 20-year lifetime. At the post installation calibration session, a day reading of photodetectors is performed and the readings analyzed for daylight sources. This is done using the clock where daylight will show a predicable spectral shift over the hours of the day. The controller will then compare the readouts of detectors over the day to identify those exposed to daylight. First during the day readings of the photodetectors are taken.

The detectors facing the daylight are assumed calibrated to read "white light. In darkness SLS units, SLS 1 in view of one calibrated daylight facing detector, detector 1 and one uncalibrated detector, detector 2, are powered to produce white light as determined by the calibrated detector. Now detector 2 is calibrated. Moving stepwise around the DLF the process is repeated with now calibrated detector 2 used to adjust SLS 2 located between detector 2 and not yet calibrated detector 3 to produce "white" light. SLS 2's output is then used to calibrate detector 3. The process continues around the DLF till other daylight-calibrated detectors are reached. For greater accuracy the process can then be performed in the other direction, moving stepwise until detector 1 is reached again. By using this nodal analysis method discrepancies propagated in the calibration process are reduced.

A power guide 10 can serve as both a power distribution and mechanical affixation device to the placement of additional DLF units 11 within an expanse. Light output 12 from one DLF may differ in distribution from another 13, if say one MSLS is in the center of a room and the other is at the edge or one light illuminates steps between the landings and another is the last step before the landing, the last step would be illuminated in a different color.

Since an LED device is operable over a wide range of currents, when an LED serves as the light source, dimming and color balance are smoothly and infinitesimally variable.

For the purpose of illustration, a preferred embodiment of the present invention is presented in FIG. 2B juxtaposed with a prior art solution using LEDs shown in FIG. 2A. A typical "bulb" shape with a screw in base is provided for retrofit locations where a socket is available. The prior art design depicts LEDs spread out on the surface of what looks like a reflector lamp. It is evident from the downward facing 5 mm hole-thru type LEDs—14 that no attempt has been made to extract a "batwing" or any other effective type of light distribution pattern. Upward facing LEDs—15 seem intended for uplighting and again it is clear from the symmetry that no attempt has been made to provide a rectangular pattern which will give a better use of light for indirect lighting.

FIG. 2B illustrates the teachings of the present invention. In this case, although packaged to appear as a typical "A" shaped light bulb, the device is actually a DLF and provides a complete lighting solution. Although shaped like a lamp with a screw base to facilitate replacement when the "lamp" burns out, this is not necessarily the intent. Rather, in the present concept, after 100,000 hours (over 30 years in typical use) it's time to refurbish the room and change the fixture. The outward design is thus generated by what people expect to purchase and not what a DLF, that is not a lamp should look like. A true DLF design would not include the ceiling mounted socket and would be provided with a wiring connector and accoutrements and fasteners for attachment directly to the ceiling.

A retrofit MSLS lamp or digital lighting fixture/luminaire 16 intended to replace the lamp, fixture, reflector or shade and control-gear combination of a typical lighting fixture, includes a screw base 17, which receives line power 18 into the electronic power conditioning circuitry 19. In a preferred embodiment, control circuitry 20 is provided in the lamp. The input to the control is from an external source or internal logic circuit or both and in a preferred embodiment a sensor pack 21 with one or more radiation and communication sensors capable of detecting motion, day/night, spectrum, luminance etc. is provided. In external control, a control signal 22 rides on the power signal 18 and enters via the screw base 17 or an infrared or other radiation detector provided in 21 picks up the control signal. Discrete packaged light sources, e.g. Solid-state Light Source SLS 23 containing one or more junctions are mounted on the DLF lighting fixture body 24 and connected to the controlled power circuitry that determines which of the SLS 23 will operate and at what power. Each SLS with it spectral and distribution characteristic is mounted in a specific location on the surface of the DLF with an angle $\alpha$, 25 from the nadir. Any angle from the nadir is possible including 180 degrees and the light flux can serve to provide uplight or illuminate a picture on a wall.

In a position oriented lamp arrangement, that is where the socket has a distinct stop point, detent or pin and is mounted substantially oriented to the room or its contents such as a work desk or wall painting, and also the DLF has a specific mounting orientation relative to the socket, then the light distribution can be nonsymmetrical and tailored to the needs of the room. The screw base 17 has a detent or pin 26 that coincides with the stop point on the socket, which is mounted in a specific location radially around the lamp at an angle $\beta$, 27 in reference to pin 26 and a design start point on the circumference of body 24. The SLS are placed at an angle f horizontally and vertically angled a to illuminate specific areas and also have their own spatial light distribution angle θ 1 28A. An SLS aimed to illuminate an interior area may have a wide distribution or a distribution without a sharp cutoff 28A while those SLS located at the edge of the area to be illuminated may be of narrow distribution θ 2 28B and have a sharp cutoff. This technique is similar to how a sport playing field is illuminated with multiple floodlights. Floodlights of narrow beam spreads such as a NEMA 2 are used to illuminate at the edge of the illuminated area while wider NEMA 4 beam spreads are used near the center of the playing area. The MSLS lamp will have concentrations of SLS at specific aimings to provide a wide "flood" type distribution to one part of the room and a "spot" type distribution to another such as to a painting on the wall. Each illumination target is at a different light intensity and color temperature or color rendering.

In another embodiment SLS, which perform an equivalent to a task light function with a very narrow beam, are combined with SLS performing a general background lighting function in one fixture. While general lighting recommendations in an office call for the provision of 300 to 500 lux over the working plane, specific task lighting, for example where copy work is to be illuminated by auxiliary lighting, 1,000 lux is required. To this end a section 29, containing SLS on the DLF, provides a narrow beam of higher intensity, to provide added light flux to the working surface. In an alternate embodiment section 29 on the DLF is on a swivel and can be manually adjusted to be aimed at the worktable. In an alternate embodiment the swivel is positioned by a servomotor and controlled by a remote-control unit. In an alternate embodiment to the fixed task light section 29, in an attempt to cut down on separate fixture types with left or right handed spot or other asymmetric orientations, the MSLS portion of the DLF body 24 is rotatable in relation to the affixing base 17. Such an embodiment also obviates the need for a position-oriented socket and base pin 26.

In another embodiment, modulating the output of wide distribution and narrow distribution LEDs by the controller varies the net resultant beam spread characteristics. The fixture is placed near a workstation and gives a wide distribution general lighting as well as a narrow high intensity beam for increased illumination level task lighting on demand.

In order to assure an even distribution of light from a point source over an area, it is necessary to take the effects of the angle and distance to the illuminated surfaces into account as stated in the inverse square law. Often a "batwing" type of candlepower light distribution is used. In a prior art luminaires, the reflector, which concentrates reflected rays in the higher angles, accomplishes this. In a preferred embodiment of the MSLS there are more, or more powerful, SLS over a range 1 aimed at higher angles to increase light flux at those angles in order to maintain an even light distribution. If the lamp is specifically oriented in relation to the room concentrating more light into the distant corners effects a squared distribution pattern, which would fill in the corners of a square room with equivalent illumination. An added amount of SLS are added on the DLF body 24 at 90 degree angles on β, 27 where SLS aimings will push added light into areas corresponding to the "corners". To effect uplight towards the ceiling or for indirect lighting SLS 23A are aimed towards the ceiling such that an optimal utilization of the light is achieved.

In the preferred embodiment color of light emanating from an SLS 23 is "white" light. This is accomplished by using a "white" light producing arrangement of LEDs that is comprised of two or more spectrally differentiated junctions, which then combine their light output such that the illuminating light appears white. Other white LED technologies use phosphor or other coatings over the junction which causes a shift to longer wavelengths. The separate junctions in an SLS or separate SLS may be independently controlled. In a multi-junction SLS the total color of the illumination may be shifted to "warm" or "cool" light in correct accordance with the illumination level (see FIG. 10) or other considerations. In another preferred embodiment, a motion detector is used to conserve energy. The room lamp is dimmable to a lighting level sufficient for safe orientation. A motion sensor 21 picks up activity and increases the illumination level to meet the activity level. This integral placement significantly reduces the wiring from sensor to power supply and again back to lamp in prior-art dimmer—motion sensor applications.

In alternate embodiment each SLS 23 may have a non-white color. The operation of many SLS in unison of different or similar wavelength may be used to create any color desired from white to monochrome in any specific region to be illuminated. A spectrum sensor 21, inputs data to controller 20, which maintains color at predefined level. Such a feedback mode allows for the MSLS to maintain constant color over the full lifetime of the lamp even if specific wavelength SLS shift output characteristics such as light flux and spectrum with age within bounds of the sensors calibration over age. Constant color is maintained in a room with an influx of a less desirable color temperature light on one side. Spectrum sensor 21 with a specific orientation would detect a "cool" light reflection emanating from a specific side of the lamp and will increase "warm" e.g. 2000K light to compensate. Over the long lifetime the DLF could recalibrate its spectral sensors 21 to white light based on readings of daylight where such daylight is available, and the controller has determined that the room at the time of calibration is being illuminated with white light "daylight" of a specific color temperature per orientation and time of day.

The same light distribution effect based on light source aimings could have been accomplished as in the prior-art, easy to manufacture flat pc-board configuration by simply angling the LEDs 23B from the perpendicular as shown in FIG. 2C. Shown is a side view of a PCB provided with standard 5 mm hole-through LEDs. The LEDs are produced with standoffs on the legs such that after soldering automatic machinery can bend the legs so that the LEDs project at the required angle from the nadir to achieve the required photometric pattern. Lead bending as is known in the art also allows for uplight as with LED 23C. Though not as elegant as DLF 16, this easy to manufacture configuration will accomplish much of the sought-after light distribution.

Figure 3A:
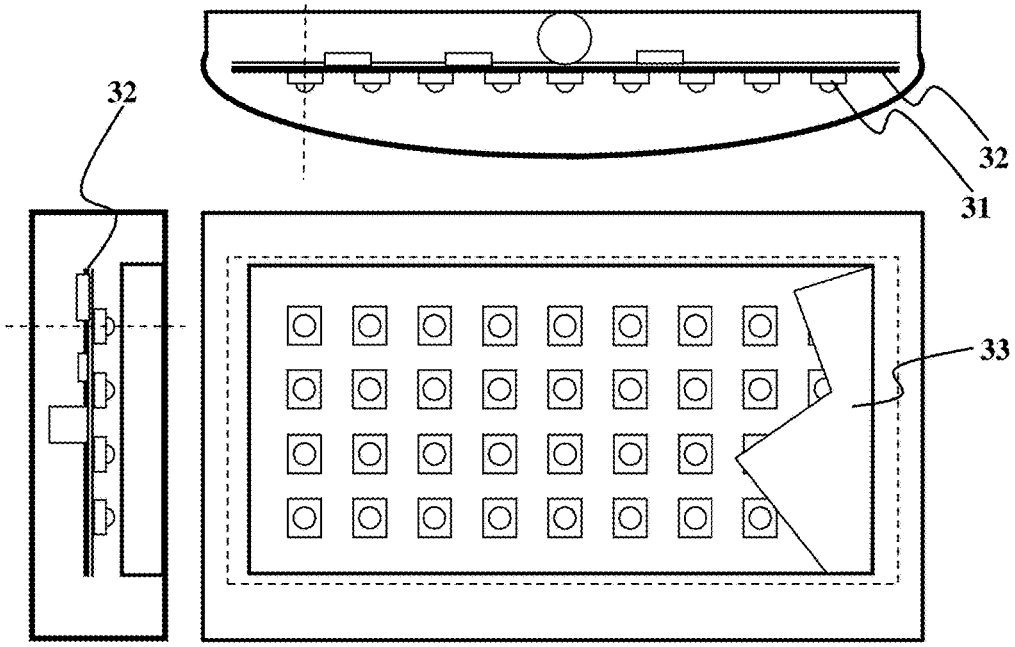
FIG. 3A and FIG. 3B illustrate a preferred embodiment of a decorative LED outdoor wall sconce juxtaposed with a prior-art design.

FIG. 3A is an illustration of a prior art wall sconce for outdoor use displayed by a leading LED manufacture in at a lighting trade show in 2003. It is juxtaposed with FIG. 3B to highlight the difference in the design methodology as taught buy this invention. The very aesthetic prior-art wall sconce fixture encased in a curved decorative frame is portrayed in top, front and side views. It uses a multiplicity LED light sources to shine through a diffuser to produce an even glow. "White" LEDs 31 were placed on a flat printed circuit board 32 and the light was dispersed via a white diffuser 33 with the light exiting lambertianally in all directions. The good optical control initially present on the LED 31 is now squandered on the prior-art diffuser in an attempt to prevent glare from the pinpoint LED source and produce a pleasant glow on the diffuser. Light is projected evenly in all directions including uselessly upward, where it will help drown out starlight. The prior art flat PCB and optional metal heat sink 32B facilitates manufacture and heat transfer and that is probably why the design is the way it is, with production feasibility considerations driving the design, rather than correct energy saving lighting principles.

Figure 3B:
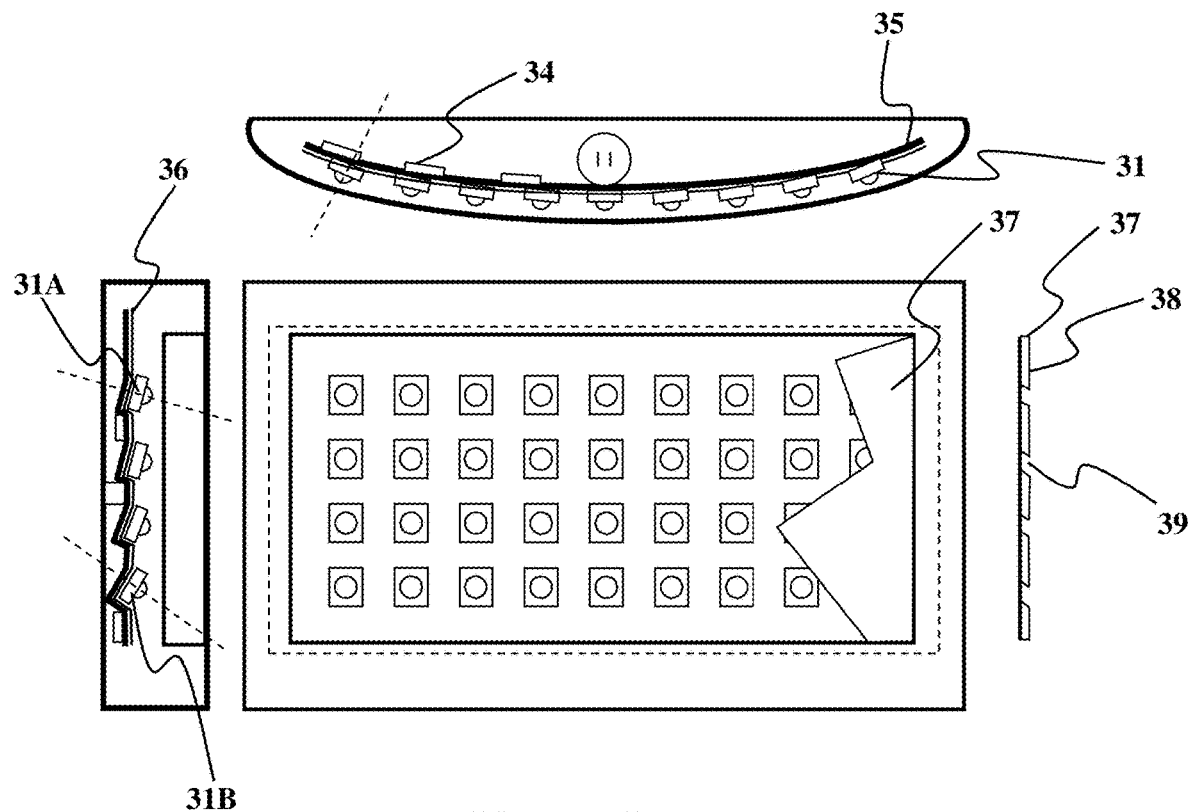

FIG. 3B illustrates how the same improved lighting design process can be accomplished for an outdoor wall sconce DLF intended to illuminate a walkway at night. According to the teachings of this invention, the LEDs 31, power supply and other electrical components 34 are assembled on strips of semi-flexible printed circuit boards 35. The LEDs can be multi-colored or monochromatic LEDs with overlapping coverage or white LEDs. As illustrated in the top view of FIG. 3B, the LEDs 31 are mounted on a convex surface 35 such that some face to the left, some right and a smaller quantity towards the middle. The middle aimings require fewer light sources due to the inverse square and cosine law for a point source as is this DLF, where light at the angle of illumination of 0 degrees is more intense than for light at an angle greater than zero and a point closer to the DLF is more intense by the square of the distance in the denominator. The exact solution for the aimings is such that for a desired coverage and illumination level the illuminance equation 1 is used to calculate the necessary light intensity in candela at each aiming angle. The side view shows the LEDs 31A and 31B with varied downward angles, such that even illumination is produced on the walkway out to the prescribed distance from the wall. The PCB strips are optionally affixed onto a curved and angled aluminum heat sink 36 with electrically insulative but thermally conductive adhesive such as Dow Corning® SE 4400 Thermally Conductive Adhesive.

The diffuser 37, is shown in the side section view to have white diffusing sections 38 and clear, fully transmissive slots 39. The controlled angular distribution light emanating from the LEDs 31 passes through the clear slots 39 and illuminated the walkway. The diffuser 37 is illuminated by stray light emanating beyond the controlled angle of the LED 31 or one or more LEDs can be dedicated to the task and aimed into the diffuser material, using it as a light guide to spread the light within the diffuser as is practiced in the art.

FIG. 3B illustrates how the same end result as the prior art fixture FIG. 3A, of having a pleasantly illuminated diffuser can be accomplished while not compromising on the energy efficiency and correct lighting output of the luminaire. The fixture aesthetics can be maintained while a more physically compact design can be carried out. The components depicted in FIG. 3B are possibly more complex and thus initially more costly. However, in a comparison of the life cycle cost per effective lux, which includes the electricity charges over the life of the fixture, the DLF is certainly superior to the prior-art.

The above design depicted in FIG. 3B is easily adapted to a hallway application where some light to the ceiling is beneficial. To provide up light a row of LEDs 31A is aimed towards the ceiling instead of downwards.

FIG. 4 illustrate additional embodiments of a DLF which may take on any shape be it disc shaped or linear depending on the aesthetic choice of the designer and the lighting application at hand. Thus, a preferred luminaire configuration for lighting an area from within, (using a number of lighting fixtures to prevent shadows) would be a concentrated point source design. To illuminate from the perimeter of the room or along a walkway, a linear configuration luminaire or many distributed point source luminaires are optimal. In FIG. 4 a disc shaped containment 40 would contain SLS 41 where again, the radial position of each SLS and the aiming is such as to yield a specified lighting pattern on the surfaces to be illuminated therefrom. A smooth light distribution is achieved by aiming relatively more SLS 42 in the direction of the more distant (or less perpendicular) surfaces or objects to be illuminated. One or more sensors such as motion, day/night, spectrum, luminance, are provided for in 43 or any other location as is required. A printed circuit board with power and control circuitry is provided for 44, as are screws 45 and or adhesive on the rear 46 for affixing to a surface. Electrical connection is made via a connector or sharp prongs to a conductor 47 which are pressed against the conductors to make electrical contact. The total assembly 48 with its light sources at specific positions and aimings, its power conditioning and control equipment and connection to power source, be it integral such as with on board batteries, or external from a power line constitutes a complete lighting fixture replacement element.

Based on the disc or puck shaped integrated luminaire above an application featuring a snap on Step Light 66 used outdoors is illustrated. One or more SLS 50 are contained in housing 51 which is substantially transparent in the area in front of the SLS. The SLS light source is very long lived therefore the unit is sealed watertight for life in the injection molding process or via glue. The SLS 50 are aimed so that the distribution pattern, at standard mounting height, effectively illuminates the steps. In one embodiment the luminaire is provided in two models each specific to a right side and left side installation with opposite aimings in order to yield an even distribution along either the receding or proceeding stairs.

A two-conductor cable, which conducts power 52, is installed along a building surface or railing along the area to be illuminated. A bracket 53 is attached to the wall 64 on which the light puck is to be placed. The slot 54 atop the puck is inserted under the top clip 55 of bracket 53. The puck is hinged down and the bottom pivoted, catch lever 56 enters within the void of bottom clip 57. The screw 58, which can be a tamperproof screw to prevent removal by vandals, is tightened forcing the protruding leg of top-heavy catch lever 56 to fill the void in the bottom clip 57 of bracket 53 and lock the light puck in place. At the time of tightening screw 58 pushes contact block 59 with conductive piercing prong 60 against power cable 52. Conductive prong 60 pieces outer insulation layer 61 of power cable 52 and makes contact with electrical conductor 62. Further tightening of the screw 58 forces the prong on the opposite contact block 63 to pierce through the insulating layer and make electrical contact. A power cable 52 conducting current at low voltage, say 24 Volt, may be directly affixed to the wall 64 without enclosure in a conduit, and the light puck attached at points along the power cable. A bracket or clip 53 is used to affix the lighting puck fixture to the wall and has an opening 65 for the contact blocks 59 and 63 to fit through. The fixture 66 may be sealed for life during manufacture since there are no serviceable parts inside for the lifetime of the electronic components.

Other applications include stairwell lighting that is activated by motion detector or is always on due to the low power consumption or a combination of constant low level on state, with the increase to full power based on activity. Distributed along a power strip running along the stairwell are disc shaped DLF units such as luminaire 66. A motion detector 67 in the first and last units between the floor landings is used to turn on the lamps ahead of the person using the stairs. An outdoor solar energy step light application will use a photocell or any other arrangement to turn the system on at night and a motion detector to turn the lights on for a short duration after motion is detected thus reducing the amount of energy needed to be collected in solar cells. Instead of being in a totally off state, the lighting can be partially on, such that it is visible in order to give definition to the landscape and help in orientation. This power usage is very low since even at very low current LEDs are visible at night. Upon being initiated by the motion detector it can go to full power to illuminate obstacles in the path.

Last Step or first step could be indicated by a different color of light. A motion detector could accordingly change the MSLS output color if the individual is approaching the steps say to green and to amber or red when reaching the last step.

Figure 5:
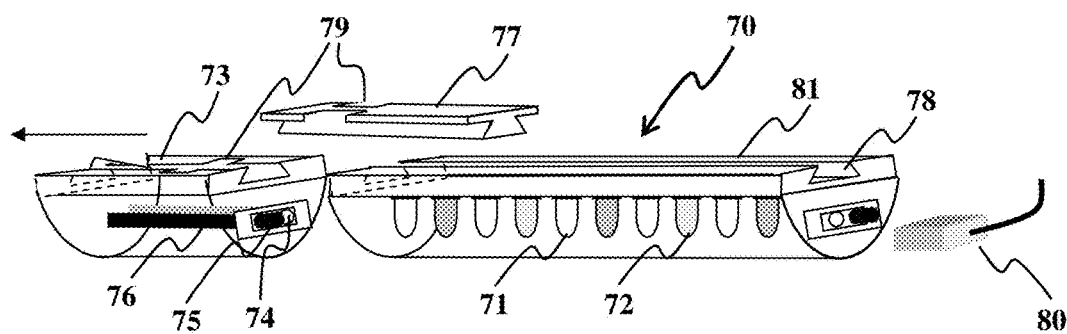
FIG. 5 is a Surface or Railing Mounted Distributed Digital Lighting Fixture.

FIG. 5 illustrates another DLF embodiment, a linear lighting fixture 70 where the similar or different SLS 71 and 72 are distributed along the area to be illuminated such as is typical with fluorescent lighting fixtures used in soffit lighting. The system may have a power conducting strip of a similar shape 73 which connects to lighting strip 70 via receptacle 74 and pin 75 set and which are attached to conductor set 76. The two strip types, the lighting fixture strip and the power conducting strip may be adjoined together or affixed directly to the wall or attached to bracket 77 which may slide into a slot 78 in 70 and 73 and where there may also be provided matching cutouts in the lighting fixture and bracket. The matching cutouts 79 allow for a quicker, straight on insertion before sliding horizontally in the slot 78. The bracket is thus first attached to the wall and the strips are brought up to the bracket and moved sideways to latch.

Many lengths of strips 70 or 73 up to the power capacity of the conductors can be joined together and connected to a power source with a connector 80. Interchangeable sections of the power strip can contain LEDs of different colors for effects or alternate between power strips and lighting strips for a similar aesthetic architectural design.

The lighting/power strip may be thin and linear substantially in one or two planes or for aesthetic considerations have curves or be constructed of a flexible material and have the ability to be manipulated into curves and bends in three planes, to make such designs as an arc, wave or circle. The electrical conductors may provide the malleability to shape the strip and then hold the configuration after it is bent up, for example if they are made of copper or aluminum or alternately an additional bendable, yet shape-retaining material may be inserted in the casing 81 or the casing material itself may have such properties.

The Lighting strip 70 and Power strip 73 may also conduct light and radiate light to give a lighting effect all along its length. Alternately, the strips may be a light conductor with little light exitance from the surface and the total internal reflection is selectively frustrated to let light out along the length in a specific direction or at desired intervals. The strip lighting may come from SLS specifically aimed to project light into the strip or from light leakage from regularly placed optimally (per the main lighting application) aimed LEDs.

Figure 6:
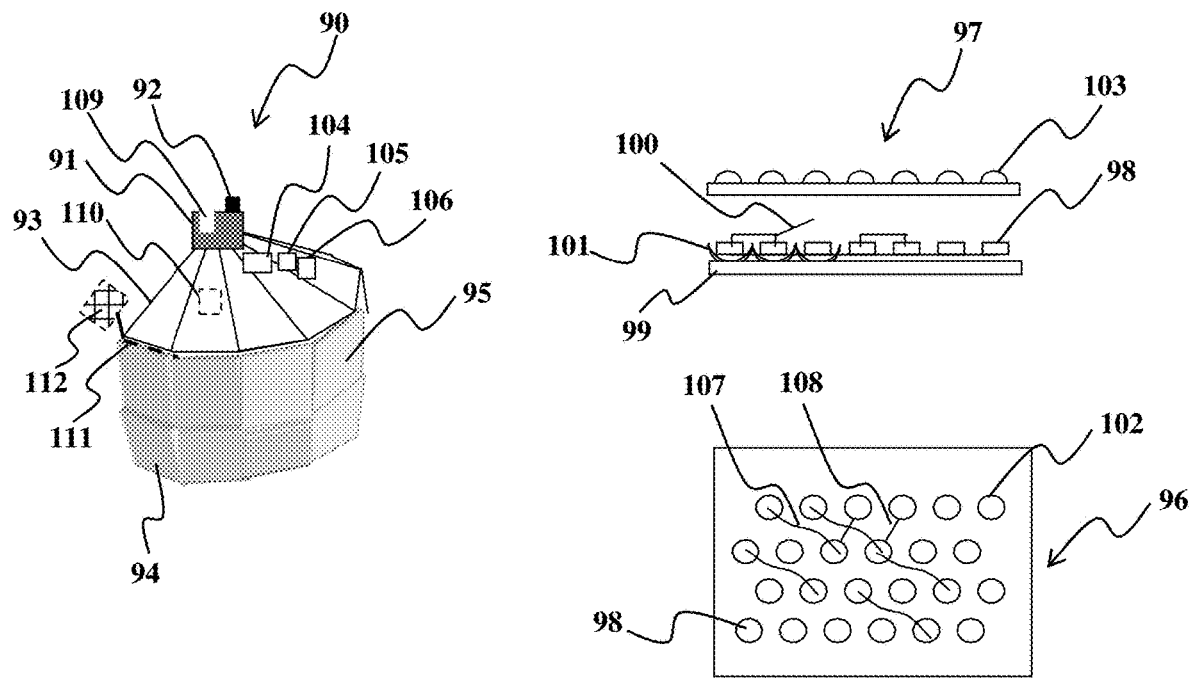
FIG. 6 is an Asymmetric Light Source made of Directional Chip Facets.

Another embodiment of a solid-state lighting fixture, DLF or luminaire is shown in FIG. 6. Whereas previously described luminaires were described as incorporating LEDs in standard hole-through or SMD packages, here, a luminaire using the unpackaged solid-state light source junction is described. A multifaceted luminaire 90 is comprised of any of the following list including a mechanical affixing method to a surface 91, an electrical connection to an outside power source 92, a mechanical frame 93 to hold the one or more light sources 98 or lighting facets 94. Power conditioning, heat rejection and control elements are contained on or within the interior of the structure 93. A number of light sources, facet or many facets are placed in position radially around the lamp and angled vertically to effect the desired light distribution. Thus, while facet 94 is positioned in the frame 93 radially and angled so as to be aimed substantially downward to the left of the fixture position, facet 95 is positioned and angled to illuminate an area further out and to the right.

A detail of a lighting chip or facet is shown in front view 96 and side view 97. In the first embodiment P/N junctions 98 of light emitting semiconductor material are placed on a thermal conducting and or light-reflecting surface 99. Electrical connection 100 is made between the junctions often referred to in the industry as dies, such that different color junctions may be located in close proximity to each other and their combined light spectrum yielding the desired color. The power and control circuitry have access to each individual die, a cluster of dies or to a total facet. This allows for the dimming and color temperature adjustment of the illumination. To more tightly control the light intensity distribution the surface 101 beneath the light-emitting junction is formed concave to reflect and concentrate the radiation into a narrow beam. Alternately, or if additional optical control is needed, the top layer of the junction 102, if it is light transmitting, is formed to act as a lens such as a Fresnel lens or a surface 103 above the die serves as a lens.

The level of miniaturization is irrelevant. The principal is the method of powering and controlling the light source intensity directionality and color spectrum in one integral unit by varying power signal to specifically positioned light sources of specific spectral power distribution. Device 90 contains for this purpose any or all of the following: unit 104 for effecting the power conditioning of electric current supplied to the light emitting elements, a control unit 105 to vary power to specific junctions or chips and sensor units 106 to provide input and feedback to the control elements as described earlier in devices 2 and 14. The earlier described DLFs of FIGS. 1 through 5 are also designable using the facet light source building blocks.

In an LED, light is produced at the p-n junction of the diode. It is known that one of the major losses of light output from solid-state lamps is the absorption of light within the epitaxial layer of the chip. On a submicron level, other inefficiencies derive from defects caused by the lattice mismatch. Often LEDs are producing light at a quantum efficiency of approximately 5 percent. Depending on the chemistry and the junction molecular geometry a specific thickness of light emitting layer is required. Also, the width of the junction is important as light is absorbed in the interior.

Light extraction from AlGaInN-based LEDs is limited by the various parasitic optical loss mechanisms present within or surrounding the AlGaInN epitaxial layers. These mechanisms include absorption at the semi-transparent metallic layer as well as absorption within many layers comprising the epitaxial portion of the LED, such as the buffer layer the active region and the heavily Mg-doped GaN contact layer. Because of the refractive index step between the multi-layered epitaxial structure (n=2.4) and the sapphire substrate (n=1.77) or the encapsulation epoxy layer (n=1.5), only approximately 25% of the light generated within the active region escapes into the epoxy or the substrate upon first encountering these interfaces. The rest of the light is trapped in a waveguide formed by the encapsulation epoxy layer above the chip and the substrate. The trapped light must travel distances on the order of the length of the chip to escape from the sides of the LED. Such distances require many passes through the various loss mechanisms within the LED structure, increasing the probability of absorption. Thus, much of this trapped light is eventually lost, decreasing the overall light output of the LED.

The LED is designed to allow the light produced to escape through an end face. However not all of the light is able to escape a diode in air because a portion is totally internally reflected at the interface between the diode and surrounding air. Due to the very high refractive index of most semiconductor materials, the portion of the light totally internally reflected is very large.

Therefore, contrary to the present trend in high flux LED design of building very large, high current diodes, it would be advantageous to build a multitude of very small diodes with relatively large surface areas relative to volume and lessen these losses.

The layout of the facet in FIG. 6 is applicable to a submicron-sized dice 102 with nano wires 107 and other subminiature connectors 108 bringing power to the junction. To prevent absorption of light by the neighboring junction the cusped reflective structure 101 of the lower surface surrounds the lower hemisphere of the junction.

The reflector as mentioned earlier for the dice on the micron level may be similar to the one described in "Semiconductor light emitter" U.S. Pat. No. 5,537,433 by Watanabe, where a semiconductor light emitter, such as the light-emitting diode or the semiconductor laser, having a structure in which a light emitting area or an active layer; a transparent layer which is pervious to light radiated from the light emitting area or the active layer; and an opaque layer or an opaque substrate which is impervious to the radiated light are arranged in order or in the inverse order. The semiconductor light emitter includes (a) total reflection layer(s) arranged between the transparent layer(s) and the opaque layer(s) so as to come into contact with the transparent layer. The refractive index of the total reflection layer is smaller than that of the transparent layer. Therefore, at least one part of the light, which has been radiated from the light emitting area or the active layer and which has been reflected by the total reflection layer thereafter, is either radiated outward from side surfaces of the transparent layer or returned to the active layer.

To carry away heat from the electronic components, a hollow center 109 will act as a thermal chimney and components are mounted on heat sinks. In compact applications, a fan or pump 110 is used in forced circulation cooling. In alternate preferred embodiment, a highly optically transmissive cooling fluid, 111 surround the chips, junctions or facets 94. The fluid absorbs waste heat and circulates to a radiator area 112 on the body 93 where the heat can be transferred to the surroundings. The circulation can be natural thermo-siphon circulation, based on the density differences or forced, utilizing a pump 110. An added benefit can be derived from the optical coupling of the fluid between the junctions 98 or facets 94 and the cover 103. At an air plastic or glass interface typically 4% of the light is reflected back. With two such interfaces the loss will be 8%. The cooling fluid is selected such as to have a refractive index that is close to the plastic, ceramic or glass used in the cover 103 and this loss mechanism is eliminated boosting efficiency.

Figure 7:
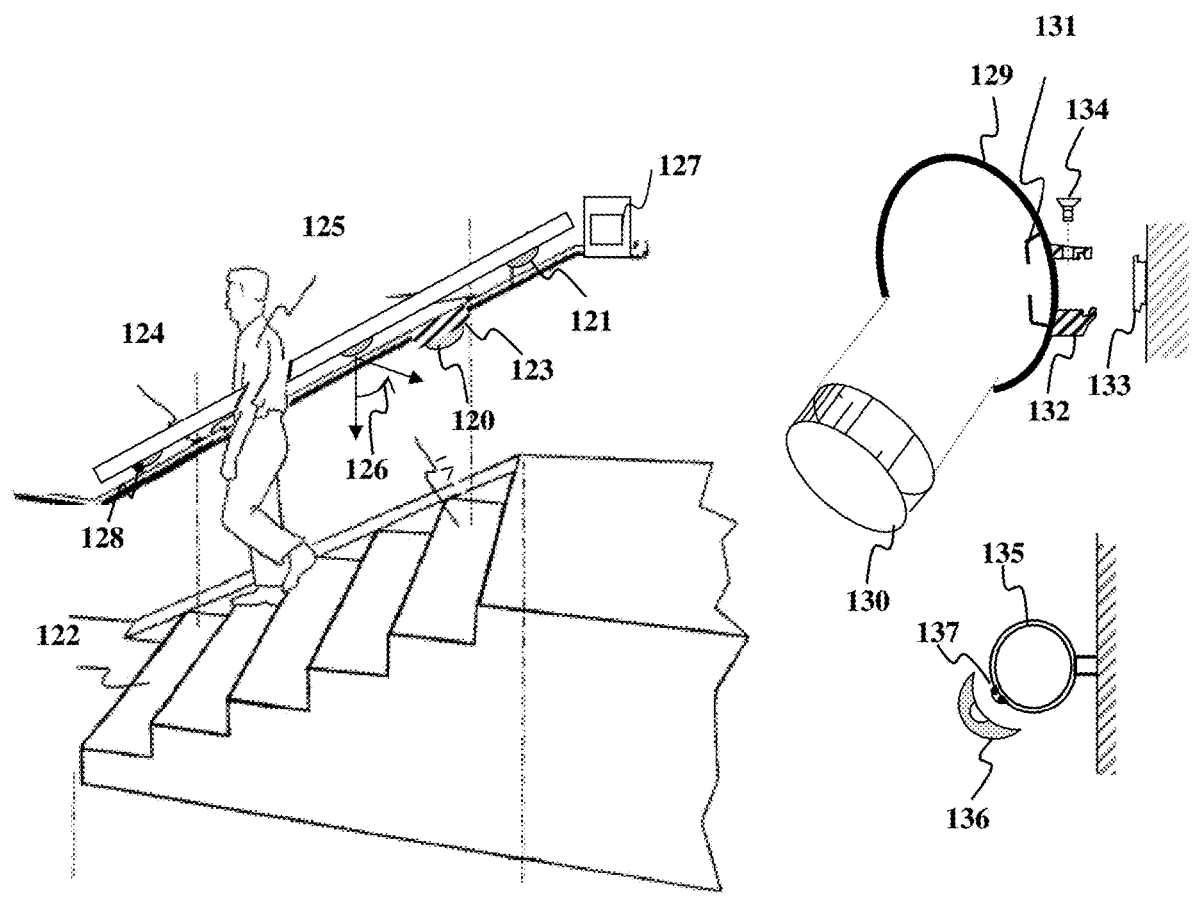
FIG. 7 illustrates an application employing the Discrete Unit Step Light.

FIG. 7 is an illustration of a typical application using the digital lamps as proposed in the present invention. A digital lighting fixture such as the puck shaped illuminating unit 66 of FIG. 4 described above shown here as 120 and 121 would be used to illuminate steps 122 by being affixed to the wall 123 or onto or within a railing 124. A pedestrian 125 using the stairs would not be blinded by stray light reaching his or her eye's since the highly controlled light beams of the SLS 50 in FIG. 4 are aimed downward and have a sharp cut off of light distribution at an angle such that even a pedestrian coming from below and looking up the steps would not see the light source (except from a great distance on long stairways where the light intensity is weakened by the distance and does not glare). A right handed and left handed fixture design would further prevent any blinding light by always illuminating the stairs with SLS aimed toward the nadir or at angles from the nadir in the upward direction of the stairs up to 70 degree angle 126 and by having the fixtures mounted below the eye height of short adults 125 or children who walk stairs at night. A low voltage transformer 127 located within or by the outlet box or at any other power supply juncture can supply power, free from the danger of causing electric shock. A motion detector 128 could be a separate device or as propounded in this invention, be an integral part of the fixture and could cause the fixture to change color and illuminate in amber, red or green to signal the approach of the last or first step.

In a solar energy powered application, the motion detector would turn the DLFs on or alternately increase power. To conserve energy, when there is no foot traffic, it would operate in a low power mode where it is visible and gives a general outline of the terrain to warn of approaching steps. When motion is detected it would switch to a mode where it actually illuminates the steps for correct foot placement to prevent mishaps.

In another embodiment the railing 124 is an aluminum or steel extrusion 129 specially constructed to accept the lighting fixture 130 and formed with brackets 131 to carry the conductors which supply electric power. The railing is actually a combined railing lighting fixture and carries out the both functions including providing elements for the power distribution. Grooves along the extrusion accept mounting brackets 132 that facilitate attachment to the wall or upright post 133 and also have a locking mechanism such as fastener 134. It is to be understood that any other shape or material of railing, fixture and combinations of bracket and extrusions can carry out the similar function of a combined railing —lighting fixture device.

In another embodiment the railing is a standard railing profile 135 available in the industry and the digital lighting fixture is shaped in an arced or banana shape 136 or has a bracket shaped to facilitate its merging with the railing. An insulated electrical conducting element, 137 runs along the railing to provide power to the fixtures at intervals along its length.

Figure 8:
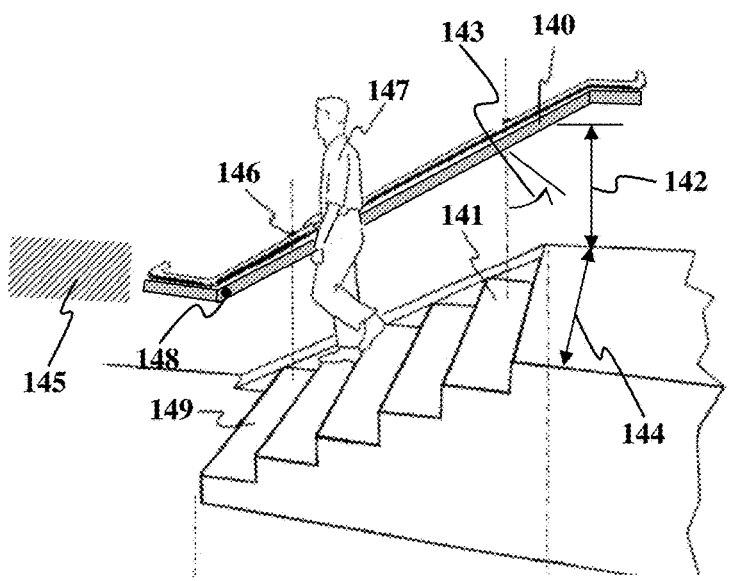
FIG. 8 illustrates an application using the LED based Distributed Step Light Fixture.

FIG. 8 illustrates the use of the linear packaged digital lighting fixture 70 as described earlier in FIG. 5, here shown as 140 in a step 141 or stairwell lighting application. The power and lighting need to be distributed substantially linear at constant distance 142 of the light source from the stairs to be illuminated and the correct light distribution for the task is designed into the SLS and or digital lighting fixture from ground up. The angle 143 of light distribution from the SLS is such that it takes the mounting height 142, step 141 width 144 and required illumination level into account. The lighting fixture may attach to the wall 145 or onto the handrail 146. The person's 147 presence is detectable by a motion detector 148 as he nears the last step 149 and indication by a change in color or frequency can be signaled by a segment of the lighting fixture. Alternately or in addition to, in order to save power as with a solar energy installation, the detector may cause a change in the power supplied to the DLFs.

Figure 9:
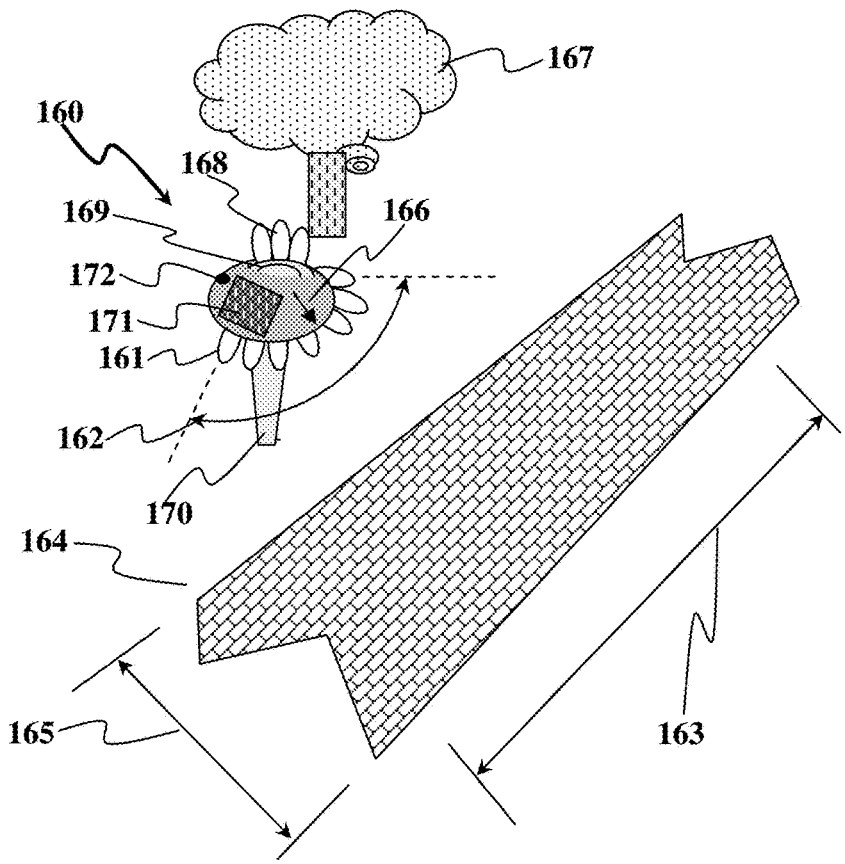
FIG. 9 is a path lighting application using an LED Stake-Top Path Light.

FIG. 9 depicts a DLF 160 which can be used in pathway lighting where upon being installed at the correct orientation the SLS 161 are aimed in a controlled wide distribution 162 (but yet not in the wasteful, present-day practice of 360 degrees), such that they illuminate a section 163 along a walkway 164 of standard width 165 with equal light distribution and there is no stray light upward or to the rear. A marker, 166 situated on the fixture 160, aids in orienting the fixture perpendicular to the path. Alternately, shrubbery 167 can be illuminated with another grouping of upward aimed SLS 168 with a more spotlight like distribution alternately of another color spectrum which may illuminate the green growth in a more aesthetic light. The group 167 may be mounted on a swivel base 169 so that it can be aimed independently of the path lighting SLS aimings. A dedicated shrubbery illuminating DLF configuration is another alternative. A stake 170 is used to install the DLF in the ground at the correct orientation and may be provided with an electrical connection box to hook up to power through piecing quick connectors as is known in the art. Alternately the DLF can be self-sufficient with an onboard power source consisting of solar cell 171 and batteries. As described in previous devices, in more embellished embodiments, onboard control logic circuitry and sensors are employed to control intensity, color spectrum and on/off switching. A motion detector 172 can control the transition from a standby mode to full operation.

Figure 10:
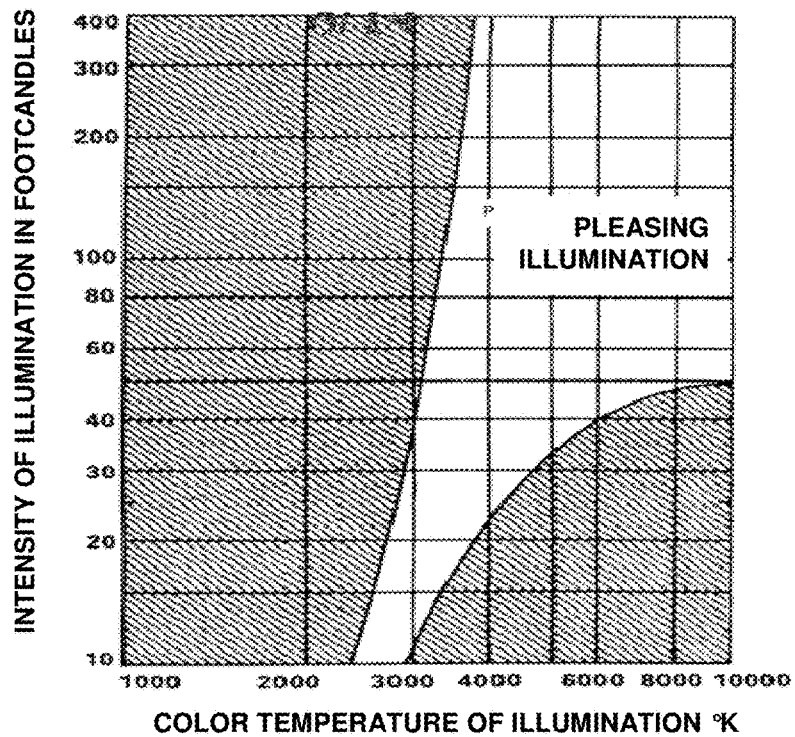
FIG. 10 is the Illuminating Engineering Society Preferred Color Temperature vs. Intensity Correlation.

FIG. 10 is a graph of the preferred parameters for lighting color temperature at different illuminance levels. It is adapted from the IES Lighting Handbook 8th edition 1993 and illustrates the Kruithof effect. It is used here as a sample of one of the recommended lighting procedure templates used by controlling logic circuitry on a DLF to keep lighting parameters such as color temperature, color rendering properties, illuminance levels and distribution in optimal bounds. Other control parameters such as switching on and off and color change used to signal critical circumstances are examples of look up, truth tables and media storage data that can be provided to a controller.

Figure 11:
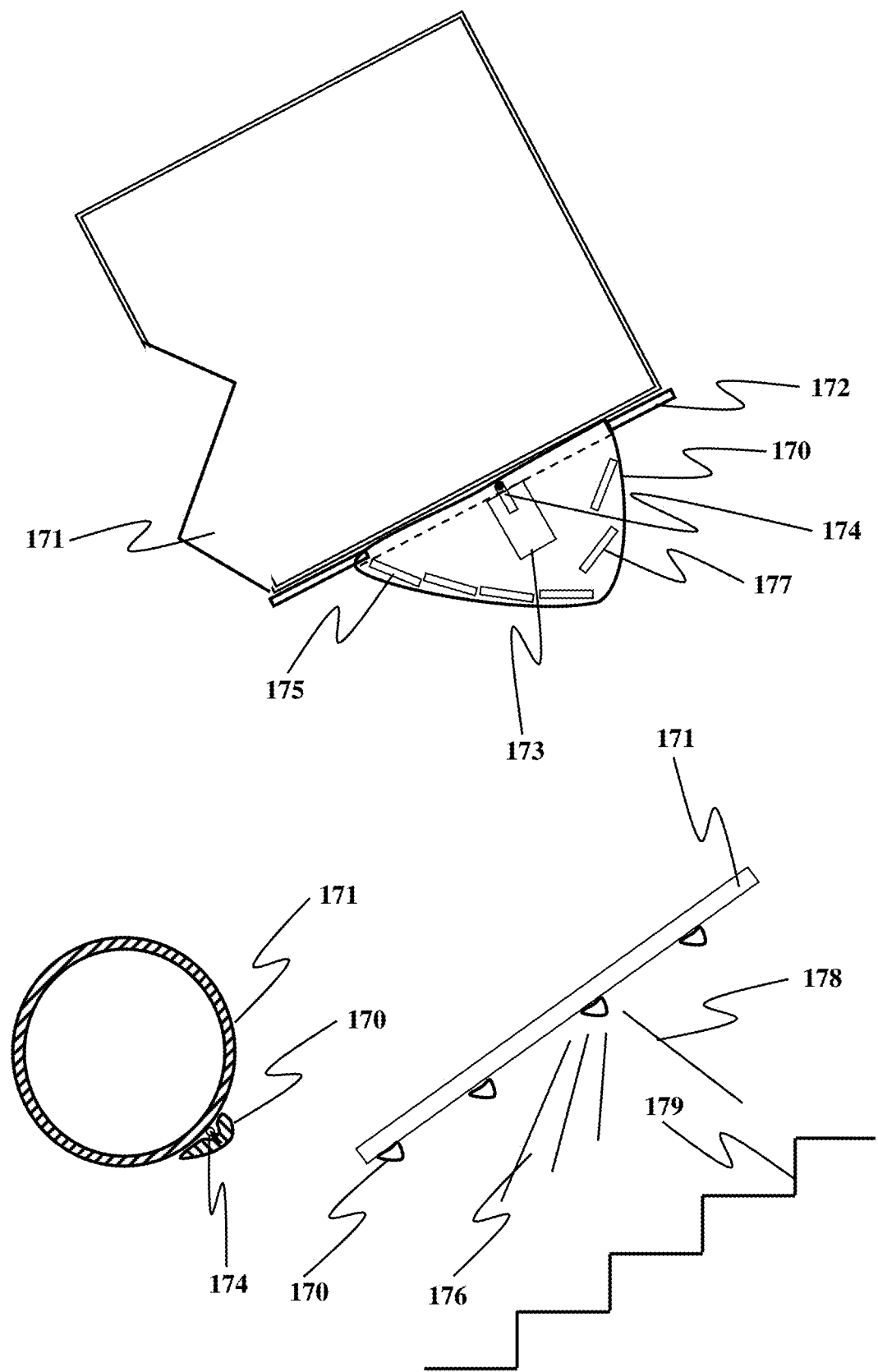
FIG. 11 depicts an integrated digital lighting fixture using discrete solid-state light source arrays deployed angularly about the geometric volume.

Shown in FIG. 11 is a revisited step light which incorporates the chip technology introduced in FIG. 6 into the step light application which has been used to demonstrate the general method of digital luminaire design as espoused by the present patent. The intent is to illustrate the advantages of the placement of the junctions on a facet configuration over the discrete component approach in the previously described step light design of FIG. 4. The significant feature that stands out is the size reduction. Many junctions are packed in a facet and the facets are cast in epoxy at the correct position and angle to properly illuminate the steps. Again, the entire lighting fixture function is carried out in this properly shaped button-like device which yields the correct light distribution. A button shaped step light 170 is shown on the bottom side of the railing section 171. A power cable 172 single wire (it can be a single conductor with the railing serving as the other conductor) supplies AC or DC power, which for safety considerations can be low voltage. The power, sensor and control circuitry package 173 makes contact 174 with the power cable 172 and distributes power to the light generating discrete LED or multiple-packaged facet elements 175. The light facets 175 are strategically located on the relevant geometric surface of 170 such that their aimings contribute to the illumination 176 of the steps from the preferred direction and at even intensities. While facet 175 is contributing light at higher angles on the receding step surfaces facet 177 is illuminating 178, the close face of the upward step 179. In manufacturing such a luminaire the components must all be wired together and then positioned in their proper locations at the exact angles. This can be done with automatic machinery while the components are in the flat. Each component is placed by automated pick-and-place machinery in a hollow where it is temporarily set and where the wiring is attached as well. The hollow is actually a computer positionable setting and all the hollows are moved with the components in situ into the molding positions. An epoxy like spray is used to temporarily lay up the components until the final encapsulation into the final "button" shaped lighting fixture. This is a general lay-up method and applies to subassemblies as well, which can later be brought together before final encapsulation. Conductors that require subsequent electrical connection are mechanically or chemically covered during the spraying process.

Figure 12:
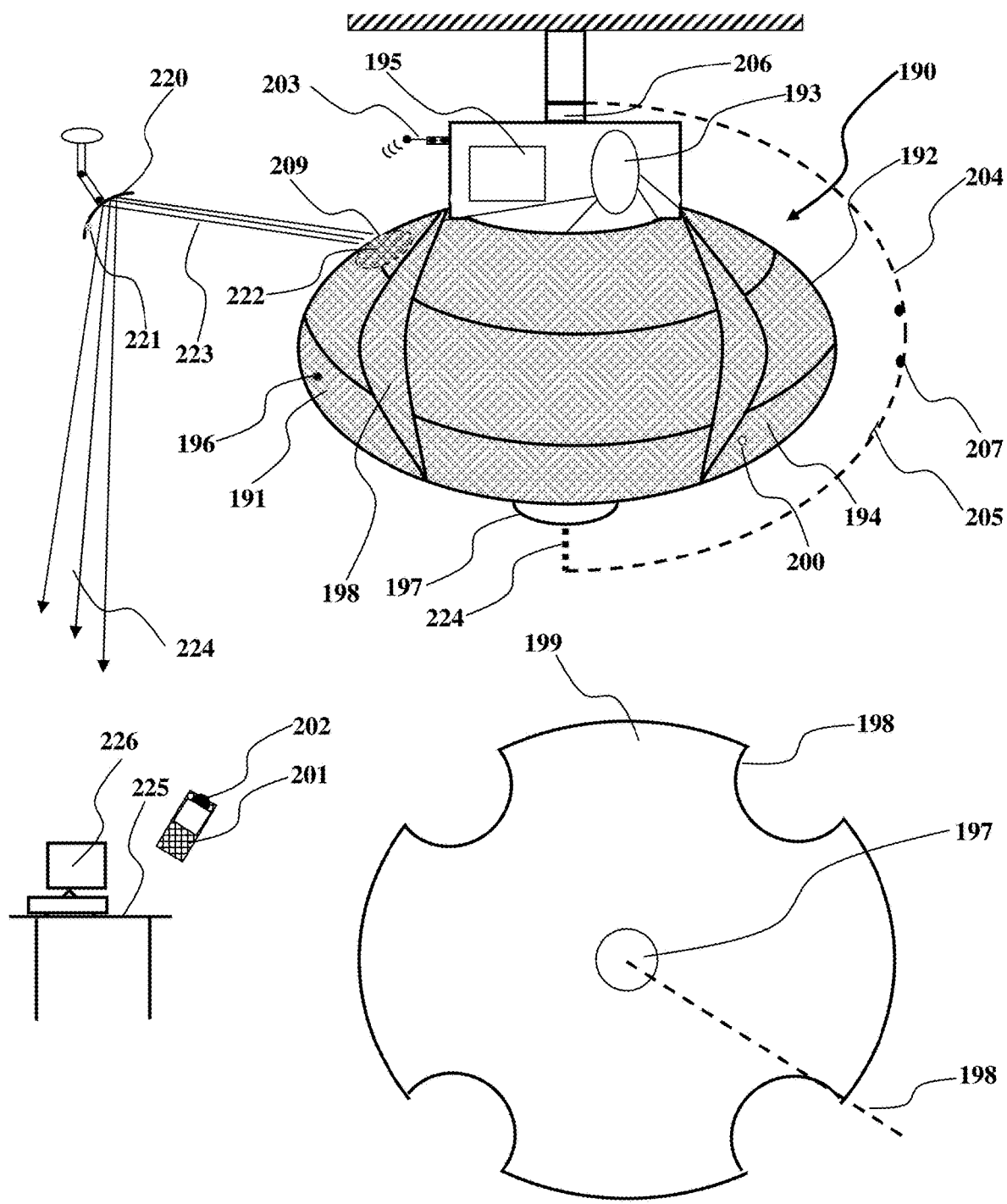
FIG. 12 is a universal luminaire embodiment using an adaptive digital lighting fixture which is programmed to illuminate the area as is needed.

In another preferred embodiment shown in FIG. 12 the DLF is an Adaptive Digital Lighting Fixture. As opposed to a DLF described earlier, is not pre-designed with light source aimings based on a pre-known application. Instead the DLF is equipped with a plethora of light sources ready for most of the conceivable lighting tasks in the illuminated area. The light sources are then controlled such as to adapt the lighting to the room construction and the lighting tasks at hand. The same technique applies to outdoor area lighting applications. This universal DLF is the preferred design when the cost of having an overabundance of light sources is low enough such that other economic considerations such as minimizing stocking units in inventory, repeated changing of the room tenants etc. will be more expensive. It is similar to purchasing a 100-Watt lamp where a 40 W lamp would suffice and always operating it on 60% dimming. The capacity is there but it is unwise to use it since electricity is costly.

The adaptive or intelligent DLF 190 shown in FIG. 12 has multiple light sources 191 placed about the body 192 having a geometric shape. The shape, which influences the spatial light distribution, may be of a fixed or flexible design. In a flexible design, solenoids, servo motors, actuators, pumps, controlled fluid or air pressure devices 193 are used to realign surfaces, moveable plates or expandable tubes or cylinders 194 to morph the topology of the fixture. The ADLF is equipped with an electronic power supply, computer control and communications unit 195. One or more light sensors 196 are placed strategically to detect necessary inputs. Alternately one or more digital cameras 197 with a photodetector array which is equipped with a lens which can be a 360-degree lens, or a fisheye lens is placed with a field of view of the area to be illuminated. The geometric shape of the body 192 is such that an asymmetric lighting pattern is produced for the provision of a non-circular lighting pattern in a typically rectangular room. Because more light needs to be directed to the far corners of the room, more surface area for projecting SLSs at that position is required. If multiple fixtures are used in a large room then squared lighting patterns will obviate the need for overlapping coverage as with circular distribution luminaires or the prior art. Concave section 198 increases the ADLF surface area available for light source mounting at the room corner orientations. In bottom view 199, a section of the body 192 is shown with asymmetric surface cut out 198 which increases the available surface area on the ADLF.

Spatially differentiated motion detectors 200 are provided on the Adaptive Digital Lighting Fixture along with the light sources 191 and light sensors 196. Typically motion detectors have been associated with lighting in motel rooms to shut off the lighting if there is no activity. There is another level of control that can include matching the lighting to type and amount of activity. On sport fields for example, 200 lux may be used general sport activities, 1,000 lux for night practice sessions while 3,000 lux is used in a televised game. Taken to the extreme, one or more limited field-of-view motion detectors 200, or camera 197, can be used to follow the whereabouts of room occupants. The DLF controller acts to provide heightened lightning to the occupants" present locations. The controller has stored look-up-tables, instruction sets and algorithms which it uses to processes the information communicated from the sensors or a camera and in response control the light provided to the illuminated area.

A special or standard remote-control unit 201 can be used to operate and program the ADLF. In one embodiment the control 201 is equipped with a laser pointer and/or light sensor 202 that is used to assist in providing positional an angular data on the location of work surfaces, room structures and dimensions. The control 201 can then pass on information concerning the visual task performed at that specific location. This data now enables the controller 195 to use stored algorithms, look-up-table templates to calculate and program the correct lighting intensities and spectrum for that room location as explained earlier in the block diagram as functionality 7 and computer processes 7A. The photometer on the remote control 201 held at the specific location will then corroborate the illumination and spectral performance of the ADLF with the specific light source aiming being programmed at the particular instant. The communication can be optical in the visual or infrared wavelength or wireless. An antenna 203 is provided for wireless communication. The adaptive DLF is thus manually capable of being programmed with all the input parameters necessary for a computer program 7A as is practiced in the art of lighting design, to determine the correct intensities and spectrum to carry out the visual tasks at a specific room location. This is a unique property for a single luminaire. Lighting designers are usually forced to compromise and provide the entire room or area with the highest common denominator of lighting in the room. With the ADLF non-glaring, spectrally correct lighting at minimum intensities is provided and this affords significant energy savings. The added daylight and activity related dimming functions are another significant energy savings factor with its ensuing economic and environmental benefits.

A calibration system is provided in the form of calibration element 204 constructed such that it has coverage of the light source radiation on the ADLF body 192. The calibration element 204 is a reflective rod or strip the surface of which 205 has a wide spectrum, non-angle of incidence dependency and stable reflection characteristics over time. The reflectance of 205 is known at each wavelength and it serves as the standard reflector for the calibration routine. The reflective rod or strip is moveable so that it can reflect light back to the outward facing photodetector 196 based on the ADLF body 192. To test SLS performance the calibration element 204 is rotated about the body 192 by actuator or motor 206. When the reflecting surface 205 is opposite a column of SLSs 191, the controller times the firing of each independently addressable SLS 191 location and acquires detector 196 intensity readings uniquely for each SLS. The results of the test firing are analyzed in controller 195 which has the functionality described in FIG. 1 of components 7 and software 7A. Correction is made to the junction power supply parameters in order to maintain metametrically balanced outputs for white light and overall lumen production. The controller 195 re-powers the SLS 191 again using the updated power supply instruction set and retests for accuracy. The process continues until the SLS performance is repeatable at different power levels. In another embodiment the ADLF is provided with a calibration wand 204 on which inward facing photodetectors 207 are placed. The calibration wand is capable being positioned such that the detectors 207 can detect SLS 191 performance as the wand 204 is rotated about the body 192 and SLS 191 are independently tested as describe in the previous embodiment. Both the reflective rod/strip and calibration wand 204 are narrow such that when not in use, rod/strip/wand 204 is parked at a specific position where it does not block light sources 191. In another embodiment the rod, strip or wand is stored and is only deployed when calibration is required. When called upon, the deployed rod, strip or wand 204 is rotated around the DLF body 192 to read SLS 191 intensities. Alternately, the DLF body 192 rotates and the rod, strip or wand 204 remains fixed.

An ADLF 190 outfitted with computer calculation, communication, calibration and other feature may be costly, such that using a number of units to illuminate a room is impractical. Correct lighting practice encourages the use of multiple point light sources to illuminate an area using a number of criteria. A single fixture cannot cover an area larger than glare and mounting height considerations allow. There is a limit on the maximum angle of light provision. Another consideration has to do with the production of shadows. Finally, due to the cosine law there is a practical maximum angle at which the lighting can be delivered. At large angles the lighting effect becomes negligible. Therefore, due to all the above considerations it is advantageous to have multiple lighting fixtures in a room. A single ADLF 190 is used in a large room. The ADLF is designed to be used with one or more satellite reflectors 220 which are strategically positioned about the room. The satellite has provision for being attached to a supporting structure such as a ceiling or light pole and being fixed with a certain orientation in relation to the ADLF 190 and the working surfaces below. The satellite's inward facing surface is a highly efficient specular, semi-specular or diffuse reflector or combinations thereof. A part of the surface 221 is provided with a full spectrum, white reflector which may be a spot or a band across the top bottom or middle or all combinations thereof used in calibrating the intensity and or spectrum photodetectors and/or light sources over the lifetime of the DLF. A part of the surface may be a special reflector 221 such as a retroreflector which will serve as a ray targeting aid useful in the installation process of the satellites. The targeting can be manual using a red laser pointer or automatic using the detectors 196 on the ADLF 190 and the retroreflector 221 on the satellite 220. A section 222 of light sources, which may be high power light sources, is dedicated to provide sufficient light to the other areas of the room or for specific task lighting applications such as to computer terminals which require lighting at small angles from the nadir. The section 222 may be on a swivel so as to be aimable at the satellite 220. Section 222 projects light 223 at the satellite reflector 220. In use, the satellite is installed substantially over the work area to intercept rays 223 from 222 so as to provide task-lighting 224. The specular reflector 220 is positioned and angled such that it concentrates and re-directs the light rays 224 downward onto an area or worktable. The downward directed light coming at very small angles will illuminate the worktable 225 but will not cause veiling glare reflections on the computer screen 226. To provide general lighting to room extremities, the satellite reflector is specular, semispecular or diffuse and has a surface geometry for reflecting the incident light 223 so that it spreads the light evenly over the area to be illuminated.

In place of the manual programming technique for ADLF 190, a semi-automatic self-programming process using luminance measurement via detectors 196 is provided. The camera 197 has a view of the room its contents and occupants. Pattern recognition techniques known in the art are used to identify room occupants, furniture, office equipment such as computers etc., room structures such as walls and windows.

The intelligent lighting fixture system 190 is adaptive to the room structure, usage and occupants on a dynamic basis. In one embodiment a hand-held laser pointer and sensor on the remote control 201 is used to assist in providing positional an angular data on the work surfaces and room structure enabling the controller to corroborate program lighting for the location with the specific light source aiming being programmed at the particular instant. The room occupants also use the remote control 201 at any instant to input lighting preferences or call up stored lighting scenarios to the DLF 190. Thus, the controller 195 or a controller 195 which communicates with a PC computer is provided with an interactive program which based on application look up tables will determine recommended light intensity and spectrum for the application at hand. Procedures useful in the lighting design process, lookup tables and specific application guidelines can be found in the IES Lighting Handbook 8th edition pages 447-903. A number of commercially available programs are available which prescribe lighting based on the application and calculate the illuminance based on the fixture. In this invention the procedure is reversed in that the recommendations are first used to generate the illuminance on or luminance from the room surfaces. The computer program 7A is used to calculate the light intensities required at each angle in order to produce the desired illuminance or luminance results. Luminance in cd/m 2 is the reflection of the light flux lumen/m 2 from a surface having a reflectance property and is more similar to what the eye sees. The algorithms are processed onboard the ADLF 190 or run on a PC which communicates with the ADLF. Computer programming for lighting calculations and correct lighting practice recommendations is known in the prior art. Commercial programs using procedures based on IES, ILDA and other standards and professional lighting engineering and design organizations are available. Lumen Micro® and Simply Lighting® from Lighting Technologies Inc are examples of such programs which provide tools to create and simulate lighting layouts for both indoor and outdoor applications. Simply Lighting® is a suite of Windows®-based lighting analysis tools that are designed to answer the questions you need answered using a step-driven application targeted at a specific lighting application. Lighting Analysts, Inc AGI32 ® is a program used to predict lighting system performance for any application from one to hundreds of luminaires, interior or exterior. Users can build environments for most any electric lighting application with unlimited luminaires, calculation points, and reflective or transmissive surfaces including day lighting effects. The program used in this invention is an adaptation of a state of the art lighting programs. It is capable of receiving data inputs automatically or manually interpreting them according to correct lighting practice and calculating the candlepower distribution from the illuminance back to the luminaire. A post processor and outputs the operational instructions to the controller 195 for the application at hand.

The operation of the system is demonstrated in home use, but the method is the same for office, store and industrial applications. The input program 7A is user friendly including the use of icons representing pieces of furniture, e.g. table, lounge chair, equipment such as TV, computer etc., and visual tasks being performed such as reading, and watching TV. The homeowner moves about the room with the remote control 201. At a specific location the homeowner enters the furniture type, possible occupant postures, sitting reclining, standing etc, and visual tasks to be performed. The room and its surfaces is defined the by being positioned at a wall, entering into 201 that it is a wall at that position and at another position entering that it is a window. The control unit 201 is optionally outfitted with a photometer 202 which can be used to read the surface reflectance of the wall and transmit the data to the lighting program 7A. This is the same process a lighting designer uses to enter data to the lighting analysis programs. The lighting program as known in the art then specifies the correct lighting levels, aimings and spectrum for the different locations and uses throughout the room. This is reversing the typical design process as described earlier where the lighting fixtures performance is simulated on a computer and the results calculated. Here, the required illuminance results are known first and the fixture is then programmed to make them happen. The controller 195 uses its stored performance characteristics to determine the power supply to the SLS so that it provides the required intensities and obtain the required illuminance. The lighting calculations and programming of the power supply 195 of the light sources 191 is preferably performed in real time such that the sensor 202 detects the illuminance to corroborate the performance while the homeowner is still at the location. If the lighting is not to specification, then the controller 195 readjusts the parameters so as to bring them in line. This trial and error process continues until the readings are within tolerance. The process is best carried out in the dark or when there is non-varying daylight. Alternately, the photometric reading sensors are on the luminaire and they are used to corroborate performance. Alternately, the process is automatic using feedback from the surroundings and pattern recognition to determine surroundings and applications.

Providing correct lighting for the various activities a homeowner in a room involves the use of numerous lighting regimes. Typically, he or she would move about the room performing various activities with diverse lighting requirements. First, moving from the table where work was performed on the computer to a lounge chair to read the paper and finally moving to the sofa for a little relaxation watching TV. In prior-art practice, several lighting fixtures of different design are used to carry out the different tasks. In order to conserve energy each one would have to be turned on and off or dimmed as the resident moves about the room. A glare-shielded luminaire would be used for correct illumination in the computer task, while a floor lamp may provide lighting for reading on the lounge chair. General lighting from an overhead luminaire is sufficient for TV viewing. According to the present invention, as the room occupant moves about the room performing varied tasks, the motion detector 200 or camera 197 picks up the new location and from its stored templates which correlate location to lighting application, controller 195 provides the correct lighting regime.

According to the teachings of the present disclosure, the room lighting needs are provided by one or more DLFs or ADLFs including satellites or combinations thereof placed such that they are capable of providing lighting at the correct non-glaring angles for the lighting tasks at hand. The ADLFs are programmed as to the whereabouts of furniture, computer monitors, TVs etc. as described above. The ADLFs and DLF can communicate with each other and an ADLF can control a DLF and vise versa so that level lighting is accomplished in the room. Two or more DLFs can share in the illumination requirements of a location located between them. The DLF turns off its illumination towards a specific location, reads the ambient luminance and then correctly powers the SLS to provide the additional illumination. An oscillating "singing" feedback network incapable of settling is prevented by the provision of inexact timing. The DLF lighting assessment process occurs on a periodic basis as the controller surveys its numerous detectors and SLS, the complete cycle taking a number of seconds. The same process is occurring in the neighboring DLFs. A clock on the DSP controls the process. The DSP is programmed to randomly nudge the clock timing by a number of a multiple of milliseconds typical of the survey process from cycle to cycle. The similar timed assessment process with an independently random shift in timing occurs on the adjacent DLFs. Thus, the chance of seesaw interaction between DLFs is insignificant. Alternately, communication between neighboring DLFs can also be used to synchronize the process and prevent feedback oscillations.

The novel lighting-application oriented approach to light-source construction, as taught by this invention impacts on the method involved with marketing the DLFs. Rather than speaking of a wattage for a lamp or lighting fixture, now with DLF technology, the area covered is the determining factor, somewhat like the coverage area of a can of paint printed on the container. The customer needs only to specify the room area and what the lighting is used for in order to select the correct luminaire. In today's prior-art process of selecting by lumen or wattage, there is an additional step, that of taking the effective lumen output and dividing it by the area of the room. Instead, a DLF is packaged and marked according to the area it will cover (when mounted at the designed for), mounting height (usually standard for most residential ceilings) and the lux it will provide or the visual tasks for which it is suited. Thus, a homeowner in a store will be queried by the sales staff or be presented with instructional promotional media which allows for the determination of the room dimensions, type of room and typical activities carried out therein. The lists printed on the cartons for the various DLFs will include location types and task types. Location possibilities for consumer lighting include corridors, kitchens, bathrooms, bedrooms, play areas, garages, driveways, backyard, playing fields, steps, workrooms etc. Task possibilities which would generally be a subdivision in a location type will include reading, dining, TV viewing, exercise, sport etc. A single DLF may be suitable for more than one location and task type and be so marked. Thus, typical DLFs would come in bathroom, kitchen, garage, bedroom, hallway, and etc. models. The bedroom model comes in a 12 ft. by 12 ft. Coverage and is also the TV room model etc. An ADLF is suitable for many more locations and applications and is so marked.

Industrial and commercial lighting DLFs are similarly marked and marketed. Mounting height determines the maximum area covered according to correct lighting practice principles and adds another variant less prevalent in the consumer market. The many DLF models will not exceed the plethora of prior art luminaire designs, as they are also based on mounting height and lighting application. While prior art luminaires rely on large reflector and every variant requires new investment in tooling, in a DLF a basic carcass will support many MSLS configurations with their particular amount of SLSs and their aimings.

In non-color critical applications for example in low lighting used for orientation a further energy saving can be obtained. LED junctions are made of different materials. The blue, green, and white illuminators utilize InGaN LEDs and the amber and red utilize AlInGaP for the junction material. Some materials are more efficient at converting electrical energy to visible light than others. As an example, (in terms only relevant at the time of this writing since the efficiencies are increasing daily), while a green LED which has the advantage of high photopic eye sensitivity to its wavelength, is producing only 30 lumen per watt, a super flux red LED can produce over 50 lumen per watt. Thus, when color rendering is not important in the lighting application at hand it is possible to shift the workload onto the more efficient LEDs. This of course must also take the eye sensitivity at the specific lighting intensity into account. While a purely scotopic rod eye response at extremely low light levels, less than 0.01 lux gives added sensitivity to the 510 nano-meter green blue, photopic vision at levels above 100 lux is most sensitive to the greenish yellow 555 nm wavelength. In most illuminated cases low lighting would not be below 5 to 10 lux where the sensitivity peak is around the 550 nm yellowish green. Thus, two factors are used by 7 in 7A to calculate the most efficient light color of the DLF; the LED radiation power per watt multiplied by the eye sensitivity curve for the present illuminance value. In a less rigorous embodiment, if the par between the LED efficiencies is large such as in the example above, then the red LED is used combined in ratios with other wavelengths, such that the color still found acceptable by the users.

In a preferred embodiment, using pattern recognition techniques the ADLF 190 is semi or fully automatic in programming itself to correctly function where installed. The DLFs or ADLFs will adapt to the seating arrangement of room occupants in real time. In the preferred embodiment, the addition of a machine vision system with pattern recognition capabilities as is known in the art, easily deduces room occupancy and usage. The camera 197 including a wide angle or fisheye lens camera is mounted on the DLF or ADLF. In an alternate embodiment, one or more cameras in communication with the lighting system controller, has coverage of all, or part of the area to be illuminated. The camera may also serve as an illuminance and spectral measuring device as the individual detectors in the array, for example as on a CCD or CMOS array, may be read for their individual stimulus. The detector array pixels are calibrated to the room coordinates. The calibration routine can be manual or automatic. A manual method includes walking a controller around the room and programming in the coordinate to the camera system or alternately using a PC CAD program to input room coordinates overlaid on the image obtained from the camera such that the lighting system coordinates and the camera coordinates are the same. An automatic routine as in 7A uses timed firing of a coordinate-specific light source, or array of light sources and the following reading of the camera detector of light reflected to that specific coordinates pixel, or set of pixels to corroborate action between light sources and the detectors. The detector pixels 197 can then be used to obtain images of the room which the controller 195 can assess as furniture, equipment or occupants. Pattern recognition methods known in the art, including neural networks, can provide a generalized stored application library of usages to the controller or the controller is an artificial intelligence controller and can learn the actual room usage with time. Outputs from the CCD arrays are analyzed by appropriate computational means employing trained pattern recognition technologies, to classify, identify or locate the contents. These techniques known in the art are covered in texts such as: Schalkhoff, Pattern Recognition, statistical, structural and neural approaches, John Wiley and Sons, New York, 1992 and Neural Networks for Pattern Recognition by Christopher M. Bishop, Chris Bishop, Oxford University Press; (January 1996) included herein by reference. Thus, the controller with or without human intervention will program the ADLF lighting system to carry out lighting within the realm of correct lighting practice. This includes providing the correct illumination in real-time based on occupant whereabouts, activity being performed and outside factors such as sunlight contribution, time of day factors etc. Advanced robotic vision techniques including object segmentation and selective-attention modeling (Itti, Visual attention and target detection in cluttered natural scenes in Optical Engineering, Vol. 40 No. 9, September 2001 included herein by reference) will aid in identifying various room objects and the lighting program 7A will associate with their location the visual tasks and recommended lighting characteristics. In case if the machine settings are not acceptable to the users, provision is made for human intervention. Through the data input device 201 a user, the ultimate "sensor" corrects or customizes the lighting arrangement and reprograms the controller.

In a further ADLF intelligent lighting system improvement over prior-art practice, machine vision is used to control surrounding luminance. A prime example is an office application where a computer Visual Display Terminal is in use. This is an application where the quality of the localized task lighting is important. Contrast plays a major role in seeing and glare plays a role in producing veiling reflections as causing fatigue. The correct illuminating solution involves the control of surrounding luminances. A prior art workstation design will include partition, carpet, ceiling and desk surface reflectance which reduce the luminance in the workers field of view. Using the ADLFs ability to recognize the computer screen chair, desk and surrounding floor and ceiling, the illuminance in lux on each element is varied to obtain the optimal luminance. That now allows any color scheme to be used by the interior designer on the work cell decor. The ADLF will control the luminance by varying the spatial light intensity distribution over the different surfaces.

In another embodiment using the camera 197, the controller 195 is instructed to identify and track a roving speaker during a video presentation. A signaling device is used by the speaker to allow the pattern recognition program to initially lock-on and recognize a target attribute as is known in the art of object tracking. The signaling device can be a laser light pointer 202 aimed at the camera or a hand held remote control 201 in communication with the camera vision system. The controller 195, based on the camera input runs the pattern recognition routines, derives the coordinates and generates instructions to drive the specific light sources with aimings which will project light at the speaker as the speaker move about the room. It is to be understood that in a theater lighting application there is no need for a preprogrammed moving light using motors to change position. Instead a fixed DLF or ADLF with multiple light sources powers the necessary light sources to illuminate the performer as he or she moves about the stage. This actually is similar to the banks of shuttered lights used in present day stage lighting. Only now the digital aspect of discrete multiple light sources allowing for a smooth transition of aimings with instantaneous control of almost infinite variation of spectrum and intensity is accomplished. The controller, once locked-on to the performer using images from the camera 197, will now follow the performer around the stage illuminating instantaneously in the intensities and spectrum as preprogrammed in the choreographic setup or in correspondence to the music or some other characteristic as in known in stage lighting practice.

An emerging problem with LED light sources is that with the increase in light conversion efficiency the LEDs are becoming ever brighter and for their small size present uncomfortable sources of glare. These high intensity light sources would have to be used with diffusers which would impair the light control characteristic. One solution is to construct the DLF large enough such that the area over which the light flux emanates is sufficiently large that the luminance in candela per square meter will not exceed allowed luminous exitance values or glare limits. In this solution of increasing the luminaire area over which the light emanates, the number of light sources at specific location may not be sufficient to provide the continuum of light distributions and spectral combinations necessary to carry out correct lighting practice as per the teachings of this invention. Another way of looking at the problem is, that with added lumen output, a few high-performance LEDs could provide the illumination for a room but due to even distribution and spectrum consideration many discrete SLS are required. That is, the SLS needed for the smooth continuum, digital aspect of the invention exceeds the number required for the maximum light flux.

In a preferred embodiment the DLF or ADLF is rotated about an axis such that the time any source in the glare causing zone is exposed to an observer's eye is such that it is not observed as glaring and the time the source is out of view is below the flicker rate for that intensity level. HID and fluorescent lamps operated on 50 Hz have a 100 Hz flicker rate and are not considered to flicker. For aesthetic, aerodynamic and dynamic balance reasons the DLF can appear as the globe shape 190 of FIG. 12. However, the now reduced dimension DLF is spun rapidly on its axis 227 by motor 206. The LEDs can be concentrated in an arc from top to bottom along the surface 192 or be located in the concave arc section 198. The concentration of SLS in this section is sufficient to offer a large number of spectral combinations at any aiming. Two arcs of SLS 191 opposite each other for balance or one arc with counterweight can be used. With one arc a 6,000 RPM rotation rate is used to prevent flicker and with two a 3000-rpm rate. In an alternate embodiment instead of a complete globe just an arc section such as 198 runs from top to bottom. The arc is on an axis and is motorized so it rotates rapidly on its axis. The speed of rotation is such that the light source does not appear to flicker. This way a compact unit can be made since the apparent brightness is reduced. This process is possible because the eye is an integrator of light over time and persistence of vision minimizes flicker. The LEDs 191 disposed along the surface are timed to fire in the correct intensity according to the instantaneous position. The timed operation is coordinated with room location. Thus, when the spinning light sources 191 are facing a corner more intense light at higher angles is projected so the far corner is illuminated equally to the areas near the DLF. The positionally correlated timed firings of the rotating DLF will illuminate as need per location per usage requirements in real time. The side of the room near the window receiving ambient daylight will receive less illumination than the opposing darker side. This is also possible because the controller electronic 195 operates much more rapidly than the mechanical motion and that the rise time of the SLS is extremely fast measured in single digit microseconds. In a preferred embodiment, the globe or arc can be placed in an outer jacket which is partially evacuated of gas. The globe or arc is then rotated in a partial vacuum envelope to reduce air friction losses.

In FIGS. 13A through 13C a streetlight fixture designed according to the teachings of this invention is shown. The design and functionality distinction as compared to prior-art streetlights is derived from the multi-light source, digital design. In FIG. 13A the aesthetically designed DLF streetlight 240 is shown in a front view. The geometric shape is a derivation of the surface geometry for mounting the SLS perpendicularly thereon to obtain photometric light distribution compatible with the requirements of the street lighting application. These photometric distributions are expressed in terms of luminaire cutoff angle which refers to the angle beyond which rays capable of producing glare are prevented from exiting the fixture. Another type of classification used by the IES, refers to the elongation of the light pattern along the road in terms of Long, Medium and Short and another categorization, perpendicular to the roadway called "Type", describing the distance in units of mounting height (where the fixture is mounted), that is illuminated. The novel design includes SLS with over 100,000-hour lifetime allowing for the fixture to be factory sealed for life. This obviates the need for cleaning reflectors, as all the exterior surfaces are cleanable by rain and there are no light sources at the sharp bottom drip point where dirt normally accumulates. The compact design 240 shown mounted on a pole 241 in side view FIG. 13B has a small exposure area, reducing wind induced drag force loads on the pole. This low wind factor and low weight of the electronic components allows for the use of a less expensive pole. The pole arm 242 fits into slipfitter 243 which is provided to perform the mechanical fixing means of the DLF 240. FIG. 13C is a side section view through the center of the fixture. The electrical power and communications connection is made to a connector block 244 mounted such that it accessible for the external wiring of the fixture during installation. The grid power is connected to power supply 245 and the data to the controller DSP 246. A dedicated communications line is used, or the data is sent over the power line using communications protocols as known in the industry and the DLF communicate with each other or with a central control. The SLS aimings are shown in front view FIG. 13A where the SLS aimings to the right 247 and left 248 along the roadway show how an even distribution pattern out to the maximum design distance from the pole center is obtained. This distance is a function of the fixture mounting height and cutoff angle. Hole-through SLS units have been drawn to illustrate the point but the principle the design is valid for SMD, SMT, the chip 94 design of FIG. 6 as well as other package arrangements known in the art. Many more SLS 249 are concentrated at the larger angles 250 to illuminate out to the extremes of the area covered by the DLF. Fewer SLS 251 are needed at the small angles near the pole to maintain with equal illumination. The SLS at the cutoff angle 250 have a tightly controlled beam spread 252 to maintain a sharp cutoff, minimize glare and eliminate spill light. The SLS 253 in the interior have a wider beam spread 254. The DLF 240 projects light in a highly controlled pattern perpendicular to the roadway as well SLS 255 as seen in the side sectional view FIG. 13C are aimed such that the cutoff angle 256 is out to the road width with or without the shoulders as designed. In applications where illumination for a sidewalk is required, "house side" illumination is provided by inward SLS aimings 257. On a dual carriageway road where the illumination provided is limited to a single carriageway, the lighting from the roadway fixture need not be symmetric about the nadir along the roadway. While approaching the streetlight, glare is to be avoided and the cut-off angles must be small for light aimed at the advancing vehicles. However, after passing the streetlight, the lighting in the direction of travel may be provided at increased beam angle from nadir and still not cause glare. This would significantly increase pole spacing saving cost and eliminating hazardous poles.

In all stages of the SLS positioning and aiming design process which works in reverse of the normal process by engineering from the illumination required on the working surface back to the light source. Glare ratings for the design are checked to make sure they are within the acceptable limits. If the light source concentration is such that drivers or pedestrians in normal eye viewing conditions would experience glare, then the luminous exitance is lowered by design changes in the geometry or light source attributes. The ramifications of a dynamic and exact light control are numerous in a street light luminaire. First there is no spill light and no light trespass. If the position of a luminaire is such that light is shining into a house the individual SLS at that aiming is not powered by the control 246. All the light power is placed where needed in the designed for illumination intensity, neither in deficit nor excess. While prior art luminaire show 80% of the light falling in the area designed to be illuminated, the DLF will have a near 100% utilization factor.

When artificial intelligence methods known in the art is combined with the fine control and functional flexibility of the DLF additional advantages are realized. A detector or camera 258 in concert with a logic controller 246 is capable of providing the road lighting needs to a driver or group of drivers in according to the time of day, needs of the roadway layout and usage at any moment. The detector 258 will provide signal to the controller 246 of the ambient lighting conditions. When daylight is no longer sufficient for viewing such as at dusk the DLF will add lighting. At dawn the process is reversed. In an alternate embodiment the roadway lighting can be dimmed if there are no approaching vehicles. The detector or camera 258 is capable of detecting oncoming and retreating traffic. The headlights and backlights are used, or more sophisticated pattern recognition is used to determine traffic on the roadway. When there is no traffic the luminaire will illuminate at a fraction of the power used to generate the 5 or 10 lux used in street lighting. Taken to the extreme the controllability of the DLFs or series of communicating DLF street lights allows for the lighting to precede the vehicle by the stopping distance, say 300 ft. at 65 MPH (91 meters), and dim the unused lighting behind the driver if it is not necessary for other drivers. In the late hours of the night when traffic is low this function can save significant amount of energy. A typical 250 W HPS streetlight will consume over 25,000 Kwh in its 20 yr. lifetime. On moonlit nights the dimming of the DLF can be greater as moonlight provides up 0.10 lux. The dimming of SLS actually improves their lighting efficiency and prolongs lifetime. Dimming of HID sources has a negative return, typically 10% light at 50% power. The color spectrum of the light is also varied in the DLF to match the intensity levels. Here an additional efficiency boost is achieved when the added scotopic eye sensitivity to 510 nm bluish white similar to the pale moonlight is taken into account.

It has been shown that certain colors of light i.e. of different spectral power distribution (SPD) are perceived to be more glaring than others in night driving. Studies of drivers (Flannagan, M. J., (1999). Subjective and objective aspects of headlamp glare: Effects of size and spectral power distribution, Report No. UMTRI-99-36). Ann Arbor: The University of Michigan Transportation Research Institute.) indicate that blue-white color has been found to cause more glare discomfort than yellow light. On the other hand, studies have shown that driver night vision is better under the blue-white spectral power distribution. Recent laboratory studies have also shown, for example, off-axis detection peripheral detection can be better for bluish, metal halide lamps than for yellowish, high pressure sodium lamps at the same photopically specified light level (Bullough, J. and Rea, M. S. 2000. Simulated driving performance and peripheral detection at mesopic light levels, Lighting Research and Technology, 32 (4), 194-198). In the DLF streetlight luminaire it is possible to use the blue-white SPD to illuminate most of the roadway yet increase the cutoff angle, which is determined by glare considerations, by using yellow-white SPD light at the large angles which throw the light further along the road. The higher angle lighting provides more vertical lumens and is actually more effective at illuminating objects along the roadway. The increased visibility afforded by the added vertical lumens at high angles offsets the decrease in visibility due to the yellow-white SPD. This means that the overall visibility over the roadway sections is constant. Thus, SLS near the angle 250 would have a yellow-white non-glaring SPD while interior SLS such as 253 would have the superior blue-white SPD. The higher the cutoff angle, the fewer luminaires that are required to illuminate a roadway. The same differentiation would be possible with SLSs 255 in the side view of which some illuminate the sidewalk 257, some the right lane and others the left lane. The SPD of the SLSs at the high glare causing angles 250 facing the oncoming driver aimed to cover the near lane would be yellowish while those SLS covering the same lane but now to the rear of the receding driver, will still be of bluish-white SPD. The opposite is true for the far lane. The SPD of the SLS aimed 257 at covering the sidewalk would again be in the blue-white to aid in peripheral vision detection of pedestrians or objects approaching the roadway from the side.

As with all correct lighting practice the visual surroundings at any instant in time determine the amount of illumination required to carry out visual tasks including the luminance of background surfaces. Roadway luminance as detailed in the IES Handbook pages 751-779, is the preferred factor used in specifying required illumination levels. Freshly paved blacktop with its diffuse reflection will change over time to a mostly specular reflection. The higher luminance value pavement requires less illumination to see objects. This characteristic changes over time with wear and periodic road maintenance and illumination levels need to vary accordingly. A detection by 258 of this road luminance will provide the controller will the data necessary to set the required illumination. Roadway activity is another factor in determining illumination levels. This factor often changes over days of the week or seasons of the year. An adaptive DLF with detectors 258 and computer devices 246 capable of recording this traffic activity will provide the correct illumination for the traffic situation at hand.

Though the design of a streetlight has been detailed the same design process is valid for floodlights and other outdoor lighting applications. The use of the SLS of specific spatial candlepower distributions at particular aimings, the use of tighter beams at the edges of coverage, the non-glare design and the optional use of logical control are as applicable to DLF floodlight design as to the street light design.

Figure 14:
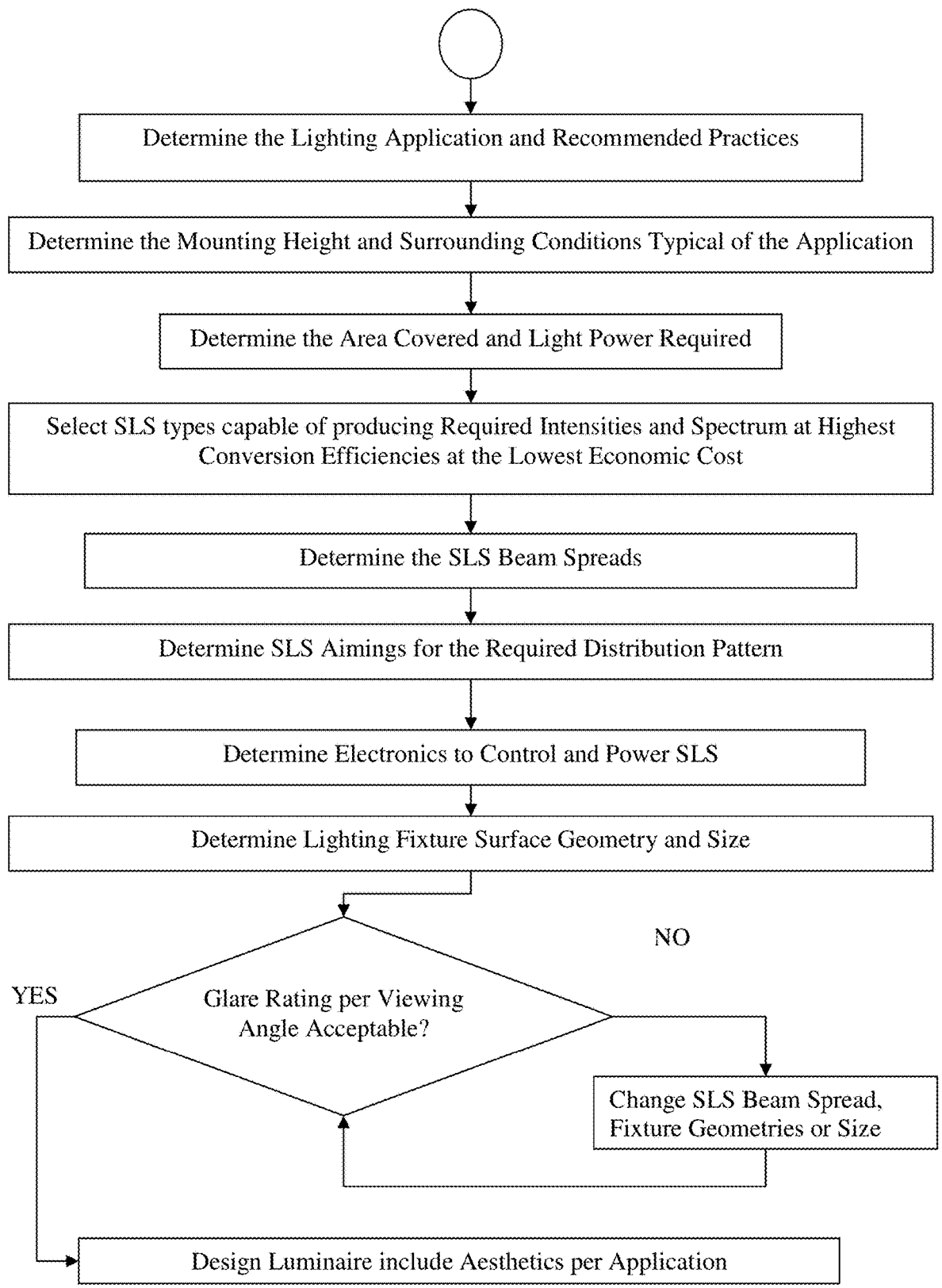
FIG. 14 is a flowchart of a typical design procedure for a multi-source lighting fixture of the present disclosure

FIG. 14 is a flow chart which illustrates the general design concept which allows anyone to build a multi-light source lighting fixture from the ground up, tailor made to the final application. This process differs fundamentally from prior art lighting fixture design. Rather than building a fixture around a common lamp and then coercing the usually isotropically radiating lamp to perform in a certain application, the lighting application is used to describe the light source construction. The light source construction is unique in that its flux density is spatially differentiated over its volume in concert with its final orientation when in use. The light source design then defines the supportive power, control and mechanical elements. These elements are then integrated into a single unit with shared components and packaging. The method for designing an application oriented luminaire designed according to correct lighting practice, providing the correct light intensity, spectrum, and spatial distribution of intensity and spectrum, suited to the specific lighting application, would comprise a number of steps some of which can be left out of the process while others may be added including a) determining the lighting application, and the recommended lighting practices for the application b) determining the luminaire mounting height, illumination area covered and surrounding conditions typical of the application c) determining candlepower required to effect the required illumination over the area d) selecting SLS types capable of producing required intensities and spectrum at highest conversion efficiencies at lowest economic cost e) determining SLS beam spreads f) determining SLS aimings for the required distribution pattern g) determining electronics to control and power SLS h) determining lighting fixture surface geometry and size i) testing whether the glare rating for the viewing angle is acceptable j) if the glare rating is not acceptable, then changing SLS beam spread, fixture geometries, or size, resulting in an acceptable glare rating; and, h) when the glare rating is acceptable, then designing the luminaire aesthetics for the application.

The digital lighting concept is extended to transportation vehicle applications. A headlamp for an automobile uses multiple light sources based on electro luminescence of semiconductor junctions. The proposed unique approach is to combine the lighting engineering function i.e. the correct light distribution, color spectrum and level necessary for the visual task at hand into the lamp, such that the digital lamp obviates the need for additional light controls and fixtures. The digital electronic lamp utilizes ⅓ the energy and has over 100,000 hours lifetime versus 2000 for an automotive incandescent lamp and can be rapidly switched on and off without deleteriously affecting lifetime (Quite the opposite, off time is not part of the lifetime). The multiple light-source, digital device, is an electronic headlight which provides the driver with the correct aiming, illumination level and distribution (e.g. parking lights, low beam, high beam, lighting around curves and corners) based on input from the vehicle's speed, steering wheel position, turn signal indicator and detection of approaching headlights. These functions are carried out automatically however; the standard manual override controls are still maintained.

Headlamp glare is addressed in two alternate ways. European regulators recognize the danger presented by excessive headlamp glare, and so European cars with HID lamps must have dynamic headlamp leveling. On-the-fly headlamp vertical aim adjustment has been required by European directives for quite some time now, but dashboard dial control of the vertical aim is no longer acceptable. Recent European regulations require that the headlamp leveling of HID-equipped cars be linked to the suspension system of the car so the lamps don't glare as much to oncoming traffic when the rear of the car is loaded-down or the car is heading up a small hill. The digital headlamp solves this problem by automatically sensing the angle of the headlamp assembly and will employ in real time only the properly aimed light sources to illuminate so as not to glare oncoming traffic.

An alternate method of glare control is accomplished by rapidly switching on and off the headlamp light output or only the high beam portion thereof at such a rate that flicker is not observed by the driver. This persistence of vision is the same effect on which motion picture viewing operates using shutters to intermittently block the light while the frame changes. On the oncoming vehicle, a variable light transmitting element, an electronic shutter, located in the driver's field of view is rapidly switched to a blocking state synchronized in time with the on state of the oncoming car's headlamp. The situation is vise versa for the driver in the other vehicle such that in the instant one driver is seeing the other is not.

The Spectral Power Distribution, SPD, of the headlamp is also variable as a function of the area being illuminated. Studies by Flannagan cited earlier, have shown a preference by drivers for yellow tinted headlights on oncoming vehicles. The drivers find the yellowish colored light of an incandescent less glaring vs. the bluish "white" light of an HID Metal Halide lamp. On the other hand, recent studies by Bullough, cited earlier, on driver's peripheral night vision show the clear benefits of HID MH headlamps in detecting pedestrians and objects along the side of the road. Thus, an ideal solution is to have the SPD in that part of the beam visible to oncoming drivers be of the less glaring yellowish type while the beams headed everywhere else would be of the blue-white SPD for increased driver visibility. In fog or snow the color spectrum would also be adjusted so as to maximize visibility. Yellow colored lights are used in fog and snow conditions to prevent flashback. Thus, according to the teachings of this invention the DLF headlamps serve as the fog-lamps. The digital headlamp will automatically or manually be adjusted to the optimal intensity and SPD lighting parameters for the environmental conditions at hand.

Present advances in automobile lighting include Adaptive Frontal-lighting Systems which aid in seeing around curves and other features in the road. In these systems the light distribution pattern and color spectrum will be changed according to the instantaneous road conditions at hand. Thus, the headlamp now has much more flexibility than the high beam/low beam variation of today. At any instant in time the intensity, spectrum and beam pattern of the headlamp may be varied as a function of the driver's intent, lay of the road and environmental factors. A GPS system on the car may also let the headlamps system know of curves up ahead, one-way traffic and others factors such the headlamp may be operated in the optimal mode at that instantaneous location. With sensors sensitive to environmental surroundings such as ambient light, fog or snow conditions etc. lighting can be adapted to the optimal operating regime.

Additional features include an optional concentrated flashlight type of beam to illuminate distant overhead and roadside signs, which due to the narrow, directed beam will not blind oncoming traffic. Image recognition via a camera will allow the beam to follow the retroreflective sign as the vehicle moves or the signs will be provided with a special marker for this purpose. In this way the headlamp cutoff above horizontal except for the concentrated sign beam can be total.

Figure 15:
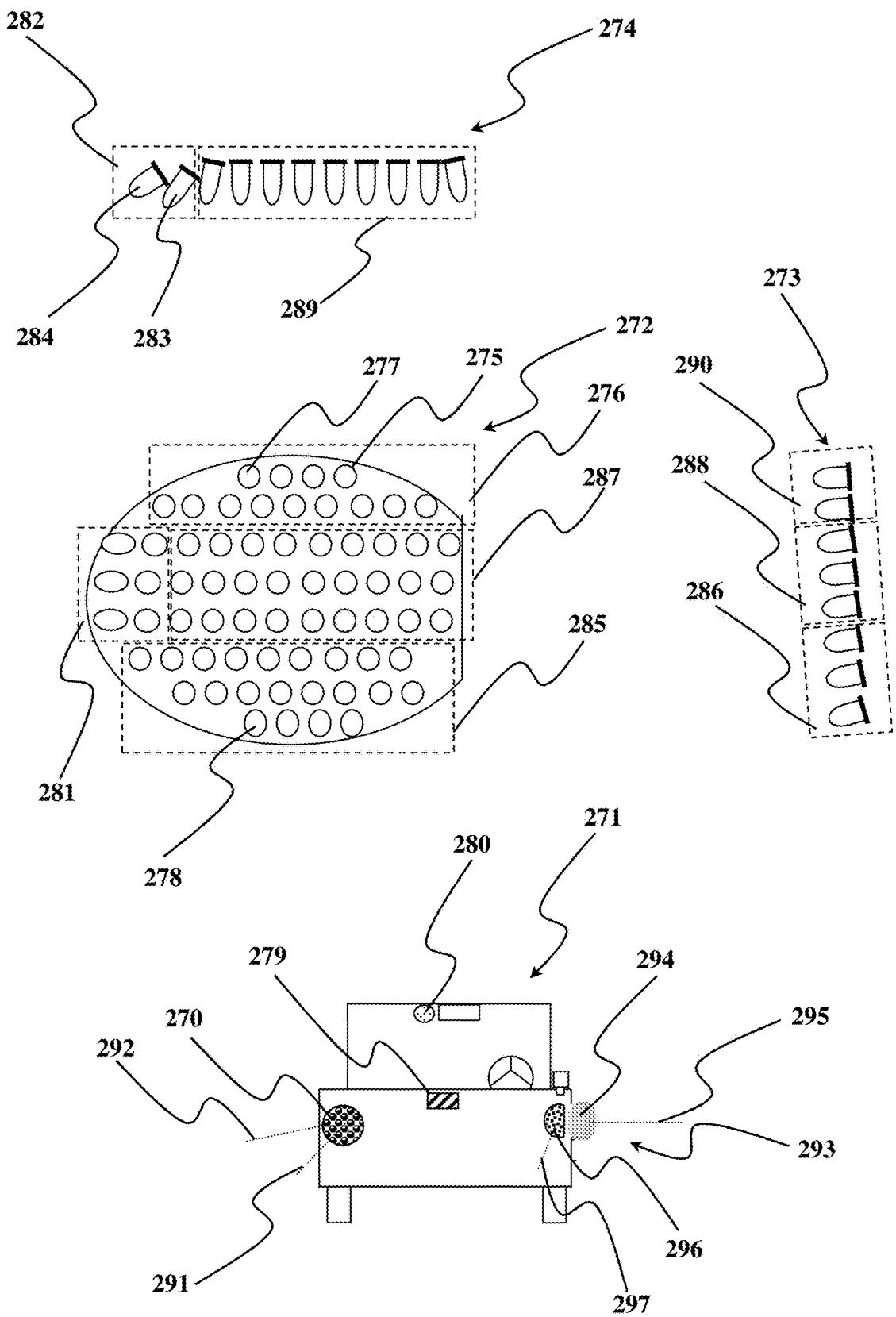
FIG. 15 shows a multiple light-source headlamp capable of optimally carrying out the diverse illumination functions used in driving under various environmental conditions and surroundings.

FIG. 15 illustrates a preferred embodiment of a digital automotive headlamp. A headlamp is a specialty lighting application unrivaled in terms of the need for controllability and is especially suitable to the methods and devices described in this disclosure. The headlamp fixture is unique in the continuum of beam patterns, intensities and color spectrum. The number of possible control modes are: 1. Parking Lights. 2. Low Beam lights; 3. High Beam; 4. Cornering Lights; 5. Load leveling adjustment; 6. Integral turn signal indicator, 7. Programmable alternate beam spread selection so that one headlamp fulfills the different sets of legal regulations for the high and low beam in different regions of the world such as the U.S.A., Japan and Europe; 8. Driver preferential color; 9. Oncoming vehicle or vehicle-ahead driver's preferred color 10. Color of ambulances extra headlamp provides red flashes to be more easily picked up in rear view mirror; and 11. Non-Glaring pulsed headlamps.

Input data to the controller would first and foremost be in the control of the driver and would consist of an overriding manual selector switch. Otherwise headlamp control is automatic, from turning on automatically when ambient lighting levels fall to such a level where it is advantageous to have headlamps on, either to aid in illuminating the way ahead or facilitate being seen by others, to automatic dimming of high beam due to detection of oncoming vehicles and shut off when ambient lighting levels are sufficient. A possible control system for such purposes is described in U.S. Pat. No. 6,281,632 by Stam, et-al from Aug. 28, 2001 titled: A Continuously variable headlamp control incorporated herein by reference. The patent describes how continuously variable headlamps offer greater flexibility for roadway illumination but offer challenges in automatic control design. Each continuously variable headlamp has an effective illumination range varied by changing at least one parameter from a set including horizontal direction aimed, vertical direction aimed, and intensity emitted. Stam discloses a system for automatically controlling continuously variable headlamps on a controlled vehicle includes an imaging system capable of determining lateral and elevational locations of headlamps from oncoming vehicles and tail lamps from leading vehicles.

Using a control system such as that above, many driver functions are automated. With the digital headlamp, automatic control of headlight beam is a function of speed of travel, that is: when vehicle is in Park the parking lights are on, when speed is low the lamp beam is aimed sufficiently forward to give ample reaction to brake for objects in the vehicle's path per the speed it is traveling up to the intensity, angle and thus distance which is the upper legal limit for the beam. If there is no oncoming traffic, then it operates as the high beam. If there is oncoming traffic, then it acts as the regular low beam.

Additional features can include an optional very narrow flashlight type of beam. Present day LEDs come in very narrow aimings such as two half angle 8 degrees which may not be narrow enough (a 10 meter spread for 150 meters down the road which may be sufficiently aimed to the right) but with need, smaller angles are also feasible. Such a beam at the correct narrow aiming can continue to illuminate far ahead (in high beam) without blinding oncoming traffic. Analysis by a detector or an imaging system of the oncoming vehicles position (using its headlights for example) can be used to determine which exact aiming is the maximum allowable for any given traffic situation and road layout.

Using color and pattern recognition techniques it is possible to determine what is a sign. It is then possible to provide the equivalent of "task lighting" and use the controller and properly aimed SLS to follow and illuminate distant overhead and roadside signs for a longer time, yet not blind oncoming traffic due to the narrow beam.

Wavelength specific SLSs in the infrared or near Ultra Violet spectrum, not visible to the driver by the unaided eye are used for communication between vehicles and roadway controllers or toll booths. Infrared SLS will provide radiation to be reflected from objects for night vision cameras. UV SLS are used for or illuminating UV fluorescent dyes in clothing bicycles and baby carriages to increase pedestrian visibility as is known in the art.

In FIG. 15 a headlamp 270 of a land, sea or air vehicle 271 is shown in front view 272, side view of a section 273 and top view of a section 274. A discrete SLS light source such as an LED 275 with specific location within the cluster 276 has a specific spatial light distribution, color wavelength and aiming relative to the vehicle, such as straight ahead, and or downwards and or off towards the right or left. The SLS may have one junction and be monochromatic or have many junctions and provide a wide spectral power distribution and the power to the SLS may be varied. An SLS can also be a "white" LED. For example, a typical "white" LED such as a Luxeon® white LED such as LXHL-XXXX will have a colder "bluish" 4,500K color temperature. LED 277 at a second location within the same cluster may have a similar or dissimilar aiming, wavelength and spatial light distribution. The concept cluster shown by the dashed lines, is used to describe a control function and is not necessarily related to contiguous placement. In general, a cluster may be deemed a separate grouping due to a function it performs, either exclusively or in conjunction with other clusters or sub-clusters, such as high beam function versus a second cluster 278 which may provide a parking light function. The same SLS may be used, albeit at different intensities, for both the above functions and thus clusters may overlap and be discontinuous. As two LEDs may be of different wavelengths, operating in unison at different power levels will yield a variable light "color". A possible combination of two or more LEDs such as a blue, 470 nanometer and an amber 590, nanometer wavelength LED would yield a "white" light similar to the yellow tint of sunrise at the correct power intensity setting for each lamp. Coincidently aimed LEDs 275 and 277, at the correct output intensity of each LED, with more power in the amber will accomplish this. Thus, when following another vehicle, assuming, as drivers have reported, that they find yellow incandescent colored headlamps less offending than the HID blue-white color, the external controller 279 which receives traffic data from sensors 280 would shift wavelength specific radiant power contributions of SLSs such that the resultant on the CIE chromacity diagram would be yellowish. If, however, there is no car immediately ahead or oncoming traffic, then assuming as drivers reported they see further with bluish light, then the energy of the 490 nanometer LED is increased, and the resultant color will shift to bluish white, allowing the driver to better ascertain road conditions further up ahead. The LEDs, their packages, wavelength and light source type are mentioned by way of example and it is clear that any other types of discrete light sources, such as the chip 95 of FIG. 6, with differing aimings wavelengths and distributions could be used to accomplish the same functions.

To further illustrate the innovative DLF headlamp device, a cluster 281 would be used to illuminate around a corner. Thus, when the turn indicator has been selected or the steering wheel has been rotated by the driver, the DLF headlamp is powered by the controller to illuminate sideways at angles which according to the speed of travel is correct. (A driver can't make a 90-degree turn traveling 90 km/h but from a stop, the turn may be around a corner.) In a preferred embodiment a multitude of LEDs in 281 are differently aimed in top view 274 showing the top view of the cluster 282 with SLS 283 angled less outwards and SLS 284 angled more outward with the forward aiming (distance ahead of the vehicle) of the more angled SLS 284, closer in for illuminating sharp turn, than that of the less angled SLS 283 for a shallow curve. Side sectional view 273 shows a general downward aiming with SLSs of front view 272 cluster 285 corresponding to cluster 286 shown from the side. The cluster 286 is the most angled downward such as for a slow driving as in a parking light type of application where the idea is not to cause glare yet to be seen. The parking light function can also be done with higher angled LEDs by just lowering the intensity to very low non-glaring intensities. Cluster 287 of the front view would be the main illuminating workhorse and is shown in side view 273 as angled SLSs in cluster 288 and top view 274 as cluster 289. The top cluster 276 shown in side view 273, as 290 would perform alone or in tandem with part of 287 the high beam lighting function.

Many more degrees of flexibility are possible with the digital headlamp by varying the timing of the LED operation. For example, more intense illumination of red LEDs for a fraction of time would give the effect of flashing ambulance lights if required by the type of vehicle and could be effected by programming alone without the need for a different type of headlamp greatly reducing the different types of headlights that need to be installed on a vehicle or maintained in inventory. That is the same MSLS light engine device could be placed in different aesthetic packages by different manufacturers and could provide different functions. In one embodiment the digital headlamp carries out all the functions in a single unit 270. SLSs have different locations and aimings 291 and 292 to carry out the functions. In another embodiment 293 the spotlight sign illuminating function or corner lighting function is in a separate package 294 with its aiming 295. The low and high beam lighting is accomplished with fixture 296 and its general aiming 297. The separate units may be dictated by design or sales considerations and yield more flexibility but are within the scope of the overall integral digital lamp headlight device. The controller 279 will addresses the power supply of each DLF headlamp 270, 296 and 294 independently such that each lamp performs its functions separately.

In another embodiment FIG. 16 the digital headlights 300 and 301 on vehicle 302 are also part of an anti-glare system operating between two or more vehicles 303. The system is designed to prevent discomfort and disability glare from oncoming headlights or glaring headlights viewed in the rear view or side mirrors. The anti-headlight-glare system works based on the "persistence of vision" of the human eye-brain system and is accomplished by the synchronization of the illuminating and light attenuating or blocking devices which intermittently enable the driver to see the night scene ahead but not the counter-timed glare of oncoming vehicles. The elimination of blinding glare will increase traffic safety, as a driver may lose vision may for a number of seconds following a glare event. It will also prevent driver fatigue caused by glaring headlights. Another of the advantages of the anti-glare system is that it increases the distance that a driver can see at night by allowing the use of more powerful headlamps aimed at higher angles, thus illuminating more of the road ahead while not blinding oncoming traffic. The anti-glare system consists of pulsed headlamps 304 and 305 on the oncoming vehicle 303 and a synchronized on/off switched light filtering or blocking element 306A in between the driver's eyes 307 and the glare sources 304 and 305. The light attenuating element is normally highly transmissive of light i.e., see-through. When energized, the light-attenuating element turns non-transmissive and attenuates or totally blocks the glare intensity. The attenuating element is similar in operation to the fast-acting automatic darkening welding helmets commercially available, only here the off switching is also very rapid. The glare, or light-attenuating element may be the windshield, a part of the windshield be a specific element located on or within the windshield 306A and 308A or on a visor located in front of the driver shown in 306B and 308B. The light attenuating device 306A or 306B is synchronized with the oncoming headlight such that when low-beam or even high beam, glare causing headlamps 300 and 301 of vehicle "one" 302 is "on" the light attenuating device 308A or 308B on vehicle "two" 303 is toggled into a mode which reduces or totally blocks the light beams. Conversely, in the next instant, when the headlamps 304 and 305 of vehicle "two" 303 is "on", that is, in the glare causing mode, the light attenuating device 306 on vehicle "one" 302 is switched into a mode, which reduces or totally blocks the light beams. The light-attenuating device 306A or 306B consists of an LCD, ferroelectric, SPD, electrochromic or any other medium that can be switched between substantially light transmitting to substantially light blocking in the form of a screen, visor or film. It may be placed on the windshield from without or within, in between the glass layers of the windshield safety glass 306A or positioned anywhere in between the driver's eyes and windshield 306B including being worn as eye glasses. A motorcyclist would have it installed in the visor of the helmet or on a windscreen. The speed of vision is slow relative to electronic pulsation and depending on the illumination level persistence of vision will fuse on/off levels into a constant flicker free level. Motion pictures operate at 24 frames per second. For scotopic nighttime levels 10 HZ is sufficiently flicker free while at high levels of illumination 60 Hz is required. Totally flicker-free operation is assured at 120 Hz operation even for peripheral vision which is more sensitive to movement.

LEDs are excellent light sources for a pulsed lamp since they are not damaged by on/off cycling (actually off-time adds to the overall lifetime) as are the prior-art incandescent and other cathode-based lamps. Rise time to full output is on the order of microseconds, much faster than necessary. The pulsed SLS is operated at a higher power during the on-time of the duty cycle to offset for the off-time in order to produce the required illumination. This is typical of normal LED operation which may be run in DC mode or pulsed, AC operation. Actually, HID lamps cycle on/off at twice the line frequency and the eye integrates the light intensity over time. However, it should be understood that incandescent or any other lamp switchable within the constraints of the flicker free visual requirement are acceptable for use according to the teachings of this invention. In an alternative embodiment, the lamp may be a state of the art incandescent, halogen or HID lamp and the switching is accomplished by an additional light-attenuating element placed in front of the light source. Alternately, electronic signal control circuitry can rapidly switch an HID or incandescent headlamp used in the anti-glare system. The lamp need not totally turn off, the requirement is that during the seeing portion of time when the driver's light attenuating element is letting light through un-attenuated, the light intensity reaching the eye is non-glaring. Therefore, it shall be considered that present state of the art incandescent and HID headlamps operated in a pulsed mode fall under the realm of the present invention. That is, any headlamp system where the high beam is toggled such that it is synchronized with a light-blocking element before the driver's eyes in the approaching vehicle is included within this disclosure. It is also to be understood that the headlamps when not in high beam mode may not be totally off rather they can be in a non-glaring low beam mode. This leaves the vehicle visible to oncoming traffic.

It is to be understood that for the system to work, all oncoming vehicles using high beam synchronized blocking must be working according to the same timing among them versus all the traffic headed in the opposite direction. A timing protocol based on major heading determines the synchronization. Thus, on a substantially north south route, a train of traffic headed north will all be similarly timed, and counter synchronized with all southbound traffic. The blocking screen's timing is synchronized with the oncoming high beam headlight's timing either universally, through a global clock system such as that of the global positioning system GPS or the National Institute of Standards and Technology atomic clock broadcast over radio station WWVB located in Fort Collins, Colo. or locally through communication among vehicles in proximity to being within the line of sight. A combination of directional data together with a timing protocol based on direction will determine the synchronization among proximate north/south and east/west-bound vehicles. The vehicles direction data is derived from an onboard compass or gyro or GPS to eliminate the influence of roadway curves in cases of borderline directionality, the vehicle's direction for synchronization is not the instantaneous reading but rather is based on distance traveled over time and previous headings history. A stop and turn for example will change the synchronization while a smooth curve will wait for an oncoming cars synchronization to indicate that the road ahead is actually in a new heading unless sufficient elapsed time makes it clear the car is on a new course. The protocol will give benefit to the north on a 45 degree North/East heading and to the south on a 135-degree heading. GPS location and route recognition can also be used to set synchronization protocols for opposing vehicles. In one embodiment, the communication between vehicles for synchronization is effected through the headlamps themselves either through modulations in visible light LEDs of the digital headlight itself or with LEDs, radio or infrared emitters dedicated for the purpose 173. Detectors 174 on the vehicle, pick up the signal and signal-processing equipment passes the information on to the controlling unit 175.

Glare attenuating elements can be placed over the mirror surfaces or the side windows where the glare from the side mirrors passes. Thus, not only the glare from oncoming headlights through the windshield is blocked but also glaring beams emanating from following vehicles, reflected off the rear and side view mirrors is controlled. To eliminate glare off the mirror 176 from reaching the driver's eyes from the side mirrors 177, a pulsed blocking screen or film 178 is placed on the driver facing side of the mirror's the reflecting surface. Similarly, a rearview mirror 179 is embodied with a pulsed blocking screen or film. The timing of the modes in this instance is such that the light-attenuating mode occurs at the same time as the glaring or high beam headlamp mode since all cars in the same direction are in glaring mode at the same instant. All mirrors are synchronized to block the headlight glare coming from the rear which are on at the same synchronization time as that of the first lead vehicle in the traffic train.

In another embodiment additional information used to control the headlight aiming can come from analysis of the driver's eye movement and gaze. The headlight aiming system obtains information from a driver eye tracking system concerning the driver's gaze (i.e. what the driver is looking at). Analysis of saccade can be used to instantaneously predict where the driver will end up looking and the headlight intensity in that aiming changed to illuminate the area where the driver wishes to see in advance of the driver's re-accommodation. A machine vision system using pattern recognition and other object identification techniques to discern eye gaze direction, is contrived of the camera 316 with a view of the driver's eyes, infrared emitters 317 and the computer logic system 311. The data obtained is analyzed according to eye tracking methods and algorithms known in the art of in a computer routine 7A to adjust the light aimings of the headlamps according to the drivers gaze at required intensities. The allowed intensities at any aiming take glare considerations into account so as not to cause offending glare. In another embodiment an outward and inward facing camera 316 is used to acquire both images of the scene ahead and the driver's gaze and using both sets of data adjust the headlamp illumination.

Accordingly, it has been illustrated in the streetlight and headlamp application the benefit of a multiple-light source illuminating device. The flexible characteristics of the DLF allow for spatial variations of the intensity and spectral power distribution of the light over the area covered. When the element of variation of intensity and SPD with time over the area covered is introduced another dimension of flexibility is introduced. These properties are unique to the DLF and allow them to deal with dynamic lighting situations in a way not afforded by prior-art lighting devices. When combined with devices capable of detection changes in the surrounding environment the flexible DLF is capable of changing the illumination so as to provide the optimal lighting solution in real-time.

Figure 17:
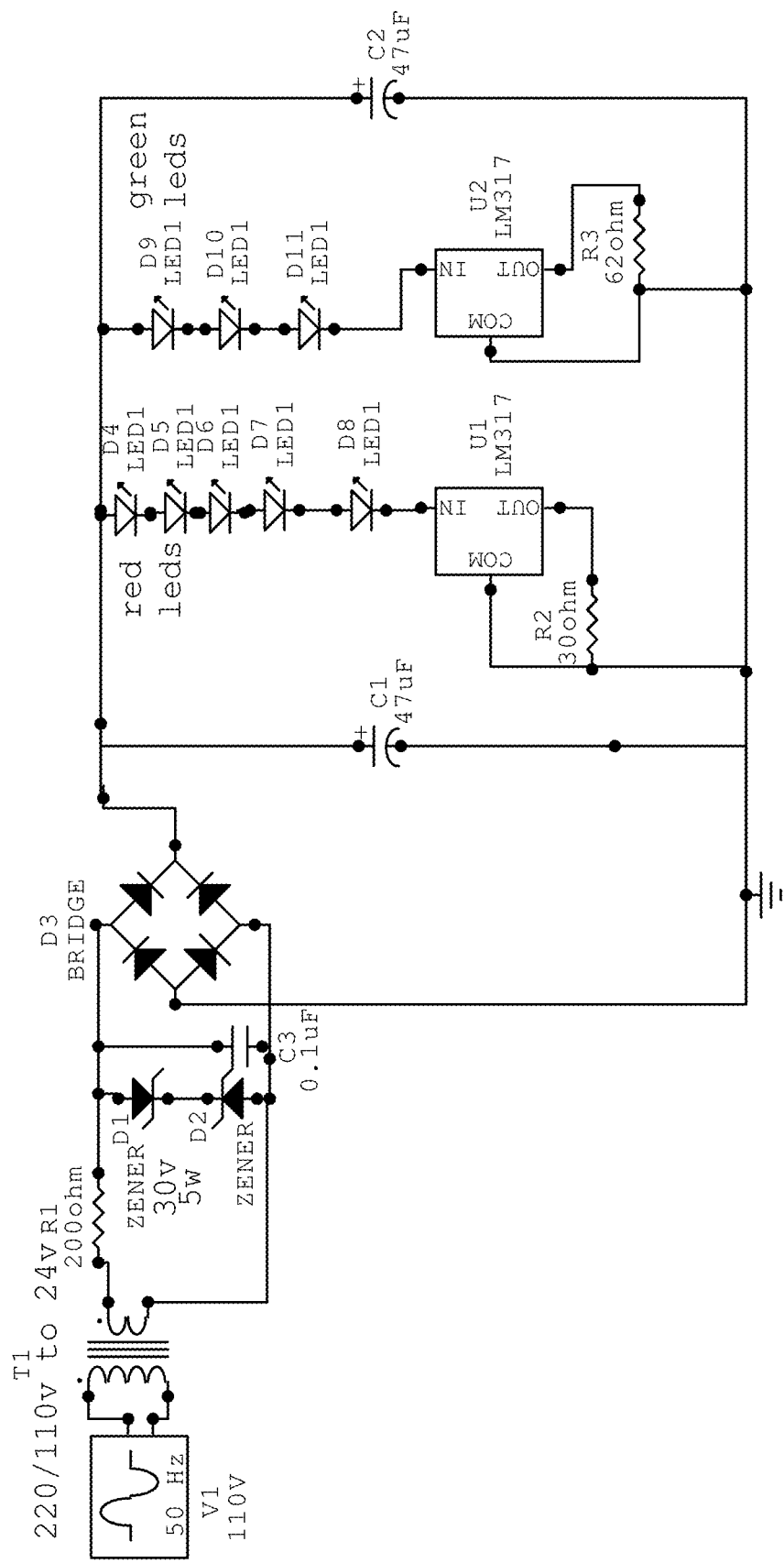
FIG. 17 a representative Electronic Power Supply Unit for Surface or Railing Mounted Luminaire.

FIG. 17 illustrates a power supply circuit used on a DLF such as the Surface or Railing Mount Discrete 66 or Distributed 70 Digital Lighting Fixture of FIGS. 4 and 5. The circuit controls current and illustrates the use of two disparate LED sets one red colored with specific voltage and current characteristics and the other green colored with its own voltage characteristics. When operated in this quanta and regime of voltage and current the combined output light is whitish in color according to the earlier teachings of this disclosure.

New Preferred and Additional Embodiments

Figure 18A:
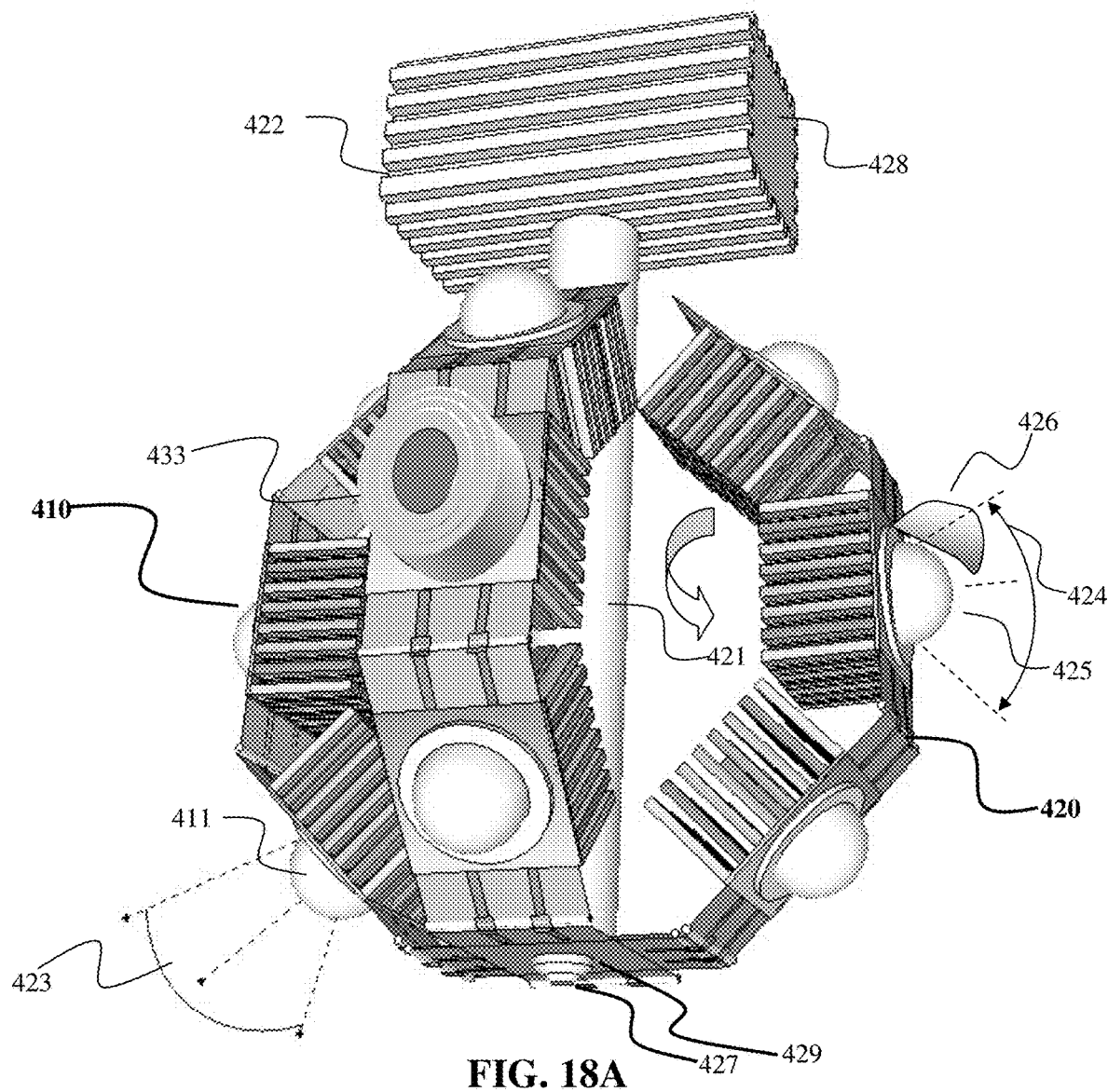
FIG. 18A is a perspective view of a configurable LED luminaire comprised of many light modules.

Referring now to the invention in more detail, in FIG. 18A there is shown an illuminating or irradiating device which is capable of being adjusted in situ to match the radiation output with the actual illuminating requirements of the surround where the lighting fixture has been installed. As an example, the device is a lighting fixture and the installation is in a chemical processing plant which is an open facility with piping and vessels placed in the structure with walkways, floors and stairs made of metal grating. The walkways, vessels, machinery and piping need to be illuminated at night by lighting fixtures placed on the structural support uprights along the walkways. In this lighting application example, the walkways are at the exterior edge of the structure with the piping and machinery towards the interior. Beyond the walkway safety fence there is no structure and no need for illumination. The spatial light distribution pattern of the lighting fixture shown in FIG. 18A can be arranged so as to illuminate inwards towards the vessels, machinery and piping as well as downward along the walkways and stairs but not outward into free space.

Figure 18B:
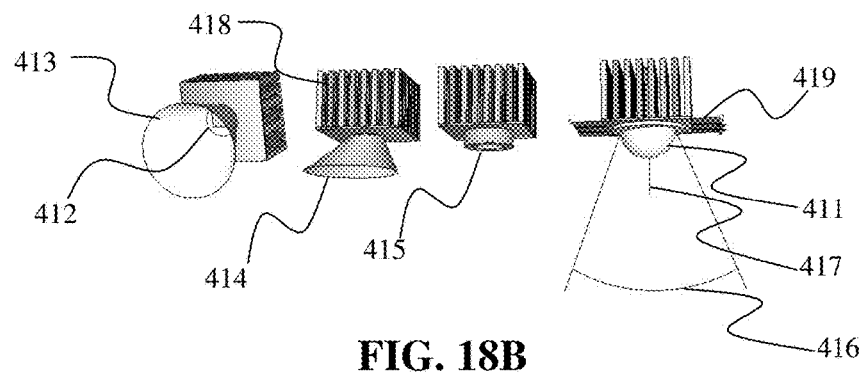
FIG. 18B is a view of light module optical accessories.

The lighting fixture 410 is comprised of light sources 411. The multiple light sources are referred to as LEDs, Light Emitting Diodes which is but one type of exemplary light sources used herein. Light sources referred to in this disclosure include any of a wide range of visible and non-visible electromagnetic radiation emitting or generating devices formed from organic or inorganic semiconductor materials such as LEDs, organic light emitting diodes, OLEDs and all gaseous high and low intensity discharge lamps, incandescent filament and other solid-state light sources. The light sources 411 shown in FIGS. 18A and 18B have means to be coupled with apparatus for modifying the light output of LED chips or arrays of chips 412 such as a reflector 413 which yields a symmetric light distribution or an asymmetric reflector 414 which yields a substantially asymmetric light distribution. An optical lens or light guide 415, or other refractive or diffractive device may be used to modify the light output as well as phosphors or filters within the light guide 415 which may be used to add or filter out certain wavelengths. The spatial light distribution of the light source refers to the luminous flux emanating from the light source 411 at various candle power intensities as a function of the angle. The light source 411 has a characteristic angular light distribution 416 also called herein beam spread and when installed on a lighting fixture attached to the building, object therein or lighting pole with a specific orientation in the surrounding living space, the beam axis 417 will have a particular aiming towards surfaces within the living space and therefore the light source will illuminate only the specific surfaces it is intended to fall upon. In an embodiment of the invention a light source module 411 is comprised of the one or more LED chip 412, optical modifying device 413, 414, or 415, a heat dissipative element 418 such as a heat sink and a physical and/or electrical connecting element for the LED chip 412 such as a printed circuit board 419. In one embodiment a very narrow beam laser LED is mounted in the array of chips 412 such that it shines along the optical axis of the light module 411. In an embodiment of the LED the beam spread has been determined on the die level without the need for additional optical modifying devices as part of the light module 411.

A preferred embodiment of the invention is a lighting fixture comprised of many light sources of which some or all can be separately aimed and powered so as to illuminate areas, surfaces or objects in a room in a most correct, efficient and comfortable manner or for a desired lighting effect. The overall luminaire 410 spatial light distribution at various angles is comprised of that of the individual light sources. Thus, when the multiplicity of light sources having their respective light distribution patterns, which are substantially directional and subtend lesser angles than those of the overall light distribution pattern are mounted and arranged on the lighting fixture structure their respective directional light distributions combine to form a wider overall light fixture distribution pattern. The overall distribution pattern is efficiently formed directly by the multiplicity of light sources without recourse to inefficient reflectors or refractors. Using a goniophotometer to measure over space the emanating light intensity in the various directions one obtains the overall spatial light distribution pattern of the luminaire 410.

Using commercially available LEDs such as the Artavi 10° product from Illumitex which offers 90% of the light output in 10 degrees of the beam, it is possible to generate well controlled light distribution patterns with minimal spill light. Thus, the Coefficient of Utilization (CU) or the utilization factor of the luminaire is high. That is, the ratio of the luminous flux (lumens) from a luminaire received on the work-plane to the lumens emitted by all the luminaire's light sources alone. The Illumitex LED package emits light in a uniform, highly-precise beam directly from the source. The result is that with die-level optical integration, the need for cumbersome and inefficient secondary optics to control light is obviated. Using well defined light beams to illuminate the area allows for the floor surface in the distant corners of a square room to have the same illuminance as the floor at the nadir, directly beneath the luminaire. This results in high uniformity which is a measure of variation of illuminance over a given plane, expressed as either the ratio of the minimum to the maximum illuminance or the ratio of the minimum to the average illuminance and a measure of the energy efficiency of the luminaire system.

In order to alter the spatial light distribution, the lighting fixture 410 has apparatus such as joints and flexible electrical connections giving it the ability to morph or change shape. That is, by the alteration of fixture geometry, moving structures or arms on which the light sources are mounted or by changing the LEDs' refractor or reflector geometry, the direction of the light emanating from groups or even individual light sources is modified so as to generate an overall site specific light distribution pattern. For example, LEDs are mounted on moveable luminaire structural elements such as the end of posts, on bars or curved arms which can be adjusted to provide various symmetrical and asymmetrical illumination patterns as the installation requires. In the lighting fixture 410 the arms, such as arm 420 has apparatus to swivel around the central support post 421. In an embodiment of the invention control electronics 422 have electronic means and circuitry configured to provide different power levels to LEDs or groups of LEDs such that the light intensity in any given direction and angular aiming may be varied as needed. In an embodiment of the invention the power supply and control electronics 422 are further defined to provide power only in the amount needed using a logical controller 428. Controller 428 performance can be further enabled with sensor 429 providing information about the surroundings. The resulting light fixture embodiment described is thus a Field Adjustable Multiple-light-source Luminaire or FAML.

Thus in FIG. 18A the beam spread 423 of LED 411 differs from the beam spread 424 of a LED light source 425 which may have a wider area from which the light exits so that its higher angled light output will not be as bright so as not to cause glare. An accessory reflector 426 may be used to shield from glaring rays. The method disclosed for reducing the glare from concentrated high luminance light sources is the use of light guides to reduce the luminous emittance or luminance of a very bright LED. Light guides using the principle of total internal reflection redirect the light. They may in addition be used to increase the area from which the light flux is exiting and thus reduce the luminance or luminosity of the light source.

FIG. 19 shows a light guide which can be used to redirect the light from a light source and/or increase the area from which the light is exiting in order to reduce the apparent brightness. The light guide is constructed of a transparent material with an index of refraction greater than that of air. The light guide 430 will accept light rays emanating at large angles away from the beam axis and bend the rays to smaller angles from the axis thus producing a narrow beam. Light produced by the LED 412 at various angles enters the aperture 431. The light then bends as total internal reflection contains it within the walls of the curved light guide and exits from the light guide at surface 432 with a different aiming. More than one light guide can be used and when stacked light exiting the light source at different angle can be directed outwards at different angles or the same angle. Light guide assembly 433 is shown with two light guides stacked but many similar or different beam modifying characteristic light guides can be stacked for a unique total light distribution resulting from the source. Thus in FIG. 18B the optical device 415 can be a light guide assembly 433 as shown in FIG. 19 which has been added over a light source in FIG. 18A aimed at a potentially glaring angle as shown covered by the light guide assembly 433. The exit surface 432 may be a lens, a Fresnel lens or microlens whose optical features enable precise control of uniformity, exit angle and beam spread. In addition, any of the surfaces may be covered with optical substrate or films to reduce light loss on entry or exit, frustrate the total internal reflection or filter or control the light. Light guides may also be asymmetrical.

In an alternate embodiment when using a single light source in a FAML yet an asymmetric spatial light distribution is desired, light guide assembly 434 made of light guide segments 435 is designed take light from the single light source and spatially differentiate its delivery to different parts of a room. For example, if the light fixture light source is located on the ceiling in the center of a square room and the assembly 434 is turned over so the light exits downward; then when the light exits the surface 436 with a Lambertian distribution and the segments are aimed in the direction of the corners of the room, a substantially homogeneous illumination can be obtained on a work plane near the floor in the square room. More than one segment of assembly 434 can be stacked and light guides with different light exiting directions can take the light of one light source and symmetrically or asymmetrically distribute over an area. Combined with reflective control elements 437 added within, upon the surface or external to the light guide further light control can be achieved.

While light guides are known for their ability to carry and redirect light, in this disclosure another novel embodiment of a light guide used as a light control device is its use to increase the area from which the light from the LED is exiting from thus reducing the light source luminance or glare. In an embodiment where the inlet aperture 431 cross section is small and the cross section of the light guide exit surface 432 is large there will be a significant reduction in the light source luminance and it will appear less bright and cause less glare to persons viewing it. Thus, while persons in a room would find high brightness LEDs disturbing it is possible to add optical devices that while maintaining the directionality of the illuminating beams spreads them over a larger area thus reducing the luminous emittance.

The Spectral Power Distribution of the luminaire refers to the distribution of light energy emitted by the light source arranged in order of wavelengths. In an embodiment of the invention the LED chip 412 is made of many separated LED chips or LED array. The array of semiconductor LED chips or dies 412 are of the same material and have a similar wavelength or are of different composition and produce a variety of wavelengths. In an embodiment the controlling power circuitry 428 is connected independently to each chip. The result of using differentiated composition chips 412 or phosphors with them is that the light output is a mix a various wavelengths of light and therefore of variable chromacity. Thus, a warm color temperature of lighting can be produced as well as a cool daylight color temperature. Thus, when the light sources that make up a light module 411 are not all producing the same color spectrum or wavelength, the luminaire's chromaticity, spectral power distribution or spectral light distribution is alterable by the controller 428 via driver 422 energizing to a greater or lesser degree the individual light sources. These light sources may be substantially monochromatic or wide spectrum with different wide SPDs and monochromatics complementing each other. Using the principles of additive color mixing of light sources to control the change in chromacity via the differentiated powering of coincidently aimed light sources, the luminaire produces a unique spectral light distribution having a certain color temperature and/or color rendering index of light at all or any particular aiming.

For example, the curvilinear light guide 430 can be used to combine different colored LED chips 412. Thus if 3 different colored LEDs were stacked and their light entered into one or more light guides the light guides will re-orient the light and aim them in the same direction whereupon they will mix. The mixed light when falling upon a surface and reflected to a person's eye will generate a uniquely observed color lighting effect. When phosphors are added to the light guide material other chromaticity may be generated. Thus, a blue LED could generate one color temperature with one light guide and another color temperature in another light guide. If the guides are co-directional the colors will be mixed. Physical movement of the inlet aperture from one light guide of particular phosphors to another would then serve as a way of changing the correlated color temperature, CCT and/or color rendering index, CRI of a light source. Thus, an active way of controlling the spatial and spectral output of the LED light source 411 is to reposition the light guide apparatus 433 or 434 thus changing the angular or spectral characteristic of the light modification.

Individual bars or arms 420 by their structural geometry determine the aimings of the light sources mounted on them. Thus, using Lambert's cosine law and the inverse square law the arm geometry is designed such that more luminous flux can be directed to surfaces further away or surfaces at greater angles to the incident light to achieve a more homogenous light distribution. In addition, when mounted in a living space the arm 420 can be rotated into a better aiming in order to optimally illuminate the area. Thus, as a principle teaching of this invention the light sources attached to the arms have already been given the capability of generating a unique spatial distribution pattern in the factory set format. Most importantly, this preset distribution carries though to the homogeneous illuminance of room surfaces even after specific installation adjustment requirements have been made.

After adjustment the position of the arm can be input into the controller 428 or the camera 429 can be used to determine the lighting effects produced by the new arm arrangement. This calibration is accomplished by energizing a light source or array of light sources and reading the with the camera sensor array the luminance values off the surface. Comparing the new results with prior control luminance values at known power settings the present luminaire configuration is determined. A reference sheet of known reflectance is placed on surfaces to aid in the re-calibration. Alternately, the prior stored reference luminance values are for a number of surfaces of different reflectivities allowing the controller to guess from the surface at hand which reflectance model is a best fit. The data stored in the controller 422 can now be used for applying recommended lighting practice to specific lighting application or lighting tasks that luminaire is called on to perform. Herein this disclosure, a logical controller executes instruction sets based best lighting practices as recommended by lighting engineers and published in handbooks such as the Illuminating Engineering Society of North America IESNA and standards such as ANSI or CIE. The latest by the IESNA is the $10^{th}$ edition ISBN-13: 9780879952419, Publisher: Illuminating Engineering Society of North America that has numerous recommendations and best practice standards specifically related to LED lighting. The specific location lighting task information or programming may be manually input to the luminaire controller via an input device such as a keypad or be remote input controller using infra-red communications or other wireless device using a communications system such as, Wi-Fi, Bluetooth™ etc. communicated via a computer or smart-phone or via a speaker microphone system. To determine lighting requirements in an area based on usage and characteristics of the users, the controller uses a speaker to communicate queries from a lighting specification questionnaire and receives audio response processed by a voice recognition software application as input for the purpose running the lighting design algorithms.

FIG. 20A is a perspective view of an embodiment of a modular industrial lighting fixture with the addition of another adjustable arm 420 where the same LED driver electronics 422 are capable of powering additional arms when added or not powering them when they are subtracted such as in FIG. 20B. The arms 420 are rotatable so that they may be concentrated at a specific aiming so as to produce higher illumination intensity in a specific area. In an alternative embodiment the driver electronics are modular in concert with the light source arms 420 such that when an additional arm is added an additional plug and play driver module is added as well with full communications and hookup capability to the logical controller 428.

An example using a FAML in an industrial, commercial or house lighting application may be a hallway lighting function. An embodiment of an asymmetrical lighting fixture shown in FIG. 20B with two arms 420 at 180 degrees with light source modules 411 laid out on the arms at higher angles to illuminate along the hallway will do a more economical job of illuminating then would the four armed symmetrical luminaire of FIG. 20A. The light sources illuminating the hallway at higher angles from the nadir may have large areas to reduce the luminous emittance to comfortable, non-glaring levels using optical light guides such as 430 to increase area while maintaining directionality. When the camera sensor element 429 detects people entering the hallway, the logical controller 428 increases the power driving the LEDs and the lighting intensity is increased from zero power or some low level of lighting sufficient for orientation purposes to full level. After the person has passed under the luminaire the LEDs on the approach side can already be dimmed again saving power. It is to be understood that the luminaire embodiment of FIG. 20B is only showing the practical operational elements. Obviously, when used as a home hallway lighting fixture, additional aesthetic elements can be added to improve the fixtures artistic appeal.

In an embodiment of this invention the adjustments to the light output distribution, intensity and chromacity are made automatically by the logical controller 428 operating per programmed instruction sets based on data supplied by sensors regarding living space geometry, environment and contents including living beings. Such sensors 429 use sound or electromagnetic radiation to measure distances to surfaces within the intended design illumination range of the lighting fixture. An embodiment of the invention uses as a sensor an electronic camera with a lens 427 allowing it to view the surroundings. Natural light sources or light sources on the luminaire firing at known timings and chromaticity can be used with the sensors 429 and logical controller 428 to determine distances, movement, reflectance, surface colors and other information about the surroundings during set up and in real time. The camera chip transfers the image information to the logical controller. Using real time image processing methodologies with image and scene recognition technology known in the art, room or outdoor area elements, objects and people are identified. Using face recognition techniques an individual may be identified and personal lighting preferences or functions can be provided by the luminaire. The controller being programmed to illuminate people, objects and surfaces according to best lighting practice or user preferences then manipulates fixture elements to adjust the lighting to meet the standards or personal preferences. In addition, the computer vision can recognize the visual task being performed. The logical controller 428 then uses control of the power signal to the LED to provide recommended practice light intensities.

Light entering the digital camera 429 through its lens 427 is converted into electric signals by a CCD or CMOS image sensor. The lens can be an optical lens or a wide-angle lens or a Fresnel lens giving the sensor array a view of the area illuminated by the lighting fixture or a wider area covered by a group of lighting fixtures under control of the logical controller. More than one camera sensor 429 with different areas of coverage can be used if more accuracy is required for image processing. The processor based control system for illumination has stored data and programs for driving the LEDs at the correct levels in order illuminate according to recommended lighting practice and stored algorithms which it uses to process pattern recognition, image recognition and other computer vision methodologies known in the art to recognize a particular object, surface or individual as well as distances to surfaces, their color, reflectance and the geometry of the environmental surround. The same image recognition camera may be used as the luminance meter or a separate light sensor may be employed. A further capability of the digital lighting fixture using image recognition methodology known in the art that it can recognize the individuals and provide personal preference lighting conditions or determine the optimal lighting parameters as required by their age. A processor-based control system for illumination having stored data and algorithms which uses image recognition algorithms to recognize a particular individual. Using image recognition algorithms and artificial intelligence techniques known in the art, based on the appearance and movements of the occupants, the camera vision system will automatically guess their age and sex. The processor runs the computer vision routines to determine an occupants age or sex and sends instruction to a building's utility devices to provide individualized services such as heating and lighting on basis of age or sex.

The personalized control of the illuminating device or other appliances in communication with the controller can be effected by using a brain-computer interface, (BCI, often called a mind-machine interface (MMI), or sometimes called a direct neural interface or a brain-machine interface (BMI). Using apparatus to read brain activity, a direct communication pathway between the brain and the external device can be effected. The BCI can be combined with the computer vision system having knowledge of the surround to help the controller relate the brain activity to the visual aid required to carry out the desired function. For example, in an automotive application the brain activity related to eye saccade can replace eye gaze tracking in knowing where the eye desires to see next and illumination can be provided on time, in advance of the visual task to be performed next.

The sensor 429 can be an LSI chip enabling high-speed processing of the generated image data by a digital image processor function within the logical controller 428 using algorithms known in the art for motion, scene and/or face detection. From these signals the logical control affects lighting changes as needed to perform visual tasks or create ambiance. The sensor and transducer pack 429 is sensitive to a wide range of electromagnetic or sonic pressure variations and has means for determining luminance, temperature and humidity. The logical controller 428 having communications capability can transfer information gained from the sensor pack 429 to other home automation networks or it can supply information to other home heating, cooling, security, lighting and host of other appliances. With a view of the front door the luminaire sensor can serve data to the home automation network on whether someone has entered of left the house.

In a preferred embodiment of this invention the lighting fixture is equipped with a camera vision system comprised of the digital camera 429 and logical controller 428 having computer algorithms for performing computer vision and has the capability of identifying the eyes of occupants in a room (this is similar to present day face detect mode used in digital camera technology such as a Canon PowerShot SD900, where the processor face recognition identifies the triangle of two eyes and a nose and focuses automatically). The camera vision system is capable of detecting glare causing visual discomfort on the eyes of room occupants caused by the lighting fixture and the logical controller will accordingly reduce the intensity of the illumination reaching the eyes from the responsible light source. The camera vision system can detect the glare by assessing the amount of light reflected back to the camera from the eyes of room occupants and determining on the basis of a scale, such as the de Boer rating scale for discomfort glare, whether or not glare is occurring. Alternatively, the logical controller 428 upon detecting eyes will set the light source intensity shining in the direction of the eyes to a level that will not cause glare.

In addition, the camera vision system 428 will prevent the lighting fixture 410 from producing veiling reflections on objects such as glossy magazines or computer screens. Using machine vision technology known in the art such as neural networks training and other pattern recognition techniques the vision system has sensor, algorithmic and computational means for identifying devices or objects. Using lookup tables to identify a possible veiling glare situation in the user's field of view the logical controller 428 adjusts the lighting by providing illumination from a different angle such as beaming light off the ceiling in place of direct lighting and/or altering the intensity of the direct lighting.

Actual vision and perception is not only a function of the illuminance falling on the object being observed but also of the luminance of surfaces in the surround, spectral distributions of the object and background and the general illuminance level to which the eye has adapted. Veiling luminance and veiling reflections may even be as interfering so as to disturb the ability to see. Described is a method of using an embodiment of multiple light source lighting fixture of the present invention with finely controlled light delivery to assist people to better see objects or carry out visual tasks such as reading. The method comprises altering the intensity and/or color of the illumination delivered to the task versus other surfaces in the visual surround (that is they are in the viewer's field of view) such that the luminance of the object, the luminance of the background, the contrast and the veiling reflections are controlled so as to produce optimal vision conditions. To accomplish the spatially differentiated light delivery to the object of the visual task such as a book or computer screen the light sources to produce task lighting have multiple, narrow beams with minimal spill light. The limited coverage area of each beam and sharp cutoff is such that the lighting fixture controller can target a book while not substantially illuminating the desk. Other light sources illuminate the desk and other surfaces in the visual surround at an optimal background level luminance. The background level is determined by factors such as whether it is an office environment where others are present, and a dark office is unpleasant or if the reading is at home and a lower background can be tolerated.

With the eye recognition capability, the lighting fixture can, irrespective of the glare consideration, lower the illumination in areas where eyes are not looking thus saving power. Thus, as in the FIG. 20B hallway lighting application the logical controller upon identifying the occupant's eyes can illuminate at higher intensity the areas forward of the occupant in their field of view but limit light rays to below the eye level and dim the areas not in the visual path of the occupant. The same capability for dimming is available in many other lighting applications such as in other rooms in a house, warehouses, stores, factories as well as outdoors. In sports lighting glare can be eliminated by the controller 428 following the ball and calculating which light sources 411 are adding to vision and those which are detracting and reducing the intensity of those detracting. Thus, the lighting fixture 410 provides illumination in real time only where people need it to carry out visual tasks while the illumination in other areas is off or dimmed to comfortable or aesthetic lighting levels.

An alternate embodiment of the FIG. 20B fixture used in a highway lighting fixture application having a camera vision system has controllable light distribution and logical means for providing illumination based on the vehicle's position in relation to the lighting fixture 410. In low traffic conditions in order to save energy used for lighting, the controller 428 using stored algorithms increases illumination with the approach of a vehicle and changes the beam cut-off levels as the automobile advances towards the lighting fixture to eliminate glare from the driver's eyes. It then dims the lighting after the vehicle has passed and is no longer useful. When multiple vehicles are presents the operating regime changes to illumination from the adjacent luminaire located behind the vehicles. By using communication between the luminaires 410 the optimal lighting regime is coordinated between them.

In a preferred embodiment the illumination device 410 of FIG. 18 with computer vision capability, also having means for communications with other devices and human factors engineering algorithms that allows it to predict in certain situations what a room occupant is interested in doing, has wired or wireless electronic communications apparatus for communicating the information it obtained via the camera for actuating or closing other devices. For example, a person sitting down in front of the TV can have the TV turned on automatically and have heating concentrated on that area of the house. The camera-based lighting system via a central logical control unit or the home computer inputs data on the house occupants' whereabouts and aids in the control of house lighting and heating and cooling. Thus, the lighting fixture 410 communicates data and integrates with intelligent home automation systems as 1) it provides an ideal location for the sensors which includes any of sensors 429 for: temperature, humidity, motion and artificial vision and 2) the smart illuminating device 410, itself which has a logical controller 428 capable of communicating with and being controlled by the automated home network.

The lighting fixture being the world's most ubiquitous device serves as the ideal platform for simple and intelligent camera vision systems for use in home, commercial, outdoor and industrial facilities control systems to the end of surveillance, control of the use of energy and supplying people with sound, lighting, heating, cooling and fragrance. A lighting fixture is almost always installed in any living space, from work spaces to entertainment spaces and an infrastructure of power lines and often data lines are already installed to them. Thus, a lighting fixture is ideal as a platform for sensors, transducers and detectors. It is also ideal as a platform for delivering lighting, sound, radiated heating and the dispersion of fragrance. For example, a multiply placed speaker sound system for providing a listening experience upon receiving from the camera's information on the users' whereabouts can better tailor the sound delivery based on their location as in known in the art thus enhancing the sound experience. Computer recognition of the person/s in the room can call up from memory the users individuals listening and sound setting preferences. A fragrance system will provide aroma based on room occupancy and location if there is apparatus in the fragrance system for delivering fragrance to separate areas of the room. Again, here a computer recognition of the individual can tailor the type of fragrance.

In an automated embodiment of the invention the light sources 411 and 425 are mounted on moveable elements 420 having actuators or motors that are controlled by the logical controller. The automatic mechanization of light source supporting fixture parts allows for the direction of the light output to be altered by the logical controller thus enabling the luminaire to perform better in the specific lighting application where the fixture 410 has been installed. This may be a onetime rearrangement of the light source aimings or may be performed in real time as the lighting requirements in the living space change. Similarly, based on changed parameters in the surrounding, the logical controller 428 adjusts as required the light intensity in any direction and/or the chromacity. Thus, hereby we have demonstrated the systems unique lighting agility and energy saving capacity where the controller 428 can affect a dimming function based on factors in the surrounding such as the real-time sunlight contribution within parts of its coverage area, the amount of people in the room or the density and positions of cars on a highway.

Figure 21:
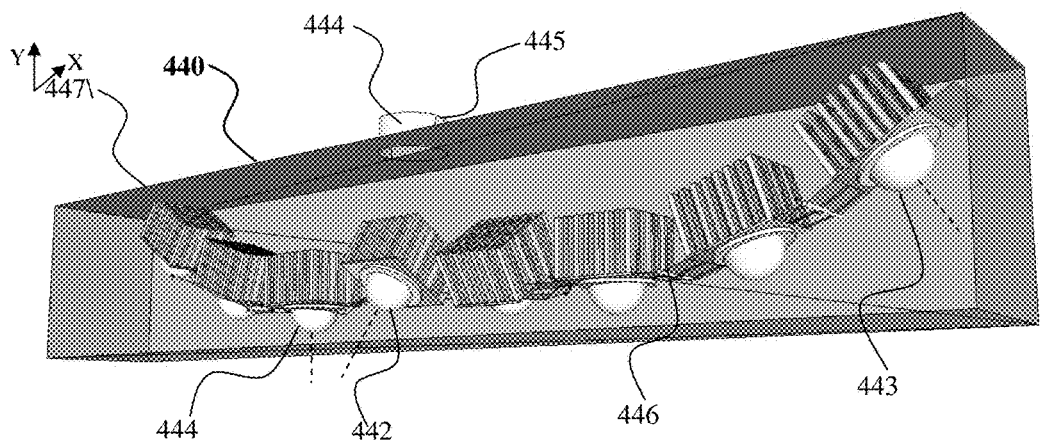
FIG. 21 is a perspective view of a substantially linear embodiment of the present invention.

FIG. 21 is an alternative embodiment of a field adjustable multiple light source lighting fixture 440 with light source modules arranged in a substantially linear form. Thus, light source module 441 may be aimed towards the nadir while light source module 442 is aimed sideways to illuminate a different area off to the left. Light source module 443 is aimed at a higher angle from the nadir and illuminates a third area. The modules are connected mechanically and electrically to each other and to the power supply 444 and logical controller 445. A different configuration is affected by changing the angle between modules on joint 446 which is capable of bending in the x and/or y direction. Detents and/or markings are provided on the joints 446 indicating different angular settings. Thus, instructions for each joint's 446 setting can be given to the homeowner or lighting fixture installer by a lighting design computer program known in the art. The light sources are specified and the room dimensions are entered into the program and the light source aiming angles are specified for the FAML 440. Whereas, in a special aiming configuration with light sources directed at different aimings, an even or homogeneous light distribution will be affected over the area under the fixture, the light fixture can be rearranged so that all the light sources are aimed in the same direction and thus a distribution similar to that of a single light module's own spatial light distribution will be obtained. Thus, if the light module light distribution is narrow, and they are all aimed in the same direction a spot light distribution will be obtained from the fixture 440.

Alternatively, the LEDs can all be aimed at the ceiling or objects on the wall for an indirect lighting effect or soffit lighting effect. Alternately, some LEDs can be aimed in the same direction and others at differentiated aimings obtaining both a spot and flood light distribution from fixture 440. Light source modules can be added to the chain or detracted depending on the lighting application. In addition, the light source modules can be enclosed in an aesthetic enclosure 447 hiding the actual light source modules. As shown in FIGS. 18 and 20, the embodiments are depicted in their practical light engine form with the skeletal light source support structure. It is clarified that the skeletal support structures in the luminaire embodiments presented may be embellished with outer enclosures of a more aesthetic nature. The only requirement is that the outer structure does not interfere substantially with the light and heat transfer from the light engine outwards. Thus, the disclosure has shown a FAML that can be agile in meeting differing illumination requirements, aesthetic and energy efficient in providing illumination in a specific lighting application.

The unique approach of this multiple light source luminaire invention over previous art luminaires is that in prior art, even when many LED sources are used the spatial light intensity distribution output of the luminaire is determined by the primary or secondary optics on the light source. Whatever light distribution there is emanating from the light source that is the light distribution of the luminaire. In this invention the overall light distribution of a single luminaire is comprised of many smaller light distribution patterns. It could be argued that a track lighting luminaire with its multiple light sources is such a fixture. As opposed to a dispersed track lighting luminaire used to spot light specific areas spread in a room the FALM is a centralized, integral lighting unit with both general area lighting and spot lighting functionality under the uniting structural, logical control and electronic circuitry of the luminaire.

Figure 22:
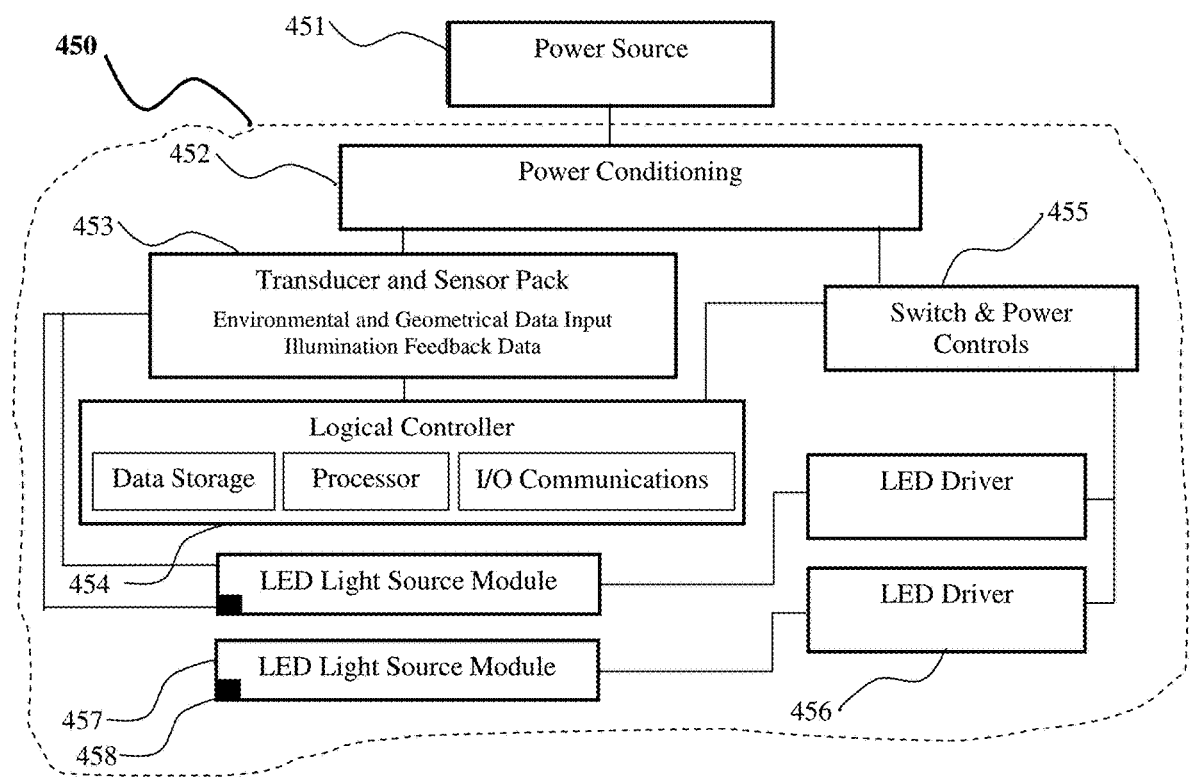
FIG. 22 is a block diagram of the elements comprising the present invention.

FIG. 22 is a block diagram of the functional elements comprising adjustable LED luminaires 450 disclosed in this invention. The block diagram illustrates the power and communication connections between the elements. The power source 451 can be electrical utility power or battery power which is altered in a power conditioning element 452 such that it may operate the transducer and sensors pack 453 and other electricity users such as the logical controller 454 and LED drivers 456. The logical controller 454 receives information from the input communications and sensors 453 and provides instructions to the power controls 455 and LED drivers 456 so as to drive the LEDs 457 as required by the lighting application. To alter intensity or chromacity of the light output by LED chip arrays 457 the logical controller uses techniques such as multiplexing of the power signal going to the light sources or pulse width modulation thereof. In another embodiment, the light module 411 includes control electronics which divides power up between the LED chips 412 according to instruction signals received from the central controller 428. Thus, the light module 411 receives from the central control electronics both a power and control signal. The control signal may be modulations on the power signal. The light module controller then re-divides the power to the individual LED chips 412 as required to obtain light intensity and chromacity. To lengthen the times between the power signals to the light module, the light module 411 may be equipped with an energy storage means such as a capacitor or battery.

A unique feature of the adjustable lighting fixture is that extra lighting element modules 457, i.e. those not needed in a specific application can be deactivated. Thus, if an arm 420 is removed, the corresponding LED driver circuit 456 can be deactivated. In a modularly built system the customer can purchase light source modules for the application such as four light source modules 457 for symmetric illumination as in fixture 410 or just 2 modules for a two arm 420 hallway light as in FIG. 20B. The electronic circuitry allows for LED drivers 456 to be added as needed and thus the customer would purchase the matching LED driver circuitry 456 for the hallway light configuration.

In a preferred embodiment the LED light fixture system is provided with mechanical means 458 for changing the structural shape which affects the direction of the illumination produced by the LED module 457. By re-aiming the light sources, a new fixture 450 light distribution pattern is obtained. The feedback of the new position of joint 446 is accomplished by input from a position sensor at joint 446 which is part of the sensor pack. In a manually adjusted system joint 446 is provided with markings and/or detents for vertical and horizontal angular positions such that instructions given to the user for aiming the light sources are in understandable terms. The logical controller 454 uses the new geometric data to recalculate the light distribution. Alternately, or in addition to, the camera acting as a light a sensor coupled with the logical controller's firing of the newly adjusted LED sources 457 at a known timing, obtains the new light distribution pattern. In addition, results are corroborated with the position sensor data. The logical controller 454 with new knowledge of the light distribution calculates, using computer programs such as FIG. 23, how to best provide required illumination based on algorithms run on the processor 454 pulling stored lookup-data from the data storage of 454 or received information via the communications device of 454. The transducer sensor pack 453 is comprised of any of the following devices: an ultrasonic transducer and receiver, an electromagnetic radiation source and detector, including IR, UV, Light and Laser sources/detectors, a speaker and a microphone for audible output and reception among others. Thus, the intelligent light system 454 can receive voice input from the user which the logical controller equipped with voice recognition programs will interpret into commands and give feedback. The input to the fixture can be via a wired input device, voice recognition of commands similar to those used in computers and mobile phones, other noises such as clapping, a remote-control device or wireless communication from a computer. Thus, a user of the lighting can override lighting choices made by the logical controller and input their personal lighting preferences which if desired, are stored for the future. The logical controller is programmed to interpret the input signals into functions to be carried out by the FALM 450 in terms of spatial, spectral and intensity distributions of the light in space and in time.

Figure 23:
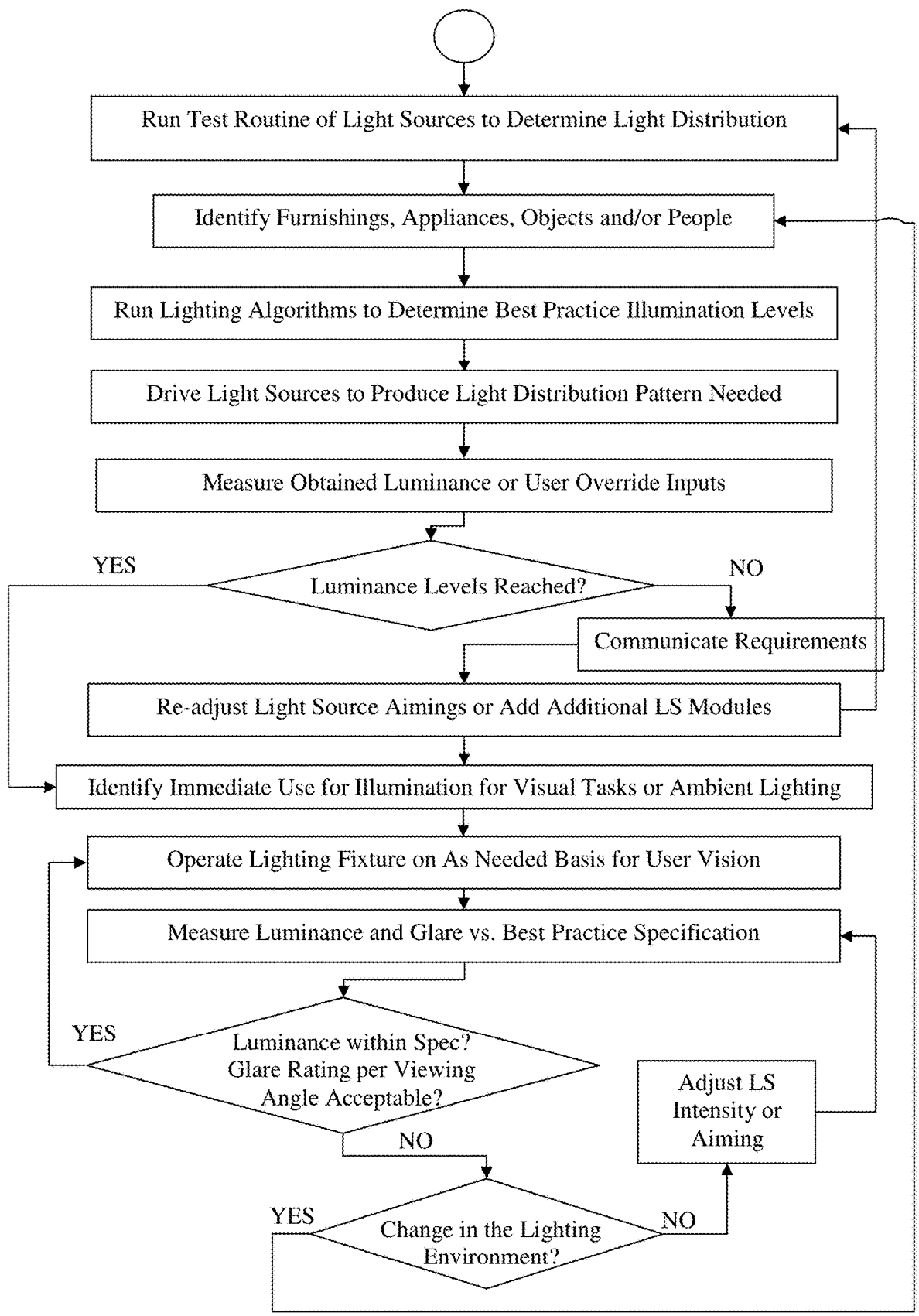
FIG. 23 is an exemplary flow chart for a computer program run to obtain the optimal illumination.

FIG. 23 is an exemplary flow chart for a computer program run by the logical controller of the lighting fixtures disclosed in this invention to provide correct illumination. Based on information obtained by the sensors or manually input the logical controller 428 of light fixture 410 again shown in FIG. 22 as logical controller 454, calculates and sends control signals to power controller 455 and LED drivers 456 to produce the optimal illumination for the visual tasks being performed by people within or adjacent to the area being illuminated. The computer routine first acquires information regarding the light distribution pattern of the luminaire in its present configuration. Using data from the initial calibration stored in data storage 454 and powering a LED 457 at a specific aiming, the digital camera light sensor array reads the luminance value returned by surfaces. The processor using the inverse square cosine law obtains the reflectance of those surfaces which are then registered in the data storage 454 for further use in determining spatial distribution of light flux from the luminaire after adjustment. Thus, a feedback control routine is effected by the controller and sensor devices using the stored computer routines.

The logical controller 454 next determines the lighting environment in which the luminaire has been installed and area for which the luminaire is to provide illumination. If other intelligent luminaires are present, the communications program coordinates between them. If the neighboring luminaire is unintelligent, then the installer powers it on and off and the controller 454 records the differences in illumination due to its influence for future use. Using pattern recognition technology known in the art of machine and computer vision, the controller 454 identifies architectural features of the room such as windows and walls as well as furniture and appliances. Powering the LED light sources 457 or transducers 453 and reading the reflected signal captured by the sensors 453, the logical controller 454 obtains a first guess result for the iterative process of customizing the luminaire for the installed location. Running algorithms, the processor 454 determines the luminance values obtained from the sensors 453 and compares with best practice lighting recommendations. If necessary, the logical controller corrects on its own the light source 457 aimings via control of joint 458 which is equipped with automatic means for movement. Alternately, via communication with other devices or people it relays the necessary angular setting information for them to carry out the adjustment. The controller next measures the obtained luminance and checks if the recommended or best practice luminance level has been reached. The customer may also receive a report of the measured luminances from the lighting fixture system 450 and input to the logical control the desired changes. Alternately, the customer based on their own or other users' visual experiences can input desired corrections to the logical controller 454 which then re-adjusts the light source aimings. If re-aiming the light sources 457 alone cannot solve the required illumination requirements the controller 454 determines and communicates the need for the installation of additional light sources or communicates which light sources are superfluous.

In a preferred embodiment of the invention the logical controller 454 receiving image input from the camera 453 and running pattern recognition software will identify what is the visual task a person is trying to perform. The computer routine receives images from the camera and by determining the proximity of persons to objects such as books, newspapers, computer screens, telephones, televisions, cereal bowls, a writing pad, etc. that are recognized by the computer vision techniques predicts what visual task the user is trying to perform. The logical controller 454 then drives the light sources 457 according to recommended lighting practice levels stored in its data storage. In another preferred embodiment of the invention the user can command the logical controller as to the visual task being performed and the type of lighting desired such as "warm white" or "more light" and their preferred intensity level. The user input to the logical controller 454 may be thru a keyboard on the light fixture or via an electronic device in communication with the light fixture via the communications apparatus of 454 therein or audible or visual commands detected by the microphone or image sensor apparatus of the sensor pack 453. Alternately, a smart mobile phone application with a Bluetooth or Wi-Fi communications capability serves as the remote controller and will handle the voice recognition, present a touchpad menu for control input or provide keyboard for command entry. If the logical controller makes an incorrect decision in the eyes of the user, the user can override the last change by a signal such as snapping one's fingers or voice command etc. Unique to this invention people are able to choose the lighting that suits them best and the fixture, having differentiated light delivery, can provide a first user with one type of chromacity and/or intensity and a second type for a different user in a different area.

The logical controller 454 provides its own feedback by checking in real time via the sensors 453 if the illumination provided by driving the light sources at the current setting is in accordance with recommended lighting levels and chromacity. In addition, by using pattern recognition and knowing the location of the user's eyes the logical controller can determine if the illumination is causing glare discomfort or veiling reflections. The logical controller by comparing new images with previous images detects if there is a change in the lighting requirements. If changes have occurred, the illumination determining process of FIG. 23 is repeated and a new configuration of driver settings and/or light source aimings is obtained.

Yet another feature of the present invention logical controller and software is that the lighting fixture 450 has apparatus to check the illumination level of the lighting set-up upon installation and provide feedback so that manually made aimings are directed to obtain a desired illumination or luminance. The camera 453 serving as a light meter obtains luminance readings on surfaces in the living space. It inputs data to the controller 454 which provides readout either on a display on the FAML 450 or communicated to another device having a display. The installer using a calibrated reference reflective sheet of known color and reflectance values placed on surfaces at particular aimings will check if the desired illumination and chromacity is being provided. The reference sheets can also be used to calibrate the room surfaces for future camera sensor 453 readings by storing in 454 the actual surface readings vs. those of the reference sheet. Once the camera 453 is calibrated as to the reflectance and color of room surfaces the FAML 450, in a servomechanism enabled embodiment, with automatically movable light sources 457, will perform its own re-configuration to reach optimal light provision. The calibration is affected by using the camera array 453 to detect luminance as a measure of the lighting fixture instantaneous illuminance in that direction vs. the power level at which the light source is being driven. To calibrate the illumination system, the logical controller 454 can use a given LED installed on the fixture which serves as a light source standard when driven at known voltage and current. Alternately, an additional light sensor of superior accuracy stability is provided for in the sensor pack 453 and can be used to calibrate the camera sensor array.

In a preferred embodiment the control unit 454 is optionally outfitted with a photometer 453 which can be used to read the luminance of the room surfaces and transmit the data for use in the lighting program FIG. 23. Using the same process, a lighting designer uses to enter data to the lighting analysis programs the installer inputs to the controller as to the illuminance goals for each surface. The lighting program as known in the art then specifies the correct lighting levels, aimings and spectrum for the different locations and uses throughout the room. This is reversing the typical design process where the lighting fixtures performance is simulated on a computer and the results calculated. Here, the required illuminance results are known first, and the fixture is then programmed to make them happen. The controller 454 uses its stored performance characteristics to determine the power supply to the light sources so that it provides the required intensities to obtain the required illuminance. The lighting calculations and programming of the power supply 456 of the light sources 457 is preferably performed in real time such that the sensor 453 detects the illuminance to corroborate the performance while the installer is still at the location. If the lighting is not to specification, then the controller 454 readjusts the parameters so as to bring them in line. This trial and error process continues until the readings are within tolerance. The process is best carried out in the dark or when there is non-varying daylight. Alternately, the photometric reading sensors are on the luminaire and they are used to corroborate performance. Alternately, the process is automatic using feedback from the surroundings and pattern recognition to determine surroundings and applications.

A number of circuits in devices 452, 455 and 456 are utilized to power equipment in the fixture 450 and carry out control. The power supply may be a constant voltage supply or current source. The control circuitry comprises feedback sensors 453 coupled to the logical controller 454 to detect light intensity and color spectrum of the radiation. Associated logic circuitry, responsive to the detected light intensity and color spectrum over the spatial distribution, controls the power delivered to the individual LED diodes, so as to provide a desired intensity distribution over space. In an example using a combination of different colored LEDs, the logic circuitry 454 is responsive to the detected color spectrum of the outputted light. It controls the driver 456 to selectively increase or decrease power to individual coincidently directed light emitting diodes as is needed to obtain the desired color spectrum of the illumination as well as it luminous intensity.

Figure 24:
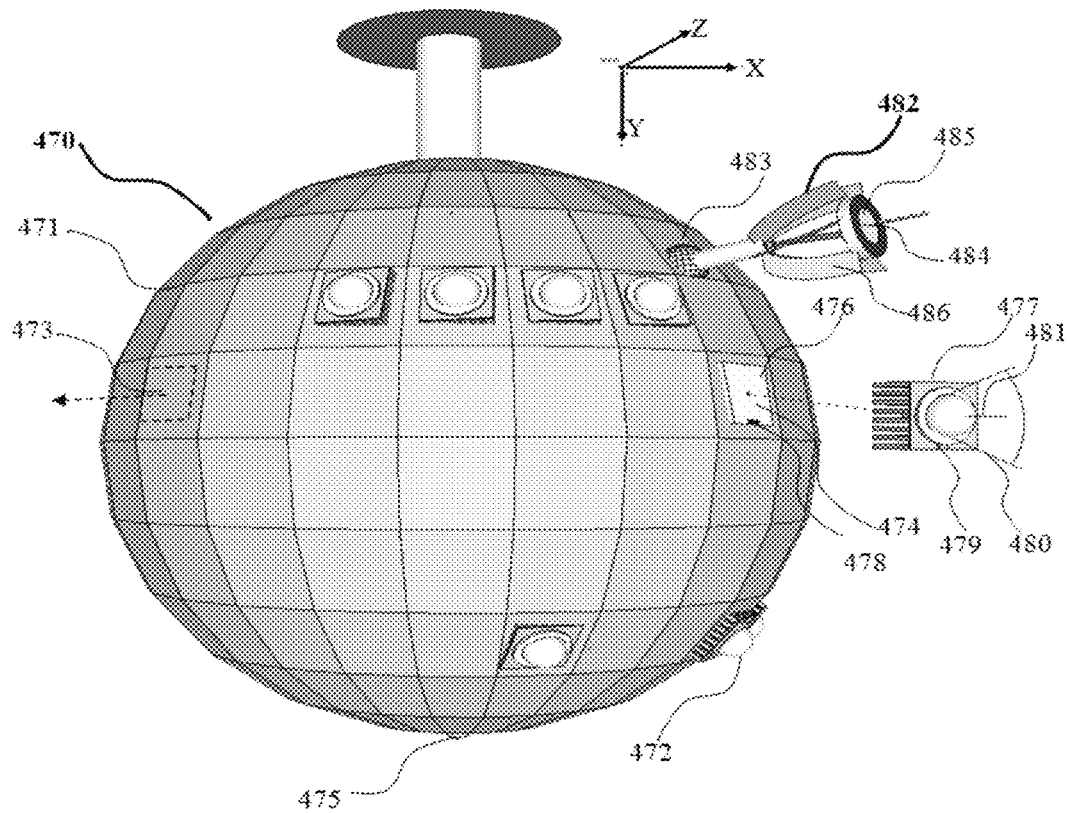
FIG. 24 is a perspective view of a universal lighting fixture structure with means for attaching light source and sensor elements mechanically and electrically.

FIG. 24 is a universal lighting fixture 470 comprised of a structure 471 with means for attaching mechanically and electrically to any of the elements selected from the group consisting of electric power conditioning apparatus, a logical controller with processing and storage capacity, light sources, radiation sources, transducers and sensors. The structure can be factory manufactured or come in a do-it-yourself DIY version. The lighting fixture has a geometrical shape calculated by the inverse square cosine law for set types of light pattern distributions. In one embodiment the structural shape of fixture 470 is such that an even, homogenous light distribution will be obtained on a work plane below when the Plug and Play light source modules 472 are connected. In a do-it-yourself lay-up-able embodiment of the luminaire 470, the luminaire light source elements 472 are configured by the user in situ according to the illumination needs where the fixture 470 is hung. They may be reconfigured when the lighting needs changes such as when furniture is rearranged in the room. The lighting fixture structure 471 covered with removable facet covers 473. Facet 474 has been opened exposing the receptacle 476 to accept additional light source module 477. The receptacle 476 is provided with a connective affixing means 478 for having light source module 477 attached to it both mechanically and electrically. Light source module 477 is also provided with a complementary connector element 479 which mates with connector 477. Connector 478 is wired to a power conditioning and control elements provided with luminaire 470 as needed by the configuration. The additional light source module 477 with its characteristic beam spread 480 mounted on an opened facet 474 on the structure 471 is at a different aiming via the position on the luminaire 471 where it is being mounted. The light sources 477 have a characteristic beam spread 480 and optical axis 481. The receptacle 476 allows for some rotation of the installed light source 477 on the X Y or Z axes. Thus, when a number of light sources are laid up and aimed in the same direction they will add intensity to the light distribution in that direction and when added on the curved fixture 471 surface at different angles they will increase the coverage area of the lighting fixtures illumination. Markings are provided on the structure with the angle of the position thus the user following instructions can attach the light sources at angles which will yields an even light distribution up to the cutoff angle.

A lighting design computer program known in the art will simulate to the user what the light output will be from the luminaire as it is configured. A logical controller on the luminaire can determine from the plugged in light source units which have an identifying data chip 479 in the connector relaying what its light distribution is and communicates to a simulation program the present configuration aimings and light source characteristics. In addition, a sensor 482 is provided on the luminaire. The camera like sensor 482 measures the resultant light output and relays those results to the simulation program. Thus, the user can build a customized lighting fixture that ensures proper lighting intensity where needed and does not waste light where not needed. The plug and play light source characteristics are known to the controller and their operating characteristics may then be programmed via the lighting simulation program. Using the lighting simulation program, the employed element characteristics, now a part of the controller's feedback loop, are used to direct the user to rearrange the lighting modules to further refine the fixture's 470 light output.

The do-it-yourself lighting fixture 470 has special lighting fixture accessories that are attachable to the structure. Spot light module 482 with a narrow beam spread is an example of a special accessory. It can be a light source or a radiation source such as an Infra-Red heating source or a combined heat and light source. It is mounted on the fixture via swivel joint 483 which is manually positioned at an angle required for the illumination task. A special laser pointer LED 484 is provided in the center of the light source LED array 485 to facilitate exact aiming of the spot light. The lighting module 482 is provided with connection means to the power and control signals via the joint 483. The module is also provided with cooling fins 486 to maintain optimal temperature for the LED sources. The swivel joint 483 can be a motorized joint with motion in two axes controlled by the logical controller. Thus, the logical controller 454 in conjunction with the camera vision system 475 when identifying a person in need of spot lighting as per the computer program of FIG. 23 will pivot the spot light 482 so that it is aimed in the direction where the task lighting is required. At the same time the lighting fixture 470 will maintain general lighting at recommended levels over the rest of the room thus significantly saving energy.

In another embodiment one or more light sources, acting as a spot light 482 of limited beam angle, is on an automated swivel joint. The controller 454 receiving input from the camera and using computational image recognition algorithms in a program as in FIG. 23 follows the person around the room providing them with higher intensity lighting for their visual tasks. Further image recognition capability which may also be complemented by video analytics technology where computer vision is used to filter and manage real time video for security and intelligent traffic monitoring, helping to recognize activities as they happen in real-time which enables the controller to determine any of the following: a change in the persons activity, in what direction the eyes may be directed, what objects the person is viewing and what visual task the person needs to perform. Based on that information the controller 454 powers the spot light sources 482 and general lighting sources 472 to provide the correct lighting for the specific visual task undertaken, be it reading a book or watching TV.

An irradiation device embodiment of this FAML invention can use the computer vision and aim-ability function to provide infrared heating to individuals in indoor and outdoor settings. The heat radiation sources can be infrared filament lamps or infrared LEDs in addition to other wavelengths. The irradiating devices 472 mounted on the irradiation fixture can provide general area heating or spot heating 482 to people or objects. Computer recognition of individuals is used to irradiate them as they move about the living space. Using face recognition algorithms and stored personal preferences from the data storage, the logical controller 454 will aim the heating rays specifically where on their body they prefer to be heated as well as in what amount and at what times. The camera 475 has sensors sensitive to infra-red wavelengths around 12 µm (micrometers) radiated from people. The controller obtaining the information from the body temperature sensor will run algorithms to calculate radiation parameters and will control the irradiation in time and intensity on the individual to maintain comfortable heating per best practice standards, drawing on stored data of heating practices, or personally input preferences. People may be sensitive to radiation heating on certain parts of the body. For example, heating on the head area causes some people discomfort, the camera and controller processor system can use image recognition to identify parts of the body and the controller can provide a different radiation level to the head vs. the rest of the body. Other people feel the cold in the legs etc. In addition, the controller can obtain information on other environmental parameters such as the temperature, humidity etc. which affect the heating regimen. Thus, the camera sensor 475 is an energy saving sensor replacing the room heating thermostat used to maintain the entire room at a high ambient temperature with a more accurate and localized actual measure of the individual's temperature. The radiating fixture 470 will them provide localized heating on an as needed basis to maintain comport. The FAML logical controller 454 runs the algorithms and provides spot heating only when necessary and in the right amount. Just as moveable head stage lighting follows the performer about the stage the camera/controller vision system follows the person around the room or outdoors and keeps them warm with an infra-red lamp 482. It is to be understood that the irradiating source can be supplying UV radiation, visible light, or any other radiation for therapeutic, pleasure or manufacturing purposes such as UV, EB or heat curing adhesives etc.

In an embodiment of the FAML the infrared radiation sources are added to the light source and can work together when necessary to provide heat and light. Thus, in a living room fixture where the house heating has been turned down to energy saving levels an individual can receive concentrated light for reading as well as concentrated beam of infrared heating.

Figure 25A:
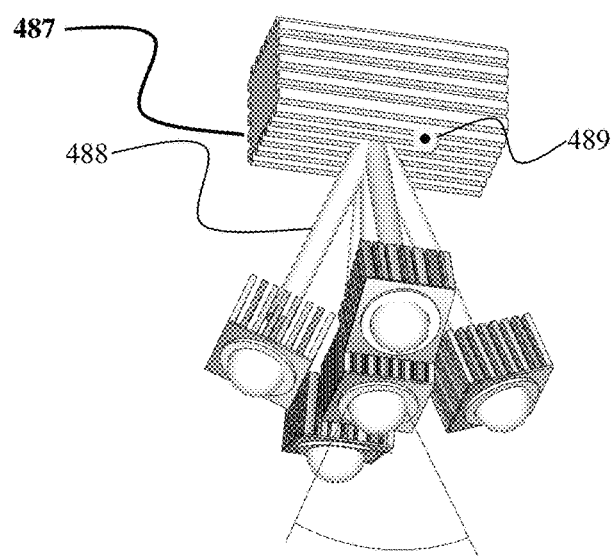
FIG. 25A and FIG. 25B shows an embodiment where the light source arrays are mounted at the end of moveable rods.
Figure 25B:
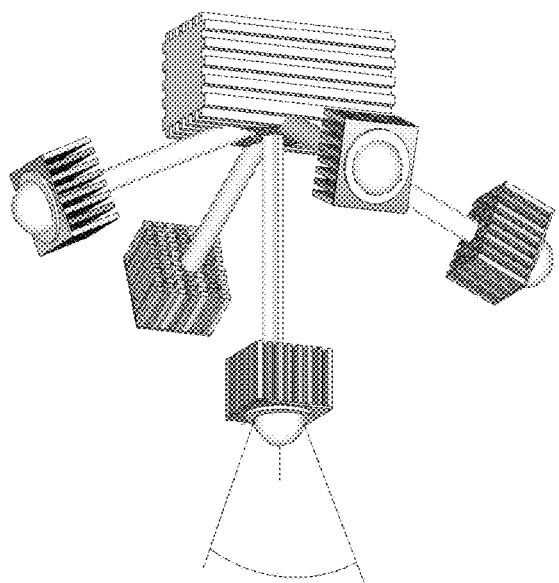

FIG. 25A and FIG. 25B shows an embodiment of this invention for use indoors or outdoors the light source arrays are mounted at the end of rods extending from the light fixture housing containing the control equipment. In an example lighting application, the fixture 487 is located over a table in a living room. The rods 488 supporting the light source modules have means for re-positioning either manually or automatically. In a manual system, the user based on the future use of the luminaire, sets up the spatial light distribution to best meet the visual requirements of people within the living space by re-positioning the rods. In one embodiment, for set up purposes, a red laser pointer is built into each array as was laser 484 in FIG. 24. Alternately, a laser pointer accessory is clipped onto the individual light module to assist in aiming. The user by trial and error using their own eyes as detectors or sensors 489 eventually reaches a functional light distribution with the lighting fixture for that specific installation. In an automatic system when the camera sensor 489 detects a person sitting at the table the automatic servos move the rods 488 so that the light output of many sources is aimed towards the table below producing high intensity task lighting as shown in FIG. 25A. When a room occupant is seated on the couch in the living room and watching TV the lighting fixture structure is changed to the configuration of FIG. 25B which offers general lighting at a lower intensity. The camera vision system will recognize a TV screen and the controller using the program of FIG. 23 will not illuminate light sources shining in the screen's direction that are aimed towards it at angles which would cause glare.

An outdoor FAML 487 equipped with camera vision capabilities for the detection and/or tracking of people, is another embodiment of this invention which has a number of improvements over present area illumination technology. The outdoor lighting fixture 487 is first configured to the geometrical peculiarities of the specific yard where it has been installed and is calibrated with the sensors 489 readings. If the area to be illuminated is rectangular with a narrow distance ahead of the fixture and a wide area of to the sides, the light sources mounted on the moveable arms are moved closer together in y axis while on the x axis the light source are distanced from each other and are at aimings angled higher to cover the extended width on the x axis. To compensate for the larger are the LEDs on the x axis are driven at higher power to cover for the larger area. Conversely for a square area the light sources are distributed evenly so as to illuminate on the intensity level set at the factory as in FIG. 25B. If there is an area where high intensity task lighting is needed the luminaire is configured with multiple light sources coincidentally directed to intensely illuminate that area as in FIG. 25A. The lighting level for security and orientation is usually low and when people arrive on the scene the light level increases. When people are present in the specific area where high intensity is needed for tasks the spot light function is engaged. If infrared lighting is need for the security camera then provision is made to have IR sources aimed at the specific areas of concern.

Figure 26:
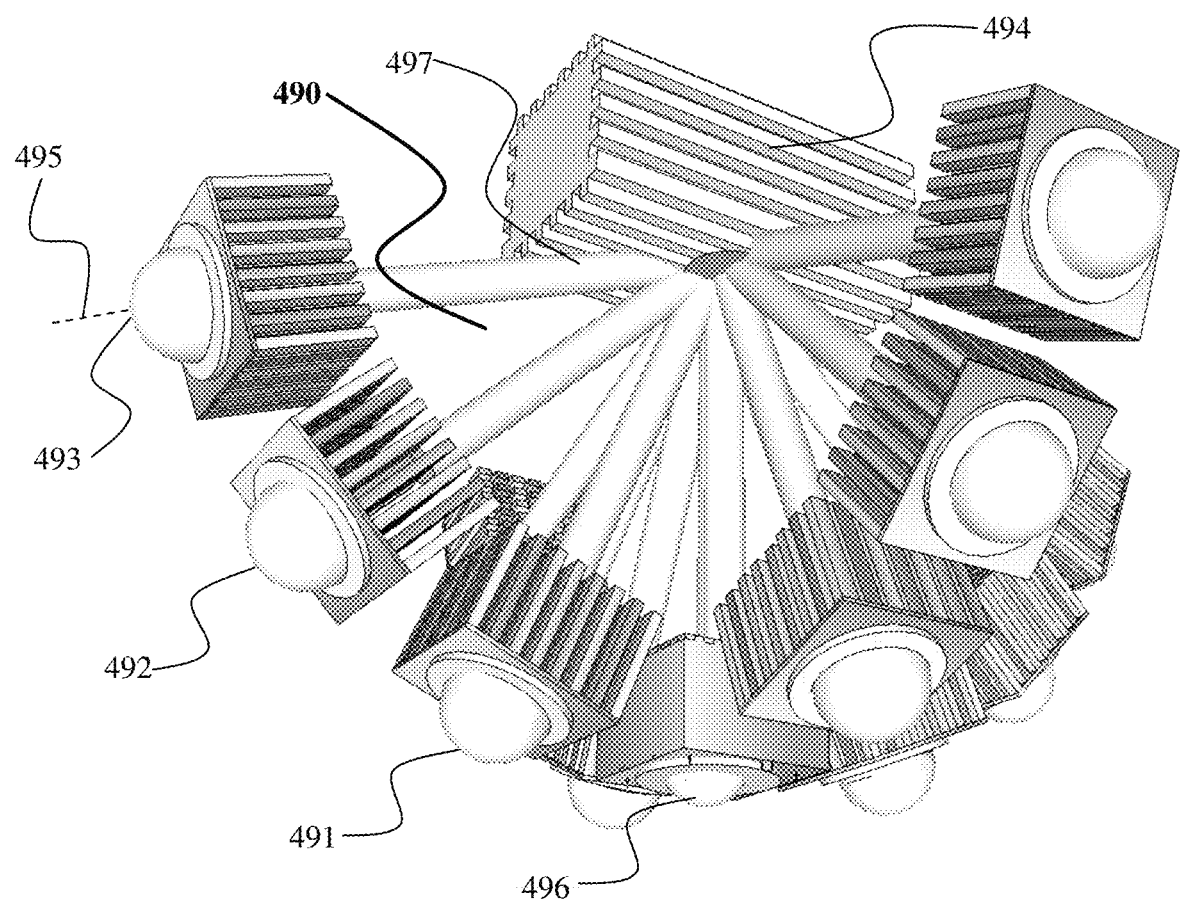
FIG. 26 is a perspective view of a lighting fixture capable of producing both a differentiated spatial light intensity distribution as well as a spatially differentiated light spectrum distribution.

FIG. 26 is a perspective view of a lighting fixture embodiment 490 capable of producing both a differentiated spatial light intensity distribution as well as a spatially differentiated light spectrum distribution. The luminaire 490 has multiple light source modules 491, 492 and 493 with each module comprised of more than one LED chips which can be powered by the logical controller and control electronics 494 at differentiated power levels. LEDs are arranged in arrays of RGB (substantially red, green and blue color LEDs) or arrays with of any of ROYGBIV LEDs completing white LEDs to produce varieties of white light. The logical controller 494, using algorithms based on the principles of additive color mixing of light sources to control the change in chromacity affects, via the differentiated powering of coincidently aimed light sources, the production of a unique spectral light distribution having a certain color temperature and/or color rendering index of light. This may be accomplished at once for all light output from the luminaire 490 or any particular aiming 495. The logical controller operates with data storage and program similar to the system shown in FIG. 22 and FIG. 23.

Alternately, to vary the CCT or CRI, in place of an RGB or MCY (substantially magenta, cyan and yellow LED's) or some alternative LED colorimetry system, the luminaire is equipped with different types of phosphor based white light LEDs 491 of different color temperature, where one or the other is used for a specific lighting task. In another embodiment, a monochrome LED can be added to the white LED to adjust its color temperature or rendering shifting its CCT and/or CRI. In addition, the use of shorter wavelength LEDs with nano-dots or quantum dot optics such as those from QD Vision, whose Quantum Light™ optics and films improve the color gamut of LEDs as they absorb some of the cool, blue LED light and efficiently re-emit it as warm, red light. This balances the lighting color spectrum, creating a pleasing incandescent quality light yet at significantly higher efficiency. Thus, the fixture 490, in addition to having a controllable non-symmetric light intensity distribution in different directions also has a controlled spectral light distribution in different directions enabling a unique color rendering of one surface and a different color rendering of a second surface.

As an example of the luminaire's benefits and agility to provide correct lighting where it is needed at minimal energy consumption, an embodiment of the invention, a spatially and spectrally adjustable restaurant lighting fixture is presented in FIG. 26. In a restaurant lighting application, it would be beneficial for the customer experience if those dining, the food and ambience would all appear at their best. The problem is that even at high CRI, some color temperatures are better than others at making food appear more appetizing to customers than another. As the portions served under a single prior-art lighting fixture vary, some of them will not be shown in their best light. For example, light at 3500K-4100K helps accentuate the textures and colors of fish and white meat while the rosy hue of a 2250K light source will accentuate the color and juices of red meat. Thus, it would be beneficial if the light which is illuminating the specific table setting can be varied in accordance with the food being served. The FAML with its capability of delivering spatially differentiated illumination will render each portion in its best light. Using programmed scene recognition algorithms, the luminaire's computer vision system comprised of the camera sensor 496 and logical controller 494 identifies the food on the plate, looks-up in storage the recommended CCT and powers each of the different colored LED chips aimed thereon at the correct power level in order to provide the optimal color illumination.

In addition, the logical controller can determine on its own the preferential color of the illumination based on the reflections off of the food. The controller runs a computer routine where it rapidly varies the light spectrum to preset CCTs and/or CRIs shining on the food on the plate. The camera records the image at each preset and the logical controller 494 compares the image coloring with stored rules of recommended practice for color rendering and determines the best illumination color setting. The controller 494 resets the illumination characteristics until the next change on the table occurs. The recommended practice programmed into the controller is based on IESNA illuminance information or restaurant illumination as described in industry literature such as Successful Restaurant Design by Regina S. Baraban, Joseph F. Durocher John Wiley and Sons, 2001.

The lighting fixture 490 has means to illuminate separate portions at a table comprised of directable or aim-able lighting modules 491 etc which are on moveable structural parts 497. The lighting fixture 490 also has computational means of providing the optimal color and intensity of light so as to render people, food, objects in their best light as well as to build a dining room ambience through lighting according to recommended practice or user preferences. The moveable structural bars 497 are manually positionable so as to aim the light sources towards the people, table and surrounding. In a preferred embodiment, the moveable structural parts 497 connected to the light modules are automatically moveable via actuator or servo motors controlled by the logical controller 494.

We have described a system for improving the appearance of the food, but the same system applies to making the customer appear at their best. In another fixture embodiment the intensity and chromacity of the lighting illuminating the customer is adjusted manually via input means or automatically via stored algorithms to suit the customer's preferences. The fixture 490 has separately amiable light sources such as LED module 492 to illuminate the food and light source 493 to illuminate the customer. The specific group of light sources for each task may be manually positioned or a camera vision system has algorithmic means to identify and track the position of people and objects and the logical controller has motion control means for re-aiming the light sources towards targeted elements and changing the power level to the LED chips.

In an automated embodiment, controller 494, based on image recognition of images provided by camera sensor 496, moves the powered structural parts 497 to re-aim the light sources on the food, table or those dining as needed. Thus as an example of the unique, differentiated lighting capability of the novel luminaire 490, multiple light sources are used as follows; a number of wide angle light distribution light sources 491 are used to illuminate the table at a low 100 lux illuminance with a warm 3000K color temperature to build dining ambiance; while narrow beam, spot LED 492 illuminates the fish on the plate at 300 lux and 4000K CCT (in conjunction with ambient lighting LED 491) to help accentuate the textures and colors of the fish; while the light module 493 is aimed at a diner with low enough luminous exitance so as not to cause glare but with a color spectrum that is complementary to that of general lighting module 491 such that it enhances the makeup and skin color of the customer showing them at their best. When the visual task of the customer reading the menu is recognized by the computer vision system, the logical controller 494 can increase the light module 491 output to 300 lux making the reading easier. The controller re-dims the light module 491 when the menu is recognized by the vision system 496 as being put away.

In an integrated restaurant illumination system embodiment, the customer will first try out the lighting in the rest room where they may apply makeup under a FAML luminaire having capability of producing light in a variety of chromacities, which the customer can experiment while viewing themselves in a mirror. The rest-room lighting fixture has a readout or is equipped with communications means, as is the lighting fixture controller 494 with which it is in contact. Having discovered their CCT and/or CRI lighting preference, the customer uses an input means and communications means to set the lighting fixture 490 at the table to the same successful chromacity obtained in the restroom.

In another embodiment a lighting fixture on the wall or floor such as a torchiere or a ceiling mounted fixture serves as a light engine for the entire room replacing a number of lighting fixtures while increasing the efficiency and quality of the lighting. FIG. 27 is a perspective view of a FAML lighting fixture 500 capable of providing both general and task lighting. The fixture body 501 has power conditioning electronics and logical control electronics and has light sources mounted on curvilinear light bars 503 that are configurable. This geometry and configurability enables light source aimings that will provide a substantially homogeneous illumination on a work plane through the room in which it is installed. It will also offer customization of the illumination to the actual geometric and usage peculiarities of the living space where the fixture 500 has been installed. In addition, the lighting fixture 500 is equipped with one or more spot lights 504 having a narrow light beam spread which are able to provide high intensity illumination over a small area. As opposed to general area lighting, the spot may provide task lighting. It is a principle of this invention that the fixture 500 provides as much light as is needed in the living space, no less and no more. Thus, the LED powering circuitry as shown in FIG. 22 is configured such that each light source covering a different area is capable of being driven at a different power level. The differentiated electronic power supply is configured such that if a homogenous illuminance is required by recommend lighting practice within a living space, the illuminance in the area covered by higher angled light source 505 is at recommended level even if that area is at a greater distance and angle from the luminaire than an area illuminated by a second light source 502 as dictated by the inverse square cosine law. The adjustable lighting fixture structure is provided with moveable joints 506 which have means for being positioned at specific angles which are relatable to a lighting design software program such as those commercially available to lighting designers. The software can be run on the logical controller 501 or on a remote computer. When the light source module 502 etc. light distributions and aimings are input into the lighting design software program along with the room dimensions and surface reflectance's, the illuminance within the room is calculated. The powering of the LED modules is then adjusted via controller electronics 501 to obtain the recommended practice illuminance.

Normally, a light fixture must be placed substantially above the area to be illuminated so as not to produce glare and veiling reflections. For example, computer screens are to be protected from light rays at large angles from the nadir to prevent veiling reflections. In addition, the illuminance of light rays at large angles from the nadir striking horizontal surfaces decreases as described by the cosine law. In addition, the quality of the lighting is a function of the balance of vertical as well as horizontal lumens illuminating an object. A tennis ball illuminated on top but not on the sides flying at 80 mph will be difficult to see. It is also important to provide illumination from multiple angles to prevent shadows that can be created by single lights. Thus, many lighting fixtures would be needed to illuminate a large room to insure the visual performance and comfort of its inhabitants. In an embodiment of the invention, a single light engine device for a room our outdoor location allows for the light to be generated in one place and then beamed from the concentrated light sources 504 at small angles of divergence to reflectors or refractors which redirect the light to the users in a localized area or to other reflectors so as to go around corners and illuminate areas not in the luminaire's direct line of sight. A single location for the light source simplifies the provision of power to the fixture. A builder doesn't need to run wiring all over the ceiling and not having an outlet box in the right place in a room or lot is no longer a problem. In addition, a single location allows for greater investment in an efficient cooling system as well as for the removal of waste heat from an air-conditioned environment and reduces installation and fixture costs. It also allows for greater investment in computer vision and logical controller apparatus enabling higher quality lighting at lower energy expenditures.

A necessary prerequisite for this remote lighting technology to be effective is the ability to generate concentrated beams of light with low divergence angles at high beam utilization. That is, 1) that most of the initial light generated gets out of the optical apparatus used to generate the tight beam and 2) most of the light flux is within the narrow beam with minimum spill outside the beam. A commercially available LED product such as the Artavi 10° product from Illumitex offers 90% of the light output in 10 degrees of the beam. The beam efficacy is above 80 lumen per watt proving that it is possible to generate well controlled light distribution patterns with minimal spill light. However, to reduce the size of the remote reflectors at the mounting heights and distances typically found in rooms, a 5 degree beam spread is even more attractive. Typically, 3 meter distances are beyond the coverage of a comfortable cutoff home and office luminaires mounted at 2.7 meter ceiling height. Thus, large room lighting needs would not be best met with a single light source due to the visual discomfort due to glare at higher angles of light emission. Therefore, it is highly beneficial to have an efficient manner of moving light in narrow beams of limited divergence over large distances to reduce the cost of lighting installations. LED optics as shown in FIG. 20 including a collimating lens for narrow beam generation are available with a light collection efficiency of >85%. Its function is based on the optical principle of total internal reflection, which contributes to the high efficiency of the optical system. Further measures can be taken to collect the 15% escaping light such as an encompassing reflector system.

FIG. 28 is a perspective view of satellite secondary light source which is a light modifying element capable of redirecting light from primary light sources such as lamps or the sun while not producing light on its own. In this embodiment the light engine 500 is equipped with light sources 504 capable of projecting at an exact aiming 508 high intensity, narrow light beams with minimal beam spread to the distant light modifying elements 510 in the room such that the light rays 511 from the light source 504 that are reflected off of theses surfaces 512 become local light source rays 513 at smaller angles from the nadir (directly down at zero degrees angle) substantially above or behind the user's eyes thus providing comfortable non-glaring lighting. These light direction modifying devices 514, referred to herein as Satellite Light Source, STLS, are reflective surfaces or refractors or combinations thereof or other optical light modifying apparatus. The satellite light sources may be ubiquitous insofar as a reflective decal on the wall or a painted wall or ceiling with sufficient reflectivity will function well as a secondary source. Thus, specially installed STLS can work together with room elements of sufficient reflectivity using direct lighting and indirect lighting to achieve lighting goals. The secondary light source may be attached via an extended rod to the luminaire itself or may be a highly reflective large diameter ceiling medallion. The illumination advantages of having secondary light sources are many and include: lighting exits the light source at angles which do not cause glare, the lighting comes from additional directions to that of the luminaire avoiding shadows and adds light from angles that contribute to the proper mix of vertical and horizontal lumens. In addition, there are a number of practical, economic and efficiency advantages.

In a manual system, the fixture's 500 concentrated light sources 504 can be aimed using a laser pointer to aim the light beam 508 to target 519 on the re-directive optical device. This manual method may also be used to initially calibrate an automatic aiming system with preset scenario positions for the concentrated light sources stored into the logical controller 501. In an automated embodiment, the light engine uses a computer vision capability to identify the whereabouts of persons performing visual tasks in the room. The controller then aims one or more concentrated light sources at the optical device which re-distributes the light locally. The light engine can be equipped with more than one aim-able concentrated light source and can provide more than one user with task lighting. Thus, a ceiling fixture 500 may have light sources providing a general lighting function with light aimed at the ceiling edges to perform an indirect, soffit lighting type of lighting effect, with task lighting performed by the concentrated light source aimed on the task directly from the fixture itself or via a re-directive STLS optical device. In a preferred embodiment an infra-red or visible laser on the concentrated light source assists the automated computer vision system in aiming all the light producing and modifying elements such that maximum light is directed on the visual task in real time. Undetectable infra-red sources may also be included in the light source array make-up so as to assist in computer vision recognition. These non-visible sources may be pulsed to aid in tracking of people, their eyes and objects while not disturbing normal vision.

The light engine 500 of FIG. 27 together with the re-directive optical devices of FIG. 28 can be used to integrate light energy obtained from the sun with the artificial lighting system. That is, where a building has apparatus for the collection of sunlight and its transport via light guides or fibers into the building's interior, the light fixture 500 will serve to distribute the sunlight within the living space. Whereby the light engine 500 has any of: a) optical device for accepting the solar light, b) optical guide paths for conducting the light; c) optical devices for redirecting the path of the light and d) filters for adjusting the amount and spectrum of the light to be used so as to be able to distribute it within the room to where it is needed. These optical devices and filters include light valves, prisms, controllable piezoelectric light guides, MEMS devices, optical switches and mirrors to redirect or modulate light beams. In addition, the light engine has optical devices which when necessary, can direct the sunlight to the satellite re-directive optical devices deployed around the living space. When light from the sun is no longer sufficient the artificial lighting system powers the light sources to make up for the shortfall. The light engine may be placed on a wall and integrally include the sunlight collection system outdoors with the artificial light generation and distribution system indoors. It would be similar in concept to how a wall air-conditioner system works. The sunlight collection system via the controller would take the need for the lighting into account based on occupancy and environmental conditions. In the summer the system using dichroic or other filter method would remove the infra-red spectrum from the light while in the winter when heating is needed would pass the radiation indoors. The sunlight collection system using controlled re-directive optical devices to capture the sunlight will redirect the light through windows or optical paths to aid in light is required within the room.

Figure 29:
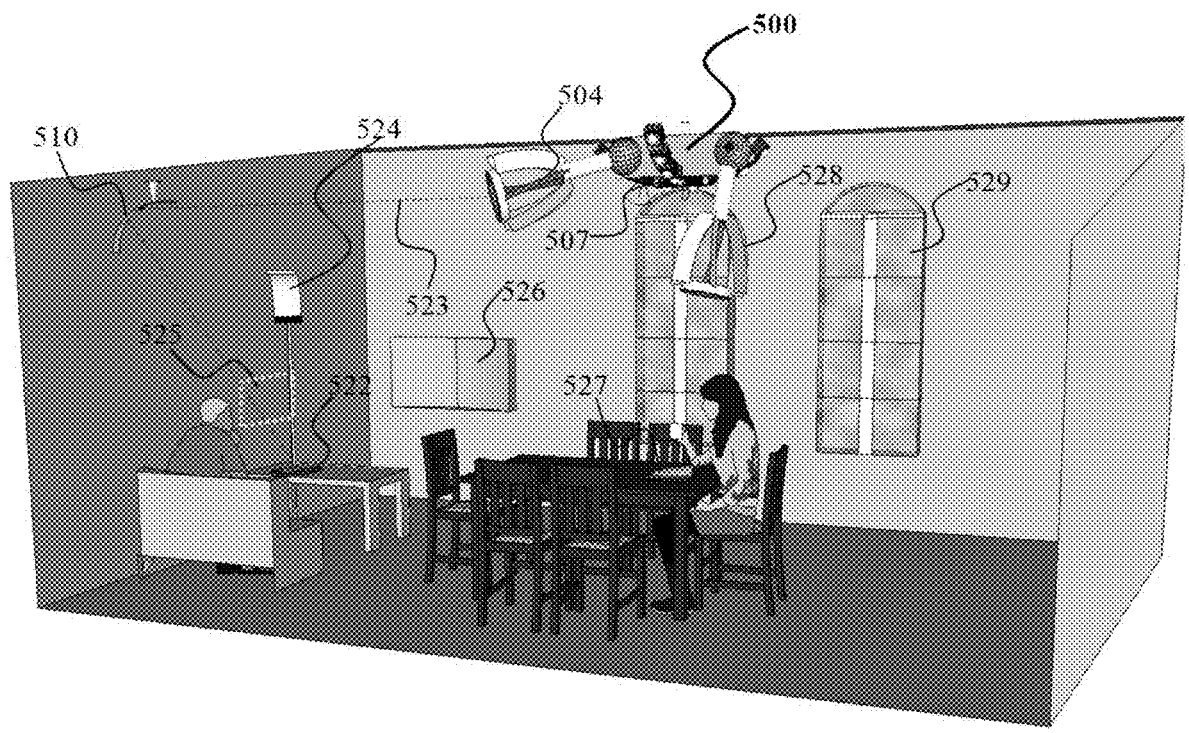
FIG. 29 depicts an adjustable luminaire in a lighting application.

FIG. 29 depicts an adjustable luminaire 500 in a lighting application where the user needs for illumination vary with time. The STLS 510 is a specially mounted remote reflective surface, strategically placed in the room so as to illuminate work, living or entertainment stations or alternatively is a wall or ceiling surface with sufficient or modified reflectivity. The re-directive optical devices have an optical design capable of efficiently redirecting the light symmetrically or asymmetrically for the performance of visual tasks such as looking at a computer screen or reading. They have means of attachment 515 to the ceiling, wall or placed on a piece of furniture. The STLS may be of fixed light modification characteristics or have means 516 for moving the reflecting surfaces 512 and selecting between various light distribution patterns. That is, the satellite light source 510 has manual or automatic means 516 for changing its optical performance, say from a spot light to a flood light distribution and/or it has automatic or manual means 517 for changing the direction of the satellite's illumination. In addition, the outgoing beam 508 from the FAML 500 to the STLS 511 can be modified by the controller 501 via the light source 504 in a way that changes the output luminous flux to the visual task. The outgoing beam spread is varied or its aiming changed to a different area 518 on the STLS with a different light modification characteristic. To change the beam spread of light 508 exiting from light source 504 the logical controller 501 has means to vary the LED chips being powered or the configuration of beam modifying optical device 509. The optical device may be a lens using refraction or a reflector, a combination of both or any other light ray modifying device.

In order to aid in aiming the concentrated light source 504 such as with the laser pointer device described earlier, there is a target area 519 on satellite 510 for use with manual or automated computer vision aiming. In an automated satellite embodiment there is need for electric power to control apparatus used for light beam aiming, sensors and communications. A hook up of control mechanism 517 to electricity from a battery or the mains power supply is provided for in attachment means 515. In an advanced embodiment, satellite light source 510 is powered by photovoltaic cells 520 receiving light energy and converting it to electric energy which may be stored in the movement control apparatus 517. The movement control apparatus 517 also has communications capability with the lighting control system and light engine 500. To obtain better images for scene recognition software or for eye tracking, a camera or sensor 521 is positioned on the satellite light source 510. Thus, the STLS can provide high definition images of people and objects within a living space for use with the lighting control system as well as with other home automation or security systems.

In an automated embodiment of this invention the logical controller 501 can communicate with and modify the secondary satellite light source 510 optical performance, say from a spot light to a flood light distribution, via controlled joints 516 or alter the STLS aiming via rotation apparatus 517 to illuminate a different area or object in real time as picked up by the camera 507 and analyzed in controller 501. As the illumination need in the room changes, the controller 501 sends a light beam with tailored spread, intensity and chromacity to the re-directive STLS optical device or room surface best positioned in the room to provide the optimal lighting. The controller 501 determines the visual task needed to be performed at that moment and chooses the optimal STLS device in the room to send light towards. The controller re-directs light source 504 which is mounted on moveable joint 506 to beam correct intensity and chromacity light flux to that STLS. In instances where an installed STLS device is not correctly positioned to provide lighting at optimal incident angles, the wall or ceiling (if their reflectance and color values are reasonable) can be used. In order to power sensors and actuators on a STLS satellite not connected to the mains power supply, a battery can be used. In a preferred embodiment in place of a cumbersome power mains supply hookup, a photocell or power transducer is mounted on a portion of the STLS. It is used to translate light energy or radiation from the FAML or other energy source to electric power for use by power consuming elements such as sensors, automated motion equipment or communications devices on the STLS.

To further illustrate the capabilities of a multiple light source lighting fixture with differentiated control of the spatial light distribution coupled with a camera sensor system, an example of usage in a home environment is described. As shown in FIG. 29 a man seated on a chair reading a book 122 is detected by camera sensor 507 and the vision recognition software recognizes the scene and the logical controller 501 runs algorithms and looks up the recommended lighting level and set up from the data storage as described earlier. The light engine luminaire controller 501 adjusts concentrated light source 504 via joint 506 so that it is aimed at satellite reflector 510 which has been attached to the ceiling or wall. Reflector 510 is positioned and angled relative to the incoming beam 523 such that that the reflected beam 525 illuminates the book 522. The reader now receives illumination to read the book from the rear over his shoulder which is superior to receiving light from the luminaire 500 in front. To corroborate if enough light is being provided for the visual task of reading, the controller 501 uses feedback control methodology obtaining an approximation of the luminance on the book 522 from camera 507. The light intensity of beam 523 can be raised or lowered by logical controller 501 to conform with recommended practice. If the user is unhappy with the lighting system's performance, he signals logical controller 501 audibly or electromagnetically to affect a change and obtain their personally preferred lighting characteristics.

The table lamp 524 next to the man on the chair is another embodiment of this invention and consists of remotely positioned electricity to light energy conversion device 500 which beams light to a STLS mounted on a table atop a post which captures the beam 511 coming from centralized light engine 500 and redirects it downwards on the book 522. Thus, the controller 501 has the capability to use an alternative path to illuminating the book 522. Instead of from behind and above the reader, it controls adjusting means 506 to redirect light source 504 such that it is aimed at table satellite lamp 524 which illuminate the book from the side. Another alternative illumination method to illuminating the book 522 is controller 501 directing light source 504 to illuminate the reflective wall section 525 proximate to the book 522. The logical controller 501 uses the camera sensor 507 and vision system 501 to check if there are obstacles in the beam path and choose the best illumination scheme at the lowest energy use for getting the visual task done. Most importantly, the user themselves have control access to the wide variety of optional lighting schemes from which to choose the one they prefer. Their preferences are then stored for future instances of the same application in controller 501. The logical controller 501 sensing that the TV 526 is being observed, such as when the TV screen is turned on and the book closed, adjusts luminaire 500 light output in that section of the room to the recommend lighting level and chromacity for TV viewing.

Another room occupant is sitting at the dining room table. She is sipping a cup at the same time as he is watching TV. At the same time logical controller 501 discerns, using scene recognition algorithms, that based on her head position, she is reading a book 527 and not watching the television screen 526. The concentrated light source 528 is aimed by controller 501 to provide direct illumination to perform the visual task of reading the book that she is assumed to be undertaking. If not happy with the lighting level she may command the lighting controller, either audibly or by a gesture picked up by the camera vision system or electromagnetically through a control device, to affect a change.

To further save energy the logical controller 501 receives input from the light sensor 507 that natural lighting from the window 529 is contributing to the illuminance on the book 527. To get an accurate reading of illuminance on the book from the natural lighting source, the logical controller will, for an instantaneous fraction of a second, indiscernible to the human eye, turn off the artificial lighting of luminaire 500. If the natural lighting is not at the required level per correct lighting practice, the controller drives area lighting LED light source 528 as needed to compensate. When the sun changes position, the altered contribution is picked up by the sensor 507 and the intensity of illuminator 504 is adjusted by the controller. Further power saving is obtained due to the differentiated light delivery capacity of the luminaire as well as its differentiated area sensor system. Light sources 502 on the light bar 503 whose aimings are towards surfaces illuminated by the sunlight are reduced in power while those directed at areas in the room far from the window not receiving a significant solar illumination are powered at the usual level.

In another embodiment of this invention, the centralized light engine 500 is adapted for use in an open plan office lighting system. The large office space is divided into cubicles and workstations beneath an acoustic ceiling. The light engine 500 is mounted within the plenum space above the acoustic ceiling in a location central to a number of workstations. It is equipped with a number of high intensity narrow beam light sources 504 which project light to STLS satellite light sources 510 which is a light guide or reflector which redirects the beam through a transparent aperture in the acoustic ceiling to the workstation below. The STLS sensor 507 detects whether an office worker is at the workstation and communicates with controller 501 to power the light source 504 so as to provide lighting at the workstation. The camera sensor 507 relays images to the controller which analyzes the data to determine the visual task being performed and drives the LEDs so as to obtain the correct illumination. When the workstation is vacated, even temporarily, the lighting returns to the low ambient lighting level. More than one STLS can be used per workstation to provide illumination to individual objects, surfaces or other STLS or light guides beneath the acoustic ceiling which can provide illumination under overhanging shelves on work surfaces.

The artificial vision scene recognition system algorithms programmed into the controller 501 are obtained by methodologies known in the art such as using neural network architectures and learning algorithms for pattern recognition, image processing, and computer vision. The remote lighting system that has been disclosed herein, the home example of which has been illustrated in FIG. 29 and an office example in the preceding paragraph is a generalized illumination technique for providing distinctive area illumination from a single light engine is a unique teaching of the present invention; whereby a centralized area lighting system is comprised of 1) one or more primary light sources which generate light from electricity capable of directly and indirectly illuminating a living space, 2) differentiated secondary light sources, dispersed over the area that receive light energy from the primary light source and 3) sensors that are in communication with the controller which provide feedback on the illumination, help in aiming the light output from the sources and collect images for identifying visual tasks to aid the controller in directing and regulating the light. The light is sent either directly to the areas to be lit or to the secondary STLS, wall, ceiling, or satellite light sources. The result being that the lighting system provides correct and comfortable lighting for a variety of visual tasks being carried out in different, distinct sections of the area.

Figure 30:
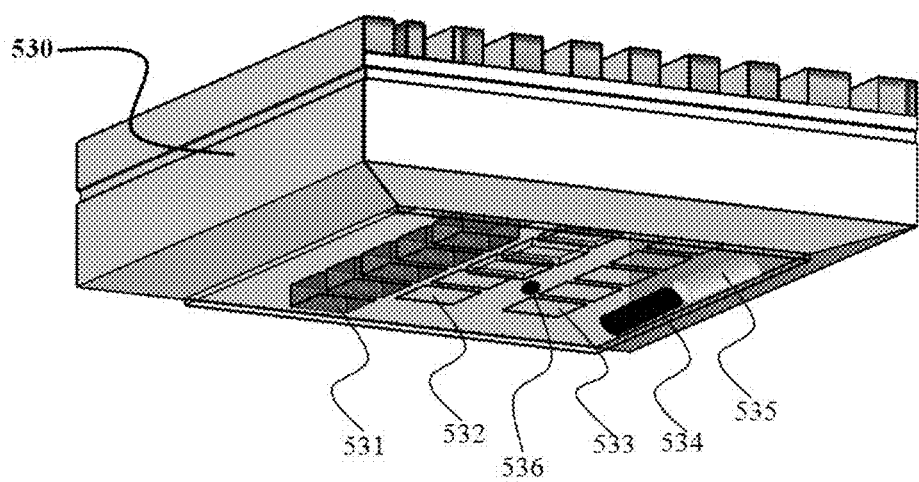
FIG. 30 is a perspective view of a luminaire with a special night-light functionality.

FIG. 30 is a perspective view of a luminaire with a special night light functionality. In locations such as a bedroom or tent used for security forces, besides the luminaire's standard white-light illumination function, there is need for an additional nightlight function for providing light of different chromacity or wavelength. Thus, in an embodiment of the adjustable luminaire of this invention, a number of modes of lighting, varying in light intensity alone or both in intensity and chromacity are provided for by night light luminaire 530. The luminaire is comprised of multiple light sources 531, 532, and 533 of different color spectrum and/or wavelength. The LEDs are powered by electronic power condition gear 534 and logical controller 535 which implements these modes based on programmed times via the light fixture's internal clock as well as by an input device. An optional sensor pack 536 is provided which has a camera array or a light and/or occupancy sensor.

Using light at wavelengths that have different effects in the stimulation of the rods and cones in the eye, it is possible to provide night vision that does not require adaptation time normally required to best see in darkness. In addition, it is possible to provide night light vision with light at wavelengths that do not interfere with the production of melatonin, the sleep hormone, by the pineal gland which is sensitive to light. In addition, it is possible to provide bright light to increase serotonin levels and aid in waking. There are also instances where one occupant of a room needs to arise while another desires to remain sleeping and not be awakened by the turning on of a disturbing light. Thus, it would be preferable for the lighting fixture used in sleeping areas to possess a lower illumination mode which allows for limited visual tasks to be carried out by some, while not intense enough to awaken others. It would also be preferable that the lighting intensity and/or spectrum be unique such that it does not disturb the sleep cycle of others who may be sleeping in the room by avoiding the suppression of melatonin production by the pineal gland.

An application for the use of the luminaire 530 is in permanent or temporary sleeping quarters for military or security personnel. The power conditioning equipment 534 is able to receive power at different voltages from 10 volts to 480 Volts from DC to any frequency any source of power. In a military setting it is important that soldiers exiting the sleeping quarters are able to immediately perform visual tasks in the darkness without waiting for their eye to adapt to the dark. This is because rhodopsin, also known as visual purple, a biological pigment of the retina that is responsible for enabling vision in low-light conditions, immediately photo-bleaches when exposed to light and it takes about 30 minutes to fully regenerate. Thus, it would be beneficial for security force personnel who need to move around the living quarters to ready themselves for duty could use light at low levels that would not interfere with the rhodopsin. Thus, when the quarters are occupied only by non-sleeping individuals, the logical controller 535 powers the white light sources 531 at the power level set for high-activity general lighting. When the quarters are occupied by sleeping individuals, the logical controller 535 dims the white light sources 531 and powers the special wavelength light sources 532 and 533 at low intensity.

The special wavelength light sources are chosen as a function of the eye's photoreceptor's sensitivity. The rods (responsible for night vision) are most sensitive at a particular color blue-green (507 nm). Thus, low lighting by light source 532 at that wavelength would provide the greatest visual response while minimizing energy causing the rhodopsin breakdown. A problem however with scotopic rod vision is that nothing can be seen directly in front of the eyes (no rods in the center of the retina). To see in the extreme dark one must learn to look about 15-20° off center. Not doing so results in the night blind spot which can cause mishaps and physical injury. On the other hand, the center 1.5% of the retina (the fovea) which provides the most detailed vision is packed almost exclusively with red sensitive cones. Thus, to correct for the night blind spot light source 533 producing low levels of red light at a greater than a 650 nm wavelength are powered to illuminate. Experimentation shows that red LEDs with a peak around 697 nm seem to work best to supplement the low intensity blue-green 505 nm wavelength LED 532. Other wavelengths to accomplish the night vision functionality are possible and the two described here are by way of example.

Thus, in an embodiment of the luminaire 530 for use where there is immediacy in the performance of low light visual tasks, there is provided an illumination capability with light sources of wavelength which interfere minimally with seeing in the dark. FAML 530 for use in airplane cockpits or living quarters used by security forces in a state of high readiness has a controller 535 and control gear 534 which drives special wavelength light sources 532 and 533 at the above mentioned wavelengths at low intensity. Either of light sources can be present and used independently or most beneficially in unison in the luminaire 530 to facilitate night vision. When maximum dark adaptation is required the red light intensity is set by the controller 535 and monitored by optional light sensor 536 to provide a low luminance of 0.07-0.35 cd/m2 (0.02-0.10 ft-L). In normal states of readiness, the controller employs light sources 531 producing white light general lighting at an illumination level recommend by the IES for normal activities which is dimmed to a night light setting during non-alert low readiness situations. The nighttime low setting is such that the light flux will yield an illuminance of 0.15 lux on the floor with the chromacity of 4000K similar to moonlight.

In an embodiment of the multiple wavelength producing lighting fixture 530 light sources are provided that can be used to aid in the onset of sleep and/or in the onset of awakening. The multiple light source fixture is equipped with control and light source apparatus to illuminate persons or animals with light at wavelengths that are conducive to sleep or awakening. Kayumov et al. showed that light containing only wavelengths greater than 530 nm does not suppress melatonin production even in relatively bright-light conditions. Also, Brainard et al in "Evidence for a Novel Circadian Photoreceptor" The Journal of Neuroscience, 15 Aug. 2001 shows that in normal healthy humans, equal photon density exposures of $1.9 \times 10^{18}$ photons/cm$^2$ at 460, 630, and 700 nm monochromatic light elicited a significant melatonin suppression at 460 nm while only small reductions of plasma melatonin levels at 630 and 700 nm. Thus, the lighting fixture 530 has a general lighting light sources 531 which has radiation at wavelengths that suppress melatonin production and other light sources 532 and/or 533 which are at wavelengths above 570 nm and do not suppress melatonin production. Individuals with difficulty in going to sleep who are aided by increasing the melatonin level can then instruct logical controller 535 to provide only melatonin friendly illumination at the necessary time of day so as not to interfere with their or the children's sleep time. To aid in awakening the controller would illuminate the living space with light sources 531 which have melatonin suppressing wavelengths helping the individual to awaken. Research shows that if the light is in a particular spectrum (around 460 nanometers, which is in the blue range) greater benefits can be derives even from much dimmer light.

In places where individuals with sleep disorders reside in the hours before going to sleep, it would preferable to have illuminating devices capable of influencing sleep patterns. Thus, it may be preferable to use lighting house wide to control sleep times. In a preferred embodiment the lighting fixture in the living room, bedroom or office would aid in the onset of sleep or aid in the onset of awakening with the lighting fixture making use of intensity variation and chromacity. The lighting intensity in the patient's surround is controlled with reference to the planned sleep hours to adjust the circadian cycle and/or induce hormones so as to assist sleepers to arise by the use of light that is stimulating.

Figure 31:
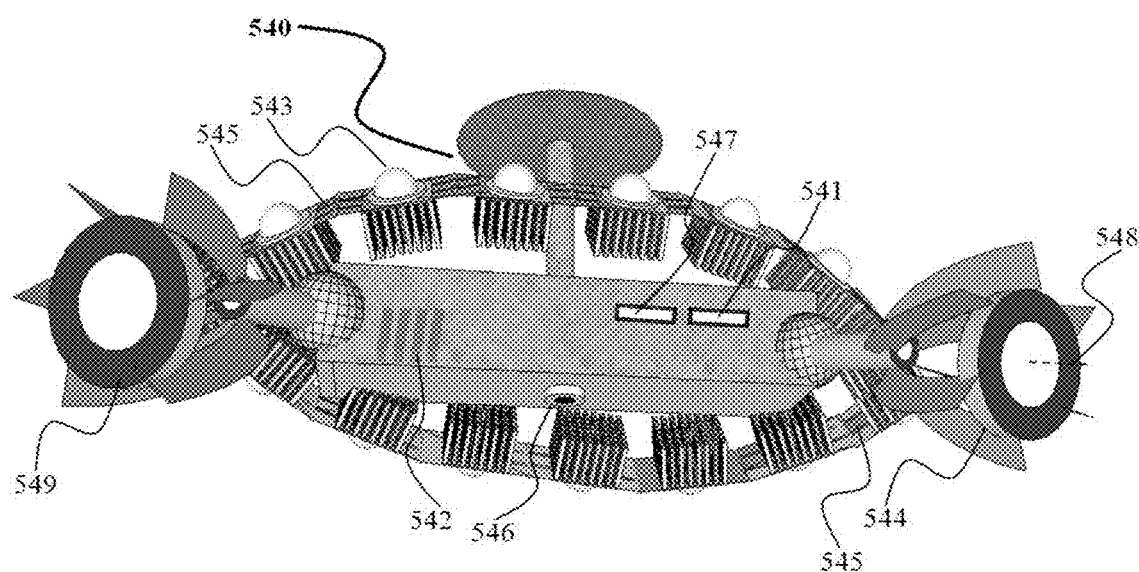
FIG. 31 is a perspective view of an adjustable luminaire with added irradiation functionality.

FIG. 31 is a perspective view of a multiple light source adjustable luminaire with added irradiation functionality. Returning to the geometrically adjustable FAML design with light sources for general lighting on moveable light bars and aim-able spot lighting sources we present an innovative added functionality illumination device. In this embodiment the luminaire 540 has means for limiting at certain times the spectrum of the illumination visible to an individual with difficulty in falling asleep. A fully featured FAML embodiment would be comprised of: a logical controller 541 having means for processing algorithms, data storage, communications and control capability for the task of influencing sleep cycles; power conditioning means 542 for powering controllers, sensors and light sources; standard full spectrum chromacity light sources combined with uniquely driveable light sources 543 that produce light at wavelengths most effective in stimulating or suppressing nocturnal melatonin; and sensors for detecting light and/or images 544. That is, the logical controller 541 can drive LED chips comprising light module 543 that produce a wide range of wavelengths or selectively drive only chips within a permitted wavelength range for some medical, therapeutic or even aesthetic effect. The narrow beam spread, spot light illuminating source 544 also has light producing semiconductor chips of a variety of wavelengths that can be independently powered from driver electronics 542. The light sources 543 and 544 are on movable mounting elements such as light bar 545 and there is the provision of sensors for logical control and feedback in sensor pack 546.

The use of the luminaire to affect sleep cycles is as follows: prior to going to sleep the individual will command controller 541 of the FAML 540 to illuminate their surroundings exclusively using light sources producing wavelengths greater than 530 nm. Light sources 543 and 544 of one or more wavelengths above 530 nm may be employed. Utilizing algorithms or stored preset power levels the logical control via the metametric mixing of light source chips in 543 and 544 illuminates the area or visual task with a color close to white light. Thus, the individual will be able to carry out routine tasks such as watching television in the living room or reading a book in bed. However, the pineal gland will be "fooled" into producing melatonin as if the individual was sitting in darkness.

The melatonin friendly white light can be generated for example by using commercially available Osram Golden Dragon Plus LEDs LT, LY and LR W5AM as the light source chips or diodes comprising the light modules 543 and 544 in the FALM bedroom luminaire 540. When powered by driver 542 at 20 Watts at approximately 350 mA, about 1,200 lumen of very warm white 1200K Color Coordinated Temperature, CCT, light can be produced using the following mix: 156 lumen of 528 nm higher wavelength green light mixed with 400 lumen of 590 nm yellow and 640 lumen of 625 nm red. This mix yields a good color rendering index, CRI of 80 while still allowing for melatonin production. Alternately a single monochromatic LED above 530 nm could be powered but vision and comfort would be compromised. The same luminaire 540 in a second operating mode, that is not required to stimulate melatonin production, can at the same wattage produce a cooler color temperature light. This is achieved by powering blue light source diodes in addition to the previous mix while having the logical controller 541 adjust the power level of each LED chip. For example, with the addition of two watts or 48 lumen of 470 nm blue LEDs (e.g. Osram LB W5AM) a 4250 Kelvin CCT daylight white light can be produced using 600 lumen of 528 nm green light mixed with 500 lumen of 590 nm yellow and a mere 100 lumen of 625 nm red yielding a good color rendering CRI of 82.

In another embodiment, the same fixture 540 is used for the standard lighting in the bedroom in a normal high output operating mode. Thus, by powering more light sources still at approximately 350 mA a higher lighting level and whiter chromacity is achieved. For example, doubling the power to 40 Watts with the addition of four watts or 100 lumen of 470 nm Blue LEDs (e.g. Osram LB W5AM) a 3800 Kelvin CCT cool white light can be produced using 500 lumen of 528 nm green light mixed with 400 lumen of 590 nm yellow and 150 lumen of 625 nm red yielding a good color rendering CRI of 82. A similar effect can be achieved without increasing the number of light sources but instead increasing the current to each LED. This usually however results in shortening of the LEDs useful lifespan. Using a controller 541 and power source 542 capable of powering each LED individually a full range of dimming to very low light levels can be achieved. In an alternative methodology of using different wavelength LEDs for generating melatonin friendly light, a white LED or any other wide spectrum light source could be used with the manual or automatic introduction of a light filter to remove wavelengths lower than 530 nm as needed.

Thus, the same bedroom fixture 540 can serve as a night light obviating the need for an additional night light lighting unit in the same room. Again, the night light mode has special chromacity to allow visual tasks to be performed yet with minimal interference to sleep as described above in FIG. 30. Utilizing the non-symmetric light distribution capability of the FAML when in night light mode, higher intensity lighting for orientation could be provided in areas of movement around the bed or on the way to the bathroom while zero or only very low intensity night lighting would fall near the head of the sleeping person. The fixture 540 is illustrated as having been hung on the ceiling of a bedroom above the beds for two occupants with the spot lights 544 facing the wall above the head of the beds. In the spirit of the adjustable luminaire of the present invention, the light bars 545 holding the light modules 543 have been swung out of direct view of an individual lying on the bed with their eyes facing upwards to the ceiling. The flexibility of the invention is again demonstrated insofar as this re-configuration ability is unique to the multiple light source lighting fixture making it a truly universal lighting fixture. In this unusual case of the eyes facing upwards, indirect lighting via the ceiling becomes the recommended lighting practice alternative of choice, especially if the TV is mounted high off the floor.

In another embodiment, the FAML bedroom luminaire 540 is equipped with a camera 546 and the logical controller has means for image recognition and computer vision. Thus, now as opposed to a standard night light which is always on, the innovative night light 540 using computer vision analysis could be highly dimmed or off most of the time making it easier to sleep and saving power. It would be reactivated when there is major movement on the part of the sleeper indicative of the need for illumination or a baby crying is picked up by microphone in sensor pack 546 in anticipation of light being needed by the parent awakening to care for the child. Greater movement such as getting out of bed would further increase light levels for proper orientation and object avoidance.

As a further customization of the illumination characteristics, when utilizing the light source aim-ability feature of the FALM, one occupant of the room could receive controlled exposure to lighting conducive to melatonin production while other occupants in the room at the same time receive a normal, fuller spectrum illumination. Thus, the right side spot light 544 could be of melatonin friendly light wavelengths for the individual receiving its light while a second individual in the second bed receives a full spectrum of light for reading from the left side spot light 549.

In addition to using light of specific wavelength for treatment of sleep disorders and other circadian rhythm disorders such as delayed sleep phase syndrome, light therapy or phototherapy can be used for the treatment of vitamin D deficiency, skin disorders (for example psoriasis, acne vulgaris and eczema, and some psychiatric disorders for example seasonal affective disorder. As described earlier the spot light source 544 can be moved by actuators under the control of the logical controller 541 much as a moving head stage light follows actors on the stage. This is a unique feature of a computer/machine vision capable FAML irradiating device which can follow and irradiate the patient while they are carrying out their daily activities and is of major benefit. To ensure that the light therapy rays from the FAML strikes the retina from the best angle, a portable STLS may be placed on the floor or furniture in front of the patient's eyes. In instances where the FAML is providing UVB radiation such as in vitamin D therapy and high intensity UVB is hazardous to the eyes, the computer vision system would make sure to stop radiation unless it knew that the eyes were not being irradiated. Other medical applications of light therapy also include pain management, accelerated wound healing, hair growth, improvement in blood properties and blood circulation, and sinus-related diseases and disorders. Many of these use low level laser therapy and red light therapy in the 620-660 nm range.

In an embodiment of the therapeutic luminaire 540 having radiation sources controlled by a logical controller using computer image recognition algorithms that enable face recognition the device is capable of providing the correct dosage to an individual. For example, curing SAD winter depression caused by serotonin deficiency by treatment with bright light therapy the luminaire's logical controller 541 will measure the individual patient's exposure time ensuring that it complies with the medically prescribed dosage to preserve serotonin levels for that time of year. In an embodiment where the computer vision system 546 has capability for eye recognition and tracking, a more accurate dosage intensity and exposure time is metered. The dosage analysis is based on either computer knowledge that the eye is exposed by actually measuring the radiation reflection off the eye which may include a daylight component in addition to the artificial luminaire component. Thus, a more accurate therapy record may be obtained and reported to a monitoring computer or health practitioner if necessary. If a satellite light re-directive STLS device is positioned fore of the patient, a specular mirror section is provided on the STLS and may be used by the camera imaging system to capture the eye or reflections off of the eye and verify the dosage received. Non-disturbing infra-red radiation may be used by the transducer sensor system 546 to capture and measure the eye reflections for imaging and dosage measurement purposes. Using eye-tracking algorithms the controller logs all the time the eyes have received the therapeutic radiation dosage and adjust the treatment accordingly. Having communications apparatus, the controller conveys the treatment history to medical care supervisory personnel.

Another embodiment of the luminaire assists people to awaken at any hour by irradiating them with shorter wavelengths of light or safe UV, which suppress melatonin production. A FAML 540 is provided with: a logical controller 541 having algorithms and data for the task of influencing sleep cycles and with light sources that produce light at wavelengths most effective in suppressing nocturnal melatonin. It then uses a time and intensity controlled exposure to illuminate the person or animal at a prescribed interval time in advance of the wake time. Decreases in melatonin production in human and animals are known to be caused by environmental lighting, especially short-wavelength lighting (between 460 and 525 nm). Test results strengthen earlier findings that the human circadian system is more sensitive to the short wavelengths of light than the longer wavelengths. It is principally blue light, around 460 to 480 nm, that suppresses melatonin, increasingly with increased light intensity and length of exposure (Wirz-Justice, A; Benedetti, F; Terman, M (2009). Chronotherapeutics for Affective Disorders: A Clinician's Manual for Light and Wake Therapy. Basel: Karger. ISBN 978-3-8055-9120-1. It is also possible to use violet colored LED to which the visual response is low such as a 420 nm wavelength. The disturbance to sleeping individuals may be lower, however, though studies demonstrated a clear fluence-response relationship between 420-nm light and melatonin suppression the response is weaker.

Thus, a person sleeping in their bed could program the lighting fixture controller 541 to begin irradiation with the melatonin suppressing wavelength LEDs in advance of the wake-up time as required. Again, with the light aiming differentiation capability of the FALM 540, two people in the same room with different wake-up times could receive different dosage at different times as programmed into the controller. One person could be irradiated with melatonin producing radiation or none at all while the other receives melatonin suppressing irradiation. Alarm clock functionality can be added to the logical controller 541 of the bedroom illuminating device and/or an additional device 547 is provided. It will use lighting and/or sound from alarm speakers 547 to awaken the individual when wake time finally arrives. Voice commands can be used to program and turn off the alarm clock. To ensure the user is really awake the alarm clock can ask the user to solve a mathematical equation before stopping the alarm.

In another embodiment example of a bedroom application (a living room or kitchen lighting application would be much the same), the FAML 540 is located on the ceiling near the room center. It uses distributed light sources 543 or optical means over a single light source to provide for homogeneous ambient lighting and concentrated light sources 544 or optics to create a narrow beam for task lighting. The concentrated sources 544 and 549 may be used to provide illumination for the visual task of reading a book thus replacing the night-table lamps. It is preferable that the beam not come from above and in front of the reader lying in bed as the rays from above will disturb reader. Also, one occupant of the room may desire to sleep while the other is reading. Thus, a re-directive satellite light source STLS is placed directly behind or off to a side and behind the reader. The STLS has a substantially specular reflectivity rather than a diffuse one so as to maintain a concentrated spot beam with little spill light beyond the book. Of course the book itself is a Lambertian reflector but the maximum has been done to minimize disturbing others. The FAML 540 configuration can be adjusted upon installation to have the narrow beam spot light aimed at the STLS. The STLS itself may be manually adjusted by the user to best direct the light for the visual task at hand such as reading a book in bed. The user will keep the laser pointer on the target disc while swiveling the STLS until the book receives the maximum light. This is similar to adjusting the shade of the table lamp which it replaces. When properly aligned there is very little spill light and the other occupant of the room can sleep undisturbed. In an embodiment having a computer vision enabled luminaire capable of determining the book position, the controller 541 will automatically re-direct the light beam 548 from the movable light source 544 and/or re-aim the movable STLS so as to maximize illumination effectiveness. Alternatively, the wall or surface behind the bed or the headboard has sufficiently good optical characteristic enabling light from the beam to be used or has had a specially reflective decal placed on it. In a computer vision enabled embodiment the logical controller 541 is programmed such that when the reader puts the book away the light goes out or slowly dims into the night light mode.

It has been demonstrated that a single bedroom luminaire 540 can replace two other typical bedroom lighting fixtures. The night-table lamp and the nightlight. In addition, by using the directional light output capability of the FAML fixture, this spectrally accurate lighting may be further limited in its illumination coverage to bedroom areas where movement is possible, thus not shining towards a sleeping person's eyes. Using machine vision techniques for image recognition, the position of those sleeping and those up and awake is determined. In addition, computer vision allows for automatic tracking spot lighting similar in function to how a moving head stage light for stage performers follows them about the stage. All this can be carried out by the automated lighting fixture 540 where the light sources are moved by the controller so as to illuminate only the person awake in the room. The trajectory of the light beam is checked by the controller such that the light beam does not fall on the head of anyone else sleeping in the room.

Figure 32:
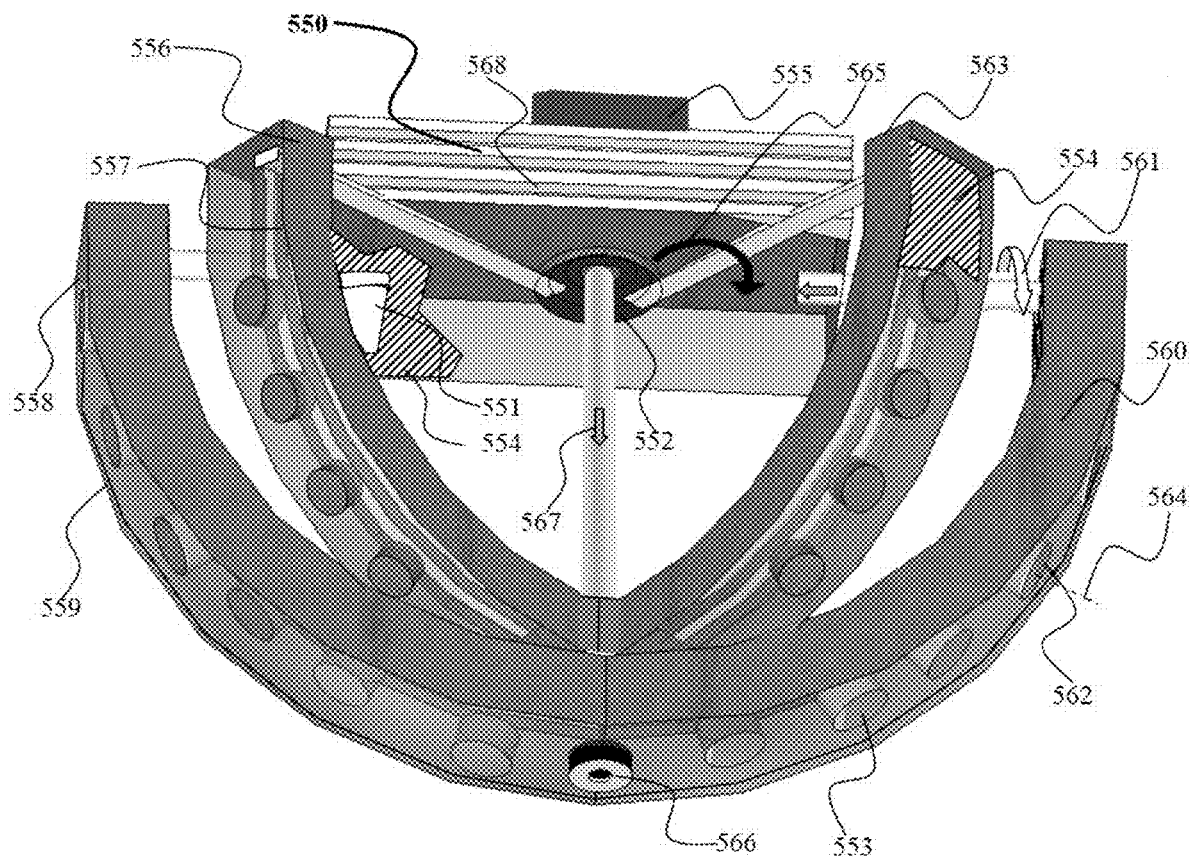
FIG. 32 is a perspective view of an industrial lighting fixture for use in hazardous locations.

FIG. 32 is a perspective view of an industrial lighting fixture for use in hazardous locations. These are locations that are characterized by the presence of combustible gasses or dust particles. So that the explosion proof lighting fixture 550 can to obtain ExProof certification for use in hazardous locations, it is constructed in a unique manner which prevents ignition of the gases or dusts by electricity or heat produced by the fixture. The intrinsic safety protection techniques used in its construction enable safe operation in explosive atmospheres and ensure that the available electrical and thermal energy in the system is always low enough that ignition of the hazardous atmosphere cannot occur. The intrinsic safety of the illuminating device 550 includes the control of component temperatures even in fault conditions (such as an internal short inside an electronic device). The electrical control gear 551, logical controller 552 and LED light sources 553 are all thermally protected. The temperature of a failed component will not rise to a level higher than the autoignition temperature of a combustible atmosphere. Current limiting safeguards, such resistors and fuses, are employed in the electronic circuitry throughout to ensure that in no circumstance can a component reach a hazardous temperature.

To a major extent the fixture is intrinsically safe as it is hermetically sealed for life. This is accomplished because the LEDs 553 are driven at or below design currents as well as having the junction being thermally cooled to well below allowable temperatures due to lifetime and explosion proof certification considerations. Note that in prior art ExProof fixtures the lamp needs to be replaced and therefore allowance was made in fixture design for opening the fixture to replace the lamp. Under these low current cool operation conditions, the LEDS will provide 90% of their initial lumen output even after 100,000 hours or over 20 years of night operation. This in turn allows for a design where the LEDs are encapsulated for life in resin type materials 554. There is no possible contact with explosive materials between electrical or heat generating components. Thus, in this novel hazardous location fixture design, the LEDs, electronics and electrical components are intrinsically safe in a sealed for life fixture. This is an inherent safety design and allows for the fixture to be located even in the most hazardous locations including underground mines or inside of tanks i.e. division 1 and zone 0 classified hazardous areas. In an embodiment of the fixture there are no screws to open for access to the internal fixture parts other than on the wiring box 555 which connects the Exproof fixture to the power mains. The wiring box itself is approved for zone 0 hazardous locations and has explosion proof sealing apparatus. While prior art fixtures that can be opened for service may not be properly closed by service personnel thus becoming an explosion hazard this sealed fixture is foolproof in that there is no access for life.

Referring now to the adjustable lighting fixture embodiment in more detail, in FIG. 32 there is shown an illuminating or irradiating device 550 which is capable of being adjusted to match the radiation spatial distribution with the actual illuminating requirements of the surround where the lighting fixture 550 has been installed. The light sources 553 are mounted on curvilinear support structures 556. The rear side 557 of the support structure (or light bar) 556 is a heat exchanger structure of increased surface area for the transfer of heat from the LED junctions to the surrounding air. The front surface material 558 of the support structure is highly transmissive to light allowing the light generated by the light sources 553 to exit the luminaire. These curvilinear support structures 556 possess a unique geometry and thermal transfer characteristic and are innovative in a number ways. The luminaire is comprised a multiplicity of light sources having respective spectral distributions and respective light distribution patterns which are directional and subtend lesser angles than those of the overall luminaire light distribution pattern. The light source mounting structure 556 is configured to mount the light sources 553 so arranged on the structure such that the respective directional light distribution patterns and the respective spectral distributions combine to form an efficiently distributed overall light distribution pattern. This overall light distribution has been calculated to efficiently provide the surface areas intended for illumination by the fixture 550 with the design illuminance. In this unique configuration the overall light distribution pattern, subtending greater angles than that of the respective light distribution patterns is produced directly by the multiplicity of light sources without recourse to inefficient non-integral reflectors and/or refractors.

As the overall spatial light distribution of luminaire 550 is comprised of the sum of the narrower beam light sources 553, each light source covers a specific area proximate to the luminaire. The aiming angles of the sources of known light flux and beam angle are determined by using the inverse cosine law to determine the amount of light flux required to illuminate the surfaces to be covered by the luminaire. Once the aiming angle with reference to the nadir is known there is yet another design criterion that needs to be met. There is great importance in maintaining the light emitting diode junction at low temperature. To remove the heat from the junction it is important for the LED assembly 553 to have excellent thermal contact with the heat sink 557 at every aiming angle. Thus, the construction of the support structure has been dictated by the individual light source aimings that are designed to illuminate both near and distant surfaces with the recommended illuminance. In addition, the rear side of the support structure 556 which is exposed to the outside air is integral with the heat sink 557 which is most beneficially in direct contact with the LED junction to maximize thermal transfer away from the diode structure to the environment. Uniquely both of the design requirements have been met by the unique construction of the support arm 556. The final benefit of the unique curvilinear light bar is the strength it imparts to the structure. In an embodiment the shock proof glass lens 558 is slightly recessed within the light bar channel 556 allowing for the edge 559 to act as a protective bumper protecting the glass from breakage even if impacted by a metal tool. Often explosion proof glass globes are protected by a guard. The curved metal guards protect the glass from mechanical breakage in the harsh industrial setting. The shape of the bars 556 and the recessed glass cover maintains this protective design approach to effect shielding from mechanical breakage.

An exemplary embodiment of the adjustable explosion proof fixture in a chemical processing plant characterized by an open facility design is presented. In the facility, piping and vessels are supported by the skeletal support structure with walkways, floors and stairs made of metal grating. The walkways, vessels, machinery and piping all need to be illuminated at night by lighting fixtures placed on the structure along the walkways. In this lighting application example, the walkways are at the exterior edge of the structure with the piping and machinery towards the interior. Beyond the walkway fence there is no structure and no need for illumination. The configuration of the lighting fixture as shown in FIG. 32 has been arranged so as to illuminate inwards towards the vessels, machinery and piping as well as along the walkways and stairs but not outward into free space. The luminaire has been mounted on an upright beam at height of 3 meters at the inward edge of the 1.5 meter wide walkway. The LED bar 560 is rotated 15 degrees off the nadir out of the page around the axis 561 to be aimed at the center of the walkway and the LED 553 beam spread is 30 degrees. LED 562, because it is projecting to the work plane further away at a higher angle from the nadir, will, following the inverse square and cosine law, have a narrower beam spread (at least along the width of the walkway i.e. the beam 564 may be rectangular or elliptical, taller than it is wide) ensuring that most of the light is utilized and not spilled over the edges of the walkway. The light bars 556 and 563 have mechanical means to be rotated 360 degrees about the center 565 and have been aimed to the same side, inwards to the facility. Thus, they illuminate the piping and machinery and do not shine out of the facility wasting the energy or even causing light pollution as would a standard prior art luminaire. Now in their new configuration, the light intensity output of each LED must be reset in the driving electronics 551 and controller 552 so as take into account overlapping coverage on surfaces to be maintained at the recommended illuminance.

In a preferred embodiment a sensor apparatus 566 is capable of measuring the illuminance of surfaces in the processing facility and providing the logical controller 552 the necessary feedback information to control the power to the light sources 553 etc. so that the illuminance goals are met. Alternately, if the light bars have been incorrectly configured in aimings that do not allow for coherent illumination of the surfaces, the controller communicates the necessary aiming modification to the installer. An example of the logical controller 552 circuitry, computing apparatus and algorithm processing were described above in FIGS. 22 and 23. In an embodiment where sensor 566 is a digital camera and the logical controller 552 has means for computer vision, an installer can use reference sheets of known reflectivity and luminance to calibrate the illumination level setting of the individual light sources within the logical controller 552 based on the fixtures initial factory calibration data. For example, when setting up the system the installer can customize the illuminance level on each element of interest. The system calibrates light coverage by firing LEDs at synchronized timings with the vision analysis system 552 determining which LED illuminates what surface. Next the installer can input the desired illuminance via the reference sheet by indicating on it the number of lux desired on the surface. For example, attaching a note with 200 lux printed on it on a valve. The image recognition software then provides the logical controller the illuminance goal of 200 lux on that surface and the logical controller 552 powers the light sources 553 etc. aimed towards that surface with the necessary power signal to obtain the needed light flux. Feedback is provided to the installer if additional light sources are needed or their re-aiming is required. Information is provided to the installer through visual display on the logical controller 552 of the luminaire or another display device in communication with the logical controller 552.

In another embodiment the cooling of the harsh environment luminaire 550 is effected by using liquid cooling of the LED light sources. The coolant may be anything from deionized water (approximately 18.2 megohm-cm) to heat-conductive oil. The oil may be part of the methodology used to secure intrinsic safety classification from ignition danger of electrical circuits in explosive environments. It may also be an optically transmissive medium which couples optically with the light sources to produce a desired light distribution with other complementary optical devices. The oil may be pumped mechanically with a pumping apparatus such as a long life diaphragm pump to cool the diode junction. Alternately, in a preferred embodiment shown here, thermos-siphon effect circulation is utilized to convect the thermal transfer fluid from the light bars 560, 556 and 563 to the central heat exchanger 568. The thermos-siphon return post 567 serves as the path for the cooled lower density cooling fluid to return to the light bars 560, 556 and 563 from the heat exchanger 568. The benefit of the thermos-siphon system is that it is motor less, doesn't require power and is highly reliable. It also adds longevity and efficiency to the LED light sources by offering superior heat transfer rates maintaining the diode junctions at the lowest possible temperature.

Figure 33:
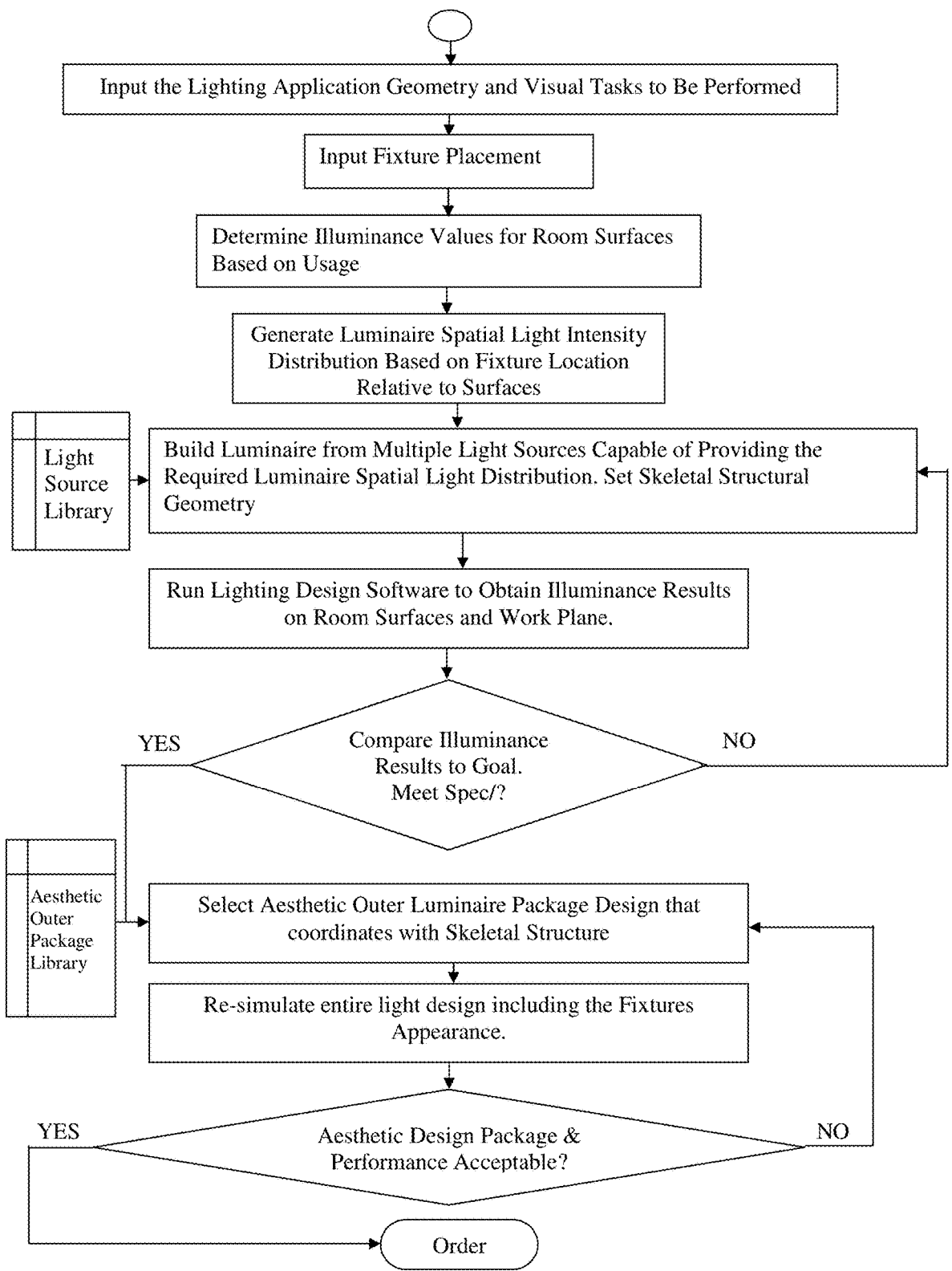
FIG. 33 is a process flow chart for a computer lighting fixture design program.

FIG. 33 is the process flow chart for novel web-based computer application that can help the customer design the multiple light source luminaire for their particular lighting application and order it compete correctly configured from the factory. Alternately, in a DIY luminaire version, they can receive all the necessary luminaire parts with their unique set of assembly instructions for their lighting application. The build-the luminaire-to-order program turns the customer into a professional luminaire and lighting designer. In creating the tailor-made luminaire, the customer, aka lighting fixture designer, has control of illumination performance based on the skeletal light engine design as well as a choice of various aesthetic luminaire outer body designs. The program is novel insofar as it builds the lighting fixture from multiple light sources according to the dictates of the living space. Prior art practice used hitherto in other lighting programs take standard lighting fixtures with known photometric data as to the light distribution and calculates the resultant illuminance obtained on the workplace or room surfaces. Here the process begins with specifying a surface illuminance and using goal solving techniques, the application builds the fixture's light distribution. Next, in a unique process, the computer application using engineering and look-up table algorithms chooses light sources and places them on the fixture to obtain the desired light distribution.

In practice the customer inputs the lighting application geometry, fixture mounting position, living space elements and projected usage answering a live questionnaire. Digital camera pictures of the living space uploaded to the site may aid the program in generating the architectural CAD lighting layout. The customer assigns visual task information to areas of the room, e.g. reading chair, adult over 50 years old etc. The layout process ends with a map of the room surfaces now assigned with illuminance levels. The program assigns a specific orientation of the luminaire within the living space e.g. fixture orientation mark facing east window. The luminaire in practice must be hung in the room in the instructed orientation. A preliminary grid is assigned to the room surfaces based on the distances from the luminaire to the surface and the light intensity limits of the light sources. By using the inverse square and cosine law with known illuminance, distances and angles the program solves for the luminous intensity. By working a luminaire design program such as Photopia™ from LTI Optics in reverse, the light source ray distribution properties are obtained. The program then looks up in the light source library the light source with the best matching spatial intensity distribution for illuminating the specific grid area. The design program then arranges the selected light sources on a fixture skeleton structure to obtain the overall necessary illumination. The web application next simulates the fixture performance through lighting design software applications known in the art such as AGI32™ from Lighting Analysts. The computer routine checks the lighting layout against best practice guidelines for visual comfort from glare, lighting levels and recommends need for additional light modules, luminaires or reflective satellite light sources. The customer can review the simulated lighting output in their application and after a few fine-tuning iterations a final design can be satisfactorily achieved. Now that the fixture skeleton and light source positions thereon are known, the customer then chooses from the available candidates of aesthetic luminaire outer façade choices that can be used with the dictated skeletal structure. The final fixture outer design and lighting performance is simulated. Should the customer be unhappy with the aesthetics or performance they may begin again with the option of forcing an aesthetic design which may dictate a less than optimal skeletal structure. When satisfied, the customer orders the luminaire to be assembled by the manufacturer to spec. In the DIY version the web application generates the fixture parts list for the kit to be sent to the customer. It is clear that the application is not only web based but can be a downloadable version run from a computer.

In another version of this Do-It-Yourself lighting designer application, the main skeleton lighting fixture with the power supply electronics and the camera-based vision system and controller is supplied to the customer. The camera vision system measures the room geometry and identifies room contents as described earlier via algorithms known in the art for measuring distances with a camera and pattern recognition techniques for identification. Based on the information garnered about the lighting application such as by following a computerized lighting application design questionnaire and checklist (activities performed in the room, age of the occupants etc.), the lighting layout is specified and the lighting fixture design with the light source layout is determined using the lighting design software. The answers to the question are input via a speaker microphone system on the lighting fixture or via come other input device such as a computer or smart-phone in communication with the controller. Once the illumination needs have been determined and the fixture designed the rest of the light sources are ordered up and the DIY fixture similar to 470 in FIG. 24 is assembled While the preferred embodiment of this invention comprises an adjustable luminaire having means for changing the spatial light distribution as well as the spectral light distribution, it is clear that embodiments of this invention may offer only the spatial light output distribution adjustability as for example when using a single color spectrum LED for all the light sources or only color spectrum adjustability where spectrally differentiated light sources have been used but there is no means for adjusting the spatial light distribution. Many of the novel features of this invention disclosed herein in this continuation in part of the earlier disclosure of the Multiple light illuminating system included herein by reference apply to the lighting fixture embodiments of that disclosure as well.

CONCLUSION

We have been disclosed a luminaire with control of at least one of the light intensity, light spectrum and light direction and that further being combined with a controller and directional sensors such as a camera having an artificial vision system capability is uniquely able to effect the provision of lighting on an as needed basis in the optimal intensity, spectrum and placement.

There has thus been shown and described, among other things, a multiple-source lighting technology which allows for the design and construction of illuminating devices. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention without departing from the spirit or scope of the following claims.

Although a limited number of preferred embodiments of the present invention have been illustrated in the accompanying drawings and described in the foregoing detailed description, it is possible mix and combine the features of one embodiment with another to create a DLF with differing characteristics as taught in the method herein. Therefore, it will be understood that the invention is not limited to the embodiments disclosed, but is capable of numerous rearrangements, modifications, and substitutions without departing from the spirit of the invention as set forth and defined by the following claims. The invention should therefore not be limited by the above described embodiment, method, and examples, but by all embodiments and methods within the scope and spirit of the invention.

What is claimed is:

1. A vehicle headlight system comprising:
   one or more headlamps and a vehicle structure, arranged for affixing components of the system to the vehicle;
   a plurality of light clusters, arranged in each of the one or more of the one or more headlamps, the headlamps capable of projecting light so as to illuminate a plurality of sub-sections of a field-of-view with different illumination characteristics, the subsections determined in response to sensor data, wherein the light clusters operate to create a headlight beam;
   electronic control circuitry configured to independently operate the light clusters;
   one or more sensors configured to obtain and provide the sensor data predefined as pertinent to illumination requirements for the field-of-view; and
   a logical controller including a processor, the processor in communication with a memory storing one or more algorithms, with the sensors, and with the control circuitry, wherein the processor is configured to process the one or more algorithms and the sensor data to determine an illumination for at least two of the sub-sections, that reduces illumination to reduce glare in at least a first of the at least two subsections and adapt the light emitted from one or more of the light-clusters so as to create the headlight beam that provides the determined illumination.

2. The headlight system of claim 1, wherein at least one of the light clusters comprises:
   a structure to position the light cluster, such that the projected light from the at least one cluster has an aiming direction in relation to a forward travel direction of the vehicle;
   one or more light emitting sources, each having a variable light-source characteristic dependent on power, and wherein the control circuitry is arranged to alter said light-source characteristic via power control; and
   one or more light modifying elements provided in the path of light emitted from at least one of the sources, further controlling the light-source characteristics;
   wherein the structure combined with control of the light sources and light modifying elements results in an emitted light-cluster light characteristic including at least one of direction, intensity, beam spread, spatial light distribution or spectral light distribution.

3. The headlight system of claim 2, wherein the one or more light modifying elements is at least one of a static light modifier or a variable light modifier, said light modifying element comprising at least one of reflectors or refractors, and wherein variable light modifier control circuitry is configured to control the light-cluster light characteristic by altering the light modifying elements in the path of the light emitted from the at least one of the light sources.

4. The headlight system of claim 2, wherein the light modifying element further comprises at least one of lenses, diffractors, optical devices, a light guide, filters, phosphors, optical coatings, prisms, controllable piezoelectric light guides, MEMS devices, light valves or optical switches.

5. The headlight system of claim 1, wherein at least one of the light-clusters includes:
   a plurality of light sources, wherein one or more of the plurality of light sources comprises at least one of multiple light-emitting-diodes (LEDs) or organic light-emitting-diodes, each light source having a spectral power distribution characteristic and wherein the control circuitry is configured to alter the overall light-cluster spectral power distribution to illuminate at least one of the at least two sub-sections of the field-of-view with a different color of light from another of the at least two sub-sections.

6. The headlight system of claim 1, wherein the headlight beam further comprises light in at least one of infra-red (IR) or ultra-violet (UV) wavelengths.

7. The headlight system of claim 1, wherein at least one of the sensors is a camera-sensor configured to image at least lights indicative of oncoming vehicles having a driver whose vision could be disturbed by the headlight beam, and wherein the logical controller upon receiving data, indicating a position of the lights, from the camera-sensor, is configured to use one or more of the algorithms to determine a position of the oncoming vehicle, based on the position of the lights as indicated by the data, relative to the vehicle headlight system and responsively adapt the headlight beam to decrease at least one vision-disturbing characteristic to the oncoming vehicle driver.

8. The headlight system of claim 1, wherein at least one of the sensors is a camera-sensor configured to image at least lights indicative of preceding vehicles having a driver whose vision could be disturbed by the headlight beam reflected in a mirror, and where the logical controller upon receiving data, indicating a position of the lights, from the camera-sensor, is configured to use one or more of the algorithms to determine a position of the preceding vehicle, based on the position of the lights as indicated by the data, relative to the vehicle headlight system and responsively adapt the headlight beam to decrease at least one vision-disturbing characteristic to the driver of the preceding vehicle.

9. The headlight system of claim 1, wherein the one or more sensors includes a GPS sensor.

10. The headlight system of claim 1, wherein at least one of the sensors is configured to detect at least one of oncoming headlights or preceding taillights.

11. The headlight system of claim 1, further including a computer vison processing unit configured to use the sensor data and one or more of the algorithms to identify entities including at least one of beings, vehicles, roadway, or street signs and wherein the logical controller is further configured to modify the headlight beam to change illumination of the identified entity.

12. The headlight system of claim 1, where the determined illumination results in creation of a headlight beam providing a driver of the vehicle including said headlight system with higher visibility in at least a second of the at least two subsections relative to the first of the at least two subsections, while mitigating glaring illumination projected to reach the eyes of at least one of other drivers or pedestrians in the first of the at least two subsections, based on detected other vehicles or pedestrians in the first of the at least two subsections as indicated by the sensor data.

13. The headlight system of claim 1, wherein the required illumination continues to provide high-beam illumination in at least a second of the subsections different from the first of the subsections, without diminishing a range of the high-beam illumination.

14. The headlight system of claim 1, wherein the one or more sensors further includes at least one of a camera, a microphone, an ultrasonic transducer and receiver, or an electromagnetic radiation source and detector including any of IR, UV, laser, or light.

15. The system of claim 1, wherein the logical controller is further configured to determine at least a road curvature, indicated by the sensor data, ahead of the vehicle and wherein the required illumination includes increasing illumination in a direction of the road curvature.

16. The system of claim 15, wherein the logical controller is further configured to determine at least a planned upcoming turn, indicated by the sensor data, and wherein the required illumination includes increasing illumination illuminating the turn.

17. The system of claim 1, wherein the logical controller is further configured to determine at least a planned upcoming turn, indicated by the sensor data, and wherein the required illumination includes increasing illumination illuminating the turn.

18. The system of claim 1, wherein at least one light source provided to at least one headlamp includes a laser diode.

19. The system of claim 1, wherein at least one of the one or more headlamps further includes at least one of reflectors, refractors, or lenses usable to alter emitted light from at least one of the light clusters.

20. A vehicle headlight system, comprising:
one or more headlamps affixed to a vehicle, each headlamp including at least three directional light sources aimed at different angles relative to the vehicle, the light sources configured to have one or more controllable light characteristics, wherein a first light source of the more than one light sources aimed at a first angle is less visually disturbing to traffic than a second light source of the more than one light sources aimed at a second angle, different from the first angle;
control circuitry configured to adjust the at least one light characteristic of at least one of the directional light sources;
one or more sensors configured to sense information defined as pertinent to determining illumination output from the one or more headlamps and communicating the sensed information to a processor as sensor data;
the processor, in communication with at least the sensors and the control circuitry, configured to:
process the sensor data to determine, within a field-of-view, at least a first subsection including a detected vehicle and at least a second subsection not including the detected vehicle,
determine optimal use of the differently aimed directional light sources to maximize vehicle operator visibility in at least the second subsection, while minimizing a disturbing effect, resulting from the illumination output, on the vision of other traffic in at least the first subsection, and
direct the control circuitry to adjust the directional light sources to achieve the determined optimal use.

21. The system of claim 20, wherein the processor is further configured to determine at least a road curvature, indicated by the sensor data, ahead of the vehicle and to direct the control circuitry to adjust the directional light sources to increase illumination in a direction of the road curvature.

22. The system of claim 21, wherein the processor is further configured to determine at least a planned upcoming turn, indicated by the sensor data, and to direct the control circuitry to increase illumination illuminating the turn.

23. The system of claim 20, wherein the processor is further configured to determine at least a planned upcoming turn, indicated by the sensor data, and to direct the control circuitry to increase illumination illuminating the turn.

24. The system of claim 20, wherein at least one light source provided to at least one of the one or more headlamps further includes a laser diode.

25. The system of claim 20, wherein at least one of the one or more headlamps further includes at least one of reflectors, refractors, or lenses usable to alter emitted light from at least one of the light sources.

26. A method for generating a headlight beam in an adaptive headlight system that provides illumination to at least a portion of a field-of-view, comprising:
utilizing one or more sensors of a vehicle including the adaptive headlight system to obtain and provide data predefined as relevant to a determination of illumination requirements for the field-of-view, the data including data indicative of at least one of one or more other vehicles or a pedestrian;
determining illumination requirements for the field-of-view based on the data sensed by the sensors, including determining illumination for at least a first subsection of the field-of-view including the other vehicle or pedestrian, as indicated by the sensor data, and for at least a second subsection of the field-of-view not including the other vehicle or pedestrian;
determining a control strategy for controlling one or more directional light clusters in a headlight assembly to create an output headlight beam meeting the determined illumination requirements, the headlight beam spatial light distribution shaped to provide high beam illumination for a driver of the vehicle, in at least the second subsection, while mitigating glaring light illuminating at least the first subsection including detected other vehicles or pedestrians;

sending control signals implementing the control strategy to an electronic control circuitry configured to operate the light-clusters; and controlling the light clusters via the electronic control circuitry to collectively emit the headlight beam meeting the determined illumination requirements.

27. The method of claim 26, wherein the determining illumination requirements further comprises:

determining the illumination requirements based on headlight modes comprising one or more of parking lights, low beam, high beam, cornering lights, load leveling adjustment, integral turn signal indicators, inputtable alternate beam pattern selection, and specified preferential headlight illumination color of the driver.

28. The method of claim 26, wherein the illumination requirements accommodate peripheral night vision of the driver, by defining bluish headlamp illumination along a side of a road, while defining yellow tinted illumination along the road.

29. The method of claim 26, wherein the illumination requirements accommodate sensed fog or snow environmental conditions by defining a shift of at least a portion of the headlight beam towards yellow.

30. The method of claim 26, wherein the control strategy dynamically adapts the headlight beam based on real-time changes to the data sensed by the sensors indicating a change to at least one of beings, objects and preceding vehicles ahead of the first vehicle.

31. The method of claim 26, further comprising receiving input to an override switch and, responsive to the input, adjusting automatic operation of the headlight system to reflect operator instruction as indicated by the input to the override switch or by further input to a different vehicle input other than the override switch.

32. The method of claim 26, wherein the determining illumination requirements further includes determining illumination for an upcoming curve indicated by the sensor data, wherein the determining the control strategy further comprises determining the control strategy for controlling the directional light clusters to create an output headlight beam that illuminates around the curve.

33. The method of claim 32, wherein the determining illumination requirements further includes determining illumination for an upcoming turn indicated by the sensor data, wherein the determining the control strategy further comprises determining the control strategy for controlling the directional light clusters to create an output headlight beam that illuminates the turn.

34. The method of claim 32, wherein the determining illumination further includes determining illumination the increases illumination of an upcoming turn indicated by the sensor data, wherein the determining the control instructions further comprises determining the control instructions for controlling one or more of the directional light sources to achieve illumination of the turn.

35. The method of claim 26, wherein the determining illumination requirements further includes determining illumination for an upcoming turn indicated by the sensor data, wherein the determining the control strategy further comprises determining the control strategy for controlling the directional light clusters to create an output headlight beam that illuminates the turn.

36. The method of claim 26, wherein the determining illumination further includes determining illumination the increases illumination of an upcoming turn indicated by the sensor data, wherein the determining the control instructions further comprises determining the control instructions for controlling one or more of the directional light sources to achieve illumination of the turn.

37. A vehicle headlight system comprising:

one or more headlamps affixable to a first vehicle;

a plurality of light clusters arranged in each of the one or more of the headlamps and capable of illuminating sub-sections of a field-of-view with different illumination characteristics, wherein at least two of the light clusters operate to create a headlight beam;

one or more sensors configured to obtain and provide sensor data, at least a portion of the sensor data indicating a second vehicle within the field-of-view; and at least one processor configured to:

receive the sensor data;

process the sensor data to determine a light distribution pattern for an adaptive headlight beam, such that a headlight beam adapted to the pattern substantially illuminates a first subsection of the field-of-view including at least a portion of the second vehicle with an illuminance below a predefined threshold value, while the beam substantially illuminates at least the one or more second subsections of the field-of-view to either side of the first subsection with an illuminance above the predefined threshold value; and instruct operation of at least two of the light clusters to create the adapted headlight beam.

38. The headlight system of claim 37, wherein at least one of the at least one processors is further configured to process the sensor data to determine illumination for at least one first subsection of the field-of-view, determined to include at least a portion of the second vehicle, based on the sensor data, and for at least one second subsection determined not to include the second vehicle, based on the sensor data.

39. The headlight system of claim 37, wherein the plurality of light clusters are further capable of illuminating at least two of the sub-sections with different illumination characteristics based on the at least one processor determining specific, different illumination characteristics for each of the at least two sub-sections.

40. The headlight system of claim 37, wherein the light distribution pattern defines illumination for at least the first and the one or more second sub-sections of the field of view.

41. The headlight system of claim 37, wherein the light distribution patterns defines illumination for the first subsection designed to result in an illuminance below the predefined threshold value, and defines illumination for the one or more second subsections designed to result in an illuminance above the predefined threshold value.

42. The headlight system of claim 37, wherein at least one of the light clusters comprises:

one or more light sources, each having a variable light-source light characteristic dependent on power and alterable, at least responsive to instructions from at least one of the at least one processors, via power control; and one or more light modifying elements provided in a path of light emitted from at least one of the light sources, further controlling at least one light characteristic of the at least one of the light source;

wherein control of the light sources and light modifying elements results in a specified emitted light-source light characteristic, where said emitted light-source light characteristic includes at least one of direction, intensity, beam spread, spatial light distribution or spectral light distribution.

43. The headlight system of claim 42, wherein the one or more light modifying elements comprises at least one of reflectors or refractors, and wherein at least one of the at least one processors is configured to instruct control of at least one light modifying element resulting in a change to the light-source light characteristic.

44. The headlight system of claim 42, wherein the light modifying element further comprises at least one of lenses, diffractors, optical devices, a light guide, filters, phosphors, optical coatings, prisms, controllable piezoelectric light guides, MEMS devices, light valves or optical switches.

45. The headlight system of claim 37, wherein at least one of the light-clusters includes:
a plurality of light sources, wherein one or more light sources of the plurality of light sources comprise at least one of light-emitting-diodes (LEDs) or organic light-emitting-diodes, each light source having a spectral power distribution characteristic alterable, at least responsive to instructions from at least one of the at least one processors, by modifying power to the one or more light sources of the plurality of light sources, resulting in a color change to projected light from the at least one light-cluster illuminating at least one subsection of the field-of-view.

46. The headlight system of claim 37, wherein the light output from at least one headlamp further comprises at least one of infrared or ultraviolet wavelengths.

47. The headlight system of claim 37, wherein at least one of the sensors is a camera-sensor configured to image at least lights indicative of an oncoming vehicle.

48. The headlight system of claim 37, wherein at least one of the sensors is a camera-sensor configured to image at least lights indicative of a preceding vehicle.

49. The headlight system of claim 37, wherein the one or more sensors further includes a GPS sensor.

50. The headlight system of claim 37, further including a computer vision processing unit configured to use the sensor data to identify entities including at least one of beings, vehicles, roadway, or street signs, and wherein the processor is further configured to determine modification of the headlight beam to change illumination of the identified entity.

51. The headlight system of claim 37, where the illumination created by the headlight beam results in illumination both providing a driver of the first vehicle with preserved illumination in the one or more second subsections and mitigating glare projected to reach the eyes of a driver of the second vehicle.

52. The headlight system of claim 37, wherein the adapted headlight beam continues to provide high-beam illumination in the one or more second of the subsections without diminishing a range of the high-beam illumination.

53. The headlight system of claim 37, wherein the one or more sensors further includes at least one of a camera, a microphone, an ultrasonic transducer and receiver, or an electromagnetic radiation source and detector including any of IR, UV, laser, or light.

54. The headlight system of claim 37, wherein at least one of the at least one processors is further configured to determine at least a road curvature, indicated by the sensor data, ahead of the first vehicle and to determine a second illumination pattern defining increased illumination in a direction of the road curvature.

55. The headlight system of claim 54, wherein at least one of the at least one processors is further configured to determine at least a planned upcoming turn, indicated by the sensor data, and to determine a third illumination pattern defining increased illumination illuminating the turn.

56. The headlight system of claim 37, wherein at least one of the at least one processors is further configured to determine at least a planned upcoming turn, indicated by the sensor data, and to determine a third illumination pattern defining increased illumination illuminating the turn.

57. The headlight system of claim 37, wherein at least one light source provided to at least one headlamp includes a laser diode.

58. The headlight system of claim 37, wherein at least one of the one or more headlamps further includes at least one of reflectors, refractors, or lenses usable to alter emitted light from at least one of the light clusters as part of the instructed operation.

59. A vehicle headlight system, comprising:
one or more headlamps affixed to a first vehicle, each headlamp including at least three directional light sources having different aimings relative to the first vehicle, the light sources having one or more controllable illumination characteristics;
one or more sensors configured to sense information, at least a portion of the sensed information indicating a second vehicle, and communicate sensor data reflecting the sensed information to at least one processor, wherein the at least one processor is configured to:
process the sensor data to identify a first subsection, of a field of view, that includes at least a portion of the second vehicle;
determine light output for the headlight system that aims illumination at the first subsection, the illumination aimed at the first subsection substantially resulting in light below a first predefined illuminance in the first subsection, and that aims illumination at one or more second subsections of the field of view to either side of the first subsection, the illumination aimed at the one or more second subsections substantially resulting in light above the first predefined illuminance in the one or more second subsections; and
instruct adjustment of one or more of the light sources to achieve the determined output.

60. The system of claim 59, wherein at least one of the at least one processors is further configured to determine at least a road curvature, indicated by the sensor data, ahead of the first vehicle and to determine light output that aims illumination in a direction of the road curvature.

61. The system of claim 60, wherein at least one of the at least one processors is further configured to determine at least a planned upcoming turn, indicated by the sensor data, and to determine light output that illuminates the turn.

62. The system of claim 59, wherein at least one of the at least one processors is further configured to determine at least a planned upcoming turn, indicated by the sensor data, and to determine light output that illuminates the turn.

63. The system of claim 59, wherein at least one light source provided to at least one of the one or more headlamps further includes a laser diode.

64. The system of claim 59, wherein at least one of the one or more headlamps further includes at least one of reflectors, refractors, or lenses usable to alter the light emitted from at least one of the light sources as part of the instructed adjustment.

65. A method for generating a headlight beam in an adaptive headlight system that provides illumination to at least a portion of a field-of-view, comprising:
utilizing one or more sensors of a first vehicle to obtain and provide data, the data including data indicating at least a second vehicle;

determining illumination for at least a first subsection including the second vehicle and at least one or more second subsections, to either side of the first subsection, including determining an illumination level for the first subsection that substantially illuminates the first subsection below a predefined illuminance, and determining an illumination level for the one or more second subsections that substantially illuminates the one or more second subsections above the predefined illuminance;

determining control instructions for controlling one or more directional light sources included in the adaptive headlight system to achieve the determined illumination levels for at least the first and one or more second subsections; and controlling the light sources to emit the headlight beam in accordance with the control instructions.

66. The method of claim 65, wherein the data includes data indicating a pedestrian and wherein the determining illumination includes determining an illumination level, for at least a third subsection including the pedestrian.

67. The method of claim 65, wherein the data includes data indicating a road-sign wherein the determining illumination includes determining an illumination level, for at least a third subsection including the road-sign.

68. The method of claim 65, wherein the determining illumination further includes determining a yellowish illumination color for illumination illuminating a road within the field-of-view and a blueish illumination color for illumination illuminating areas off-road within the field-of-view.

69. The method of claim 65, wherein the data includes data indicating fog or snow environmental conditions and the determining illumination includes determining a shift of at least a portion of the light output from the headlight system towards yellow.

70. The method of claim 65, wherein the determining illumination further includes determining illumination that increases illumination of an upcoming curve indicated by the data, wherein the determining the control instructions further comprises determining the control instructions for controlling one or more of the directional light sources to achieve illumination around the curve.

* * * * *